(12) United States Patent
Visscher

(10) Patent No.: US 8,849,862 B2
(45) Date of Patent: Sep. 30, 2014

(54) ARCHITECTURAL FRAMEWORKS, FUNCTIONS AND INTERFACES FOR RELATIONSHIP MANAGEMENT (AFFIRM)

(75) Inventor: Ronald Scott Visscher, Holland, MI (US)

(73) Assignee: RSVPRO, LLC, Holland, MI (US)

( * ) Notice: Subject to any disclaimer, the term of this patent is extended or adjusted under 35 U.S.C. 154(b) by 64 days.

(21) Appl. No.: 12/008,979

(22) Filed: Jan. 15, 2008

(65) Prior Publication Data

US 2009/0006467 A1 Jan. 1, 2009

Related U.S. Application Data

(63) Continuation-in-part of application No. 11/803,328, filed on May 14, 2007, now abandoned, which is a continuation of application No. 11/529,757, filed on Sep. 28, 2006, now abandoned, which is a continuation of application No. 11/333,804, filed on Jan. 17, 2006, now abandoned, which is a continuation of application No. 11/135,613, filed on May 23, 2005, now abandoned.

(60) Provisional application No. 60/573,726, filed on May 21, 2004, provisional application No. 60/573,264, filed on May 21, 2004.

(51) Int. Cl.
G06F 17/30 (2006.01)
G06Q 10/06 (2012.01)

(52) U.S. Cl.
CPC .................... *G06Q 10/06* (2013.01)
USPC .......................... 707/792; 707/796; 705/7.12

(58) Field of Classification Search
USPC ......... 707/609, 634, 661, 694, 702, 705, 756, 707/769, 771, 783, 792, 796, 802, 821, 707/E17.005, 779, 999.103, 999.105, 703; 705/1.1, 7.12, 7.13, 7.15, 7.17, 7.23, 705/14.56, 300
See application file for complete search history.

(56) References Cited

U.S. PATENT DOCUMENTS

| | | | | |
|---|---|---|---|---|
| 6,988,109 | B2 * | 1/2006 | Stanley et al. ......................... 1/1 |
| 7,162,427 | B1 * | 1/2007 | Myrick et al. ................ 705/348 |
| 7,860,883 | B2 * | 12/2010 | Hinton et al. ................. 707/769 |
| 7,991,764 | B2 * | 8/2011 | Rathod .......................... 707/713 |
| 8,069,071 | B2 * | 11/2011 | Kall et al. .................... 705/7.12 |
| 2003/0110070 | A1 * | 6/2003 | De Goeij ........................... 705/8 |
| 2004/0143669 | A1 * | 7/2004 | Zhao et al. .................... 709/228 |
| 2005/0066058 | A1 * | 3/2005 | An et al. ........................ 709/246 |
| 2005/0216555 | A1 * | 9/2005 | English et al. ................ 709/204 |
| 2008/0162157 | A1 * | 7/2008 | Daniluk ............................ 705/1 |

* cited by examiner

Primary Examiner — Greta Robinson
(74) Attorney, Agent, or Firm — King & Partners, PLC

(57) ABSTRACT

Uniform subject and object oriented data structure adopted in computing device to efficiently store, distribute and process data in a variety of applications. Said data structure comprised of multiple complementary subparts that together and independently facilitate communication (of inputs and outputs) through one or more defined interfaces to facilitate secure access and coordination between given individual subject(s) and other real (physical or metaphysical) entities. Methods are also disclosed that work in tandem with the data structure and interface components to enable and require a single or given human user or other individual personal subject (belonging to a secure AFFIRM network) to maintain exclusive (private) self-control over at least one virtual domain that represents themselves (their actions and their relationships).

13 Claims, 28 Drawing Sheets

| Competitive Systems Landscape | | | | |
|---|---|---|---|---|
| | Analytical Applications | Collaboration Tools | Transactional Application | Intellivision Value Web |
| Evaluation | x | | | x |
| Communication | o | x | | x |
| Negotiation | | o | | x |
| Transaction | | | x | x |
| Integration | o | o | o | x |
| Coordination | | | o | x |

| | | | | |
|---|---|---|---|---|
| | Complete Coverage | | x | |
| | Partial Coverage | | o | |

FIG. 2

Highly Insecure Security

Fact: A well encrypted database still has good chance of a security breach as a result of users letting their passwords out.

If P = probability of a user letting their password out and U = number of authorized users Probability of Breach = P x U Normally all records are maintained in one centralized database, e.g. all of a hospital's or doctor's patients and their medical records. Therefore, many users must be authorized for ONE DATABASE.

For example, at a Hospital with 300 Users, if p=.01 then the likelihood of a breach is an alarming 300%.

FIG. 4

Transformation or Value-Add Resulting from Interaction of Multiple Real Entities
(at any one or more levels of Aggregation)

Partner Inspiration Matrix

Phases of Relationship/Concept Development (X-Change) with Partner

|  | Idea (IN) | Phase 1 Inform | Phase 2 Inquire | Phase 3 Interpret | Phase 4 Integrate | Phase 5 Individualize | Phase 6 Instruct | Total |
|---|---|---|---|---|---|---|---|---|
|  | Why? | Δ +/− | Δ +/− | Δ +/− | Δ +/− | Δ +/− | Δ +/− |  |
| Component | Who? | Δ +/− | Δ +/− | Δ +/− | Δ +/− | Δ +/− | Δ +/− |  |
| of | What? | Δ +/− | Δ +/− | Δ +/− | Δ +/− | Δ +/− | Δ +/− |  |
| Business | How? | Δ +/− | Δ +/− | Δ +/− | Δ +/− | Δ +/− | Δ +/− |  |
| Model | Where? | Δ +/− | Δ +/− | Δ +/− | Δ +/− | Δ +/− | Δ +/− |  |
|  | When? | Δ +/− | Δ +/− | Δ +/− | Δ +/− | Δ +/− | Δ +/− |  |
|  | Much? | Δ +/− | Δ +/− | Δ +/− | Δ +/− | Δ +/− | Δ +/− |  |
|  | Extent? | Δ +/− | Δ +/− | Δ +/− | Δ +/− | Δ +/− | Δ +/− |  |
|  | Total |  |  |  |  |  |  | Total Value +/− (OUT) |

Innovation starts with the recognition of a business opportunity or idea and is achieved through combining these elements in an inspirational way.

FIG. 18

ARCHITECTURAL FRAMEWORKS, FUNCTIONS AND INTERFACES FOR RELATIONSHIP MANAGEMENT (AFFIRM)

CROSS-REFERENCE TO RELATED APPLICATION(S)

This application is a continuation of U.S. application Ser. No. 11/803,328, filed May 14, 2007, which is a continuation of U.S. application Ser. No. 11/529,757, filed Sep. 28, 2006, which is a continuation of U.S. application Ser. No. 11/333, 804, filed Jan. 17, 2006, which is a continuation of U.S. application Ser. No. 11/135,613, filed May 23, 2005, which claims priority to U.S. Application Ser. No. 60/573,726, and U.S. Application Ser. No. 60/573,264, both filed May 21, 2004, which are hereby incorporated herein by reference in their entirety, including all references cited therein.

BACKGROUND OF THE INVENTION

1. Field of the Invention

The disclosed invention is in the field of using communication and information technology (CIT) to assist individual devices, people, groups and/or organizations in management of interaction through networks. Although impacting other levels of CIT, the invention is focused on improving the application layer of computerized networking. (See standard OSI or TCP/IP networking models) It is specifically focused on application software that is used to enable a human to interact with a computer and to use the computer with this application software to manage socioeconomic activities. Like other "application software" the preferred embodiment of this invention in a standard computer works in conjunction with and/or through an operating system (OS) to control a given computing device.

The invention is applied to improve CIT "applications" that benefit from improved handling of structured data and enhanced interaction between humans and other entities (humans, machines or other physical entities) in the environment.

2. Background Art

As society becomes more networked, it is easy to imagine many new opportunities as well as many new threats that might result. For example, people often assume that increased interconnectedness through computer and information networks will automatically bring amazing new benefits for humans. This is simply not true unless there is an understanding being transferred between the entities interconnected on a network. Also, as one can readily imagine after experiencing contemporary science fiction, there are also potential threats from intelligent machines getting out of control. Although it is now obvious that both of these extremes are exaggerated in the short run, the opportunities and threats are both still possible in the long run. It will help the reader of this document to more easily understand and appreciate the uniqueness and utility of the disclosed invention to have: 1) a realistic outlook on the opportunities and threats of technology, and 2) an understanding of the current abilities and limitations of communication and information technology.

It is often assumed that application software is as advanced and well organized as the networking hardware technology. For example, people assume that as we make strides toward more interconnectedness on the hardware and basic data transport levels that we also make comparable strides on the application level. This is not true. In fact it was this kind of naive thinking that was a cause of the infamous "Internet Bubble". The main reason why this is not true should have been obvious. Merely being interconnected by a communication medium does not necessarily mean that the interconnected entities will be able to communicate understanding and therefore benefit human enterprise.

The reason the Internet bubble eventually burst was because we did not actually have the ability to efficiently and effectively organize and communicate information in such a way that it would dramatically enhance the common individual's ability to negotiate and manage their unscripted lives. There is a need for real-time information organization and communication tools and methods that will help common individuals to more productively negotiate and manage their lives and relationships. This is the main reason why AFFIRM was invented, so that common individuals could better benefit from the increased interconnectedness of our society. It turns out that the AFFIRM invention will also be beneficial in many other areas than directly helping people manage their socioeconomic networks. Any network or part of a network that could benefit from better simulation, negotiation, coordination, and control through improved organization and communication of information stands to benefit from the AFFIRM invention.

To further develop and to create new and valuable services, socioeconomic entities need to be able to: Evaluate future options/opportunity and past performance; communicate efficiently and effectively; negotiate appropriate win/win agreements; transact or interact in a safe and efficient way; integrate or synthesize merged organizations, applications and knowledge; and coordinate efforts of multiple distinct individuals or entities Socioeconomic individuals and groups concerned with development need to try to preserve current value by protecting existing assets while also trying to create value through building new assets. Current technology is not very good at helping achieve either of these two primary objectives, securing existing value and creating new value. For example, current systems could be better at securing private information while interacting with others outside of a private entity to build new assets. Enabling both of these essential yet seemingly juxtaposed needs or benefits for demanding customers and collaborating partners will prove to be a significant value proposition.

Previous attempts to satisfy these needs electronically have been less than ideal because of security limitations and impractical and costly integration requirements of systems from the following categories: Analytical Applications—data warehousing, decision support, performance management applications often categorized and on-line analytical processing (OLAP); and Collaboration Tools—office, email, instant messaging, whiteboards, team sites, etc; Transactional Applications—ERP, accounting, inventory management, purchasing, sales, etc., often referred to as on-line transactional processing (OLTP).

Given these present limits, these systems are unable to provide the above mentioned value creation capabilities in a practical way.

The present invention both integrates the other systems mentioned in a more practical way with a common uniform intermediary data store, but also provides some of the benefits of these other applications and more, in and of itself.

Most of today's Web servers are merely haphazard additions to a company's information technology infrastructure. Therefore, most Internet information remains separate from the many other systems within a company. Collaborative applications are comprised of several different point solutions that are not even normally considered to be part of the transactional and analytical application landscape or "silos". In fact, this absence of integration is also true of most company's internal transactional, decision support and/or data warehouse systems. Frankly, it is an embarrassing situation for the designers of today's systems. The analytical systems are separate from the Transactional (Enterprise Resource Planning) systems that manage the internal resources of most companies today. This prevailing situation was acceptable when online business was in its early stages and businesses were not required to be proactive, but now, as e-business is advancing into a more collaborative knowledge-based commerce stage, this integration problem is a major detriment to further growth and development. Therefore, the status quo will become unacceptable, and the companies that break away from these severe limitations will enjoy huge gains in competitive position.

It is as if the users of these different applications are expected to always be operating in isolation, not needing to communicate, participate in negotiations, or other value creation activities with users of the other applications. But the days of the lone analyst in the ivory tower are over. Today's managers in broad and deep positions in learning organizations need to be able to do it all. They need web access to integrated tools that can analyze, collaborate, transact and then analyze again all in one reoccurring seamlessly integrated learning cycle.

Managers need to be able to bring all the different existing pieces of a solution together and to share data between them, from one central data repository and/or common uniform structure when appropriate. To have an understanding of oneself, ones environment and ones role within the environment, one needs to be networked into the fluid flow of information on the "business application" level between transactional systems, analytical systems and communication systems. At this time, satisfactory solutions do not exist for this challenging problem. Basically experiential (transactional) data from multiple disparate and distributed sources needs to fluidly inform analysis, which then needs to fluidly inform all related future planning and implementation decision-making (transactions) in real-time. Present limitations of the different (usually separate) CIT business application systems operating in this organizational learning cycle are explained below. How the present invention overcomes these limitations is inferred below, and further explained in the following Description of the Invention section.

Today's "computerized application programs" do not efficiently and effectively structure data about an individual's behavior and ever-changing status vis-à-vis their environment. In most cases where individuals are represented in today's "computerized application programs", they are represented within large business application programs as one of many individuals in a common database "Table" or file. Some structured database application programs, such as accounting systems, enable "individual entities" to represent some aspect of themselves, e.g. their financial situation. But unfortunately these programs record data of specific types in specific predefined database "Tables". Therefore, these programs are not good at handling an end-user's evolving data type requirements for previously unspecified processes or situations.

Since database application programs, e.g. accounting systems, are structured to handle only specific numbers and/or types of data "Tables" and/or "Fields", they are not able to productively communicate with other application programs designed to handle different types of data. Therefore, different systems handling different types of data do not effectively and/or directly interact with each other. As a result the single company or industry wide hub, with data organized in specifically typed and defined data tables and fields are still the standard method for trying to handle coordinated data exchange.

Because of the difficulty in current disparate systems interacting, most business expenditures in information technology are for training and/or integration of different systems, rather than for the acquisition of new systems. This is also why there is great effort being applied by industry groups to try to negotiate agreement on how to define the different specific types of data that will be handled in different types of application programs. The hope is that these efforts will enable the adoption of common standard data type definitions so disparate systems relying on structured data will then be able to communicate with each other. There are many attempts to use XML by different disciplines and industry consortiums. Current standard markup languages require those sharing data directly, i.e. not through intermediary transformers that limit real-time communication, to have a common specific yet comprehensive schema, i.e. data type and hierarchy definition. The problem with this is that industry groups can't agree on standard or common schemas that define everyone's needs. To get organizations in multiple industries to agree on standards, so that better convergence could be achieved, would be even more challenging. Therefore, fluidly communicating structured data between organizations and their servers continues to be a major problem.

Another different problem is that it is difficult to manage the security of structured data in today's application programs or services. It is very difficult to keep information private once it is placed on a networked system. When a database, e.g. a medical records database, has private information about a particular individual, e.g. a patient, in today's systems, the information is usually commingled with information about other individuals of the same type, e.g. other patients. As a result, an individual's private data is inherently accessible by multiple users of these systems. "Third parties" with security rights to access that "level" or "Table" of data, are going to be able to access private records, whether they have any reason to interact with that particular individual's private information or not. This is a major security hole that many organizations are required to plug, e.g. because of new HIPAA laws, but are currently still looking for ways to do so.

If one of today's systems is set-up to only allow certain individuals to access certain specific information on a network, then there needs to be one or more other designated "third party" security agents generally authorized and spending significant time and effort to specify and maintain specific individual access rights. In large networks this can be a huge expense. Just the fact that private information for more that one individual is store in a common place makes the information vulnerable to access by unintended parties.

As a result of these limitations and difficulties with current information technology, an individual (i.e. individual person, group, organization or other entity) still does not have access to cost effective and secure computerized services that effectively guide, coordinate and assist in the management of common yet ever changing processes. Individuals would benefit greatly from individualized and secure computerized services that help manage their unscripted relationships and processes without requiring: private information of multiple individuals to be combined in one place; "Third party" data security providers and/or users to access private information; different data structures and/or programs for different applications; agreement on a common data dictionary or type definition by interacting parties; and "Application programs" to be reprogrammed when data type definitions change.

The following invention overcomes these present day system requirements and will enable collaborating individuals to work more fluidly and innovatively together with less fear and limitation.

In addition to having too many of these above mentioned unnecessary and costly requirements with today's systems there are also some potentially valuable things that current systems, no matter how expensive they are, cannot do. Social scientists have shown that each "individual entity" (whether a individual person, group or larger organization) has a different perspective on shared knowledge and relationships. But most information systems today require those that communicate shared knowledge and information to agree to one way of describing their knowledge. Unfortunately this is not possible when different groups in different domains are used to naturally building their own vocabularies. This makes it difficult for different groups using different vocabularies to communicate or collaborate. e.g. nano, bio, info and cogno scientists all have different words for what they call the connections between the components of their structures. As the examiner of this patent application, you are involved in a perfect example of this. It must be very difficult to thoroughly research all the different patents that might be related to a new patent application, given this common tendency of different individuals from different or even related domains using different words to describe the same thing.

One who is practiced in the art of computer programming and is familiar with existing methods knows that both procedural and object oriented programming methods normally dictate that business process application programs be designed to use and only work with specific types of data or objects. Current art in the computer science field prescribes that the "programmer", in the traditional sense of a person who writes instruction code in a "programming language" to be compiled or interpreted at runtime, must define the specific type of "objects" that an "application program" is able to process. This can be seen in how data modelers define database "Tables" with specific record fields and/or similarly how business process modelers define "Classes" for a particular type of "Object". The current programming paradigm, taught in contemporary computer science classes, suggest that "Tables or "Classes" for a database and/or program be defined to directly correlate with "real objects in the real world". For example in a healthcare application you would have a record for each patient in a database table specifically structured to hold the specific type of information that a standards body decided was appropriate and necessary. One can refer to any present day computer software programming literature for more on contemporary programming methods. Again, like database "Tables", each application program designed to handle structured data is written by a "programmer" or "program generator" to handle certain types of data or objects for specific types of situations.

As a result of this standard programming paradigm, specific "Tables or "Classes" only handling specific types of data or objects, if an end-user wants an existing application to handle a new and different type of data or object, they will find that it won't work. They are stuck or rendered helpless unless they find a different program to handle their new type of data or object or they need to expend effort "programming" their own application program that will most likely not interoperate with the other existing programs. Wouldn't it be nice if one program was available that could handle any type of data or object and enable non-coders to "program"?

Since these capabilities have not previously existed, the coordinated development of "business process applications" that supported collaborative interaction and evolved in real-time could not be created and/or not be programmed by normal businesspeople or "end-users".

In addition to the application development issues and other limitations with current information technology and architectures mentioned above there are other problems that the present invention is designed to resolve. There have traditionally been two separate branches of structured database business computing applications. Both were inherited from the mainframe world of computing, online analytical processing (OLAP) and online transaction processing (OLTP). Because of their drastically different requirements, they usually must be run using separate systems. This causes problems trying to get data from the transactional systems, usually the source applications, to analytical systems. Because of the extraction, transformation and load (ETL) procedures that are usually necessary before data gets to analytical systems, there is normally a time delay that prevents real-time data analysis. Another problem resulting from the fact that OLTP and OLAP systems are usually separate "islands" or "silos" that don't integrate very well is that this makes it difficult for an organizations learning loop to be a complete and fluid circuit. Ideally analysis would immediately effect transactions, which would immediately impact analysis, which would then again impact transactions and so on in a continuous real-time loop. Unfortunately, because of the disjointedness of these two types of systems, they do not effectively support organizational learning.

OLTP and OLAP have some other problems in common and some that are unique to each. Both usually attempt to support seemingly unlimited multi-user demand from limited centralized servers. As a result, users of both types of systems can suffer from slow response times. Therefore we need better ways to distribute data and processing across multiple computers. But unfortunately current OLTP technology used for managing inventory, financial accounts and other important resources are not good at coordinating interaction between multiple parties and resources without bringing the data for these together in one common central location. Again this causes information systems to have inherent security and performance problems.

OLTP systems that involve more multi-user writing of data than OLAP systems also suffer from other difficulties. Since multi-user transactional database application programs normally enable editing of common structured data, they need sophisticated ways of locking a specific piece of information while someone is editing it. Locking is required while one user is editing something, so that someone else won't edit the same thing at the same time and overwrite the other user's changes.

Also, when computer servers are connected directly or indirectly to a network and allow access by the public or unknown users, e.g. email and web servers, they are subject to the possibility that these unknown users will purposely or un-purposely use too many resources from the server. In extreme cases, this causes what is commonly called a "denial of service attack". It would be better if these servers could not be accessed by unknown parties, but given the way email and other servers work, this is unpractical.

There are several things that an operating system is not intended to do. An operating system is software focused on assisting application software in operating the hardware of a single computer.

When a given software program is running on a given computer this is thought to be a separate instance of the software, usually requiring a separate license for use. Software that provides access to or assists in control of another computer, e.g. a "client user interface to another server or computer" should not be considered to be part of an operating system. Otherwise one could imagine that as a result of the pervasiveness of the Internet, the software on all computers could eventually all be part of one massive operating system with the ability to control the whole network. This could cause abuse of power and/or subject the network to severe vulnerability. To prevent these potential problems this invention distributes control across the network to each individual. A separate instance of an operating system running on a separate distinct computer used to provide control of one or more processors of that separate computer is normally considered to be a separate instance of the operating system running another computer. Therefore, software that accesses or controls another server or peer computer is considered to be an application as opposed to an operating system. For security reasons operating systems are not supposed to allow their users to work with file systems on other computers on a network from a web browser.

Also someone cannot use an operating system to for example, organize a knowledge base in different files. This is what would normally be considered a business "application". These types of functions and most of the other things that this invention does that are unique would not normally be considered to be part of an operating system. The aspects of the present invention are normally part of what would be considered business management application software. This category of software includes all types of business application software such as inventory management, accounting, scheduling, desktop productivity, email, instant messaging, group collaboration, data warehousing or business analytics, contact management and much more. These types of "application" software traditionally run on top of the operating system of a computer.

It is imperative for the vibrancy and continued innovation of this industry that the operating system layers and the business management systems layers of the software industry be kept separate. It would be particularly stunting of progress toward systems that enable computers to improve the quality of life and productivity of humans, if there was only one company that could compete in the market for business applications. Unless of course you believe that an operating system should be able to include anything and everything and that it doesn't matter if one software company controls the whole industry, you need to understand that operating systems are supposed to control ONE computer's hardware and must keep track of state information about that one computer and the application software in the process of using it. Software that can assist in the control more than one computer and keep track of the state of more than the one computer being "operated", should not be considered part of the operating system. These functions should be part of an application that is designed to work on or through, many different operating systems.

Networked Directory systems and XML systems are like databases in that they require third party control of security and upfront agreement on the type of data being structured.

Email systems use a more highly evolved style of network communication called "all channel". (See FIG. 16) This enables the member of a network to increase their satisfaction over the traditional "chain of command" type networks and "Hub and Spoke" networks. But unfortunately "all channel" networks make it difficult for leaders to emerge and current "all channel" communication technologies do not support storage and communication of structured data as is needed to support in-line analysis, transactions and synthesis between entities.

Email systems are also prone to viruses and other attacks. Another "all channel" communication technology called instant messaging is designed for users to be synchronously (at the same time) connected, and is also not designed for storing and communicating structured data. Again, current "all channel" systems are either requiring fixed formats or data type definitions, like EDI, or are like email and instant messaging and are not designed to handle structured data. Current databases and spreadsheets handle structured data, but do not handle the ability to flexibly coordinate the integration or synthesis of the structured data between disparate hubs.

Application servers traditionally require "programmers" to code business logic using standard languages and require, with the OS, non-persistent session and state management information to manage multi-user activity.

File sharing programs are currently (often illegally) used to distribute digital content. These distribution systems, especially the peer-to-peer type, are not able to efficiently and effectively prevent unauthorized copying and distribution of this digitally recorded content. Content streaming and centralized document management can alleviate these abuses in a centralized company, but not in a situation where distributed peers are cooperating in the process of sharing information about documents and content. Since peer-to-peer sharing of information among fans and other interested parties is only natural, we need peer-to-peer systems that prevent these abuses of copyright law.

All together these above problems and limitations of current CIT enable thieves to steal ones identity and digital assets in cyberspace and cause major problems for the individual victim. It is one of the fastest growing crimes, and needs to be stopped. The present invention will prevent this crime.

Also, normal humans somehow have the ability to use good judgment, especially those that are involved in a particular business process on a daily basis. Computers on the other hand, and their "programmers" that are not usually experienced or trained as business persons, are not usually as good at judging what would be the right thing to do at a particular time. Therefore, there must usually be a two-step development process where a businessperson specifies a "business process application program" and a programmer programs it. Unfortunately, there almost always seems to be something lost in translation. Computers just do what they are specifically told to do, and at this point in time it is still too difficult to tell computers what to do. Also, eventually computers will be capable of doing more than they are told such as make recommendations for future actions of either themselves or others. People will need ways to securely and cost effectively control and benefit from those enhanced computing capabilities.

Therefore, we need simple ways for end-users to be able to not only tell their computers what to do, but also receive novel recommendation from the computer. When computers are sophisticated enough to take novel actions themselves, it will be important to make sure a responsible person approves of the actions. Most efforts at this time are being placed on allowing business people or "power users" to be able to graphically layout a specific user interface and/or business process and then have a code generator actually "write" the instruction codes that are then compiled or interpreted to run as an "application program". Even this newer method requires a two-step process where "business application programs", including interfaces, e.g. graphical user interfaces, data structures, e.g. tables, and/or processing algorithms, e.g. software programs, need to be defined and written for specific business processes and object types. This does not ideally support dynamic situations where business users need realtime transactional and analytical processing systems that can easily adapt to user needs, communicate and share structured data with users and systems with different data type definitions.

Also, for some time now, we have dreamed of computers that would be able to reason like humans with constantly changing information about the environment and able to make judgments across a wide variety of fields based on that data. One reason we don't have computers that are able to do these things very well is because computers are not currently capable of being conscious or understanding of the intimate details about relationships between entities.

Have you seen a machine or computer program capable of effectively learning and managing all the different aspects of multifaceted relationships? Have you seen CIT able to keep track of and communicate information about a relationship from the different perspectives of you, me and we (ourselves and others)? Up to this point it hasn't been done very well. And this is one reason why CIT systems are not as good at assisting in the management of relationships as they could be. If computers were good at this sort of thing in general they could be used to more readily manage more aspects of our lives and our relationships. Just imagine what kinds of services a computer could provide if it were able to more intimately know about you, about all your potential partners, and about the value of things you might do together with these potential partners. For example, would we be able to negotiate our future plans and then have the computer know enough to then manage those plans in a semi-automatic way? Are current computers aware of what you and your partners have to contribute to achieve future plans? Are they able to seek options, consider the potential value of options and recommend plans that make the most sense given your strengths, weaknesses, opportunities and threats? If computers could do this, they could be relied on to serve people in much more productive ways.

If all of the above problems were solved and possibilities achieved, we would have secure and reliable individualized or customized services continuously available that provide: automatic evaluation, budgeting and record keeping; automatic intelligent order giving and taking; automatic research, evaluation and development; coordinated interaction that manages optimum value creation; continually reprioritized and automatically rescheduled To Do lists; automated opportunity recognition and recommendations for each individual; and/or identification of potential partners for an individual for example.

SUMMARY OF THE INVENTION

Architectural Frameworks Functions and Interfaces for Relationship Management (AFFIRM)—that which is disclosed (uniquely identified, described and referred to) in this and related documents, an embodiment or implementation of that which is disclosed, and/or an instance of an implementation of that which is disclosed, whether in whole or in part and whether in preferred embodiment form or otherwise. An instance of AFFIRM exists whenever an object exists as a subject in an implementation of that which is disclosed, i.e. an existing subject is actually represented in and by (not only by or only in) one of the disclosed frameworks, functions, interfaces, structures, models, schemas, containers, links, messages, processes, etc. The instance is often accessed or linked to through an AFFIRM interface, but can be through some other sort of interface that might in some way transforms one or more non-AFFIRM object(s) to or from an AFFIRM instance where the object(s) exist(s) as AFFIRM subject(s).

AFFIRM Network—an instance of AFFIRM that represents the context, environment, meta-system, milieu, etc. within which other AFFIRM instances, e.g. AFFIRM Domains, exist.

Subject—(first as commonly used in the philosophical and logical sense) an entity apart from its attributes or characteristics and (also as commonly used in the literary sense) that about which "something" is said or referred. Subjects are often seen as systems, which could be said about the way AFFIRM treats subjects. In AFFIRM that "something" or "system" can be considered both as a (stand alone) object, that includes but is not limited to (that Subject) itself but also representations of the other AFFIRM Subjects with which it interacts. Within AFFIRM the concept of Subject more specifically means that existing and evolving object with individual essence which is the (current yet often dynamically changing) central or main focus of a given instance of AFFIRM. An AFFIRM Domain is an example of a place or object that actually represents (and/or is in a virtual sense) the existence of a Subject in and of itself, but also as part of the AFFIRM Network(s) in which it resides, where the different aspects or characteristics of an AFFIRM Subject persist simultaneously for a given Subject. An AFFIRM Network is an example of a network space (and/or in the preferred embodiment of AFFIRM actually located in the memory of a computing system) where the different common aspects or characteristics of AFFIRM Subjects persist simultaneously for all AFFIRM (Domains of) Subjects that are existing members of that AFFIRM Network.

Object—an entity or set of entities (including but not limited to a data point, event, type, instance, person, place, thing, etc.), whether physical or something else, e.g. abstract. In AFFIRM an object exists with respect to at least one Subject (which may be itself). In this way an object is located in a domain governing the meaning of the Home Subject and/or governed by the Home Subject, e.g. person. An object in AFFIRM is a given instance of AFFIRM that normally persists in some form, at least in an archive of past events, e.g. as a result of having been input, stored, referenced, represented, interfaced, messaged, linked, related, manipulated, processed, accessed, instantiated, created, addressed, handled, etc., in an AFFIRM Domain of an AFFIRM Network, Therefore an AFFIRM Object is that which is in process or relation relative to one or more given (persistent) AFFIRM Subject(s). Therefore an AFFIRM Object is something that is represented inside of a Subject, including the Subject itself, but is perceived or considered as apart from that Subject.

Domain—may refer to that which makes up a field of knowledge, but in the particular context of AFFIRM more generally refers to that which is an identifiable set of data (including information, knowledge, etc.) about a given Subject and objects that in someway relate to that Subject, regardless of medium where the data is stored or located, e.g. bits, atoms, genes, etc.) structured in the form described in this disclosure. An AFFIRM Domain represents and persistently stores information as objects with certain recorded states. A Domain can be used to regulate and/or be governed by its Home Subject. The data is able to be intermittently accessed any time by a Home Subject. A Domain ideally includes data about all that is known to comprise (as a totality, both qualitatively and quantitatively) a given Home Subject, including data about Object(s) that are part(s) of the Subject and/or class(es) to which the Subject belongs. Individual Subject (IS)—a uniquely identifiable entity with individual essence, e.g. a product, person, actor. Personal Subject (PS)—is a more specific reference to a uniquely identifiable Individual Subject (IS) that is a legal person and presumed to be a creative being and/or (hopefully conscientious) actor. The AFFIRM default is for a PS to have a private personal domain (PD). There is a process to insure registration, ownership and licensing of Concepts and/or Types or at least those that creators wish to protect.

Domain—a separate data store (usually a partition of data at a location on a computer or network) used to represent a given Subject in the structure prescribed in this disclosure. AFFIRM Domain is usually the phrase used to refer to any kind of AFFIRM Domain, but sometimes Personal Domain (PD) is also loosely used to refer to any kind of AFFIRM Domain since it is a type of all inclusive Domain through which a given user can access data from or representing any other kind of AFFIRM Domain or network. Personal Domain (PD) (also elsewhere called a value web or value web hub)—an AFFIRM Domain that is under the exclusive control of a Personal Subject (PS) (or legal person).

Home Subject (HS)—Subject that is the central focus of a given AFFIRM Domain, e.g. Individual Subject (IS) of an ID, PS of a PD. In the later case of a PD the HS (PS) is inherently the owner and defacto controller of a given Personal Domain (PD) under discussion. IS's may have other owners. An IS is defined/impacted, and its respective ID modified accordingly, as a result of or through interaction (passing of IOOs) of interacting (involved or related) objects/parties (e.g. one or more S, IS, PS, CS, TS, more commonly referred to as owners, makers, users, observers, etc. of the given IS) and their respective (subjective) domains that may dynamically change over time. An example would be a PS who is an end-user that has right to access and consume (use) as well as the responsibility to care for the IS, but may or may not have ownership of the given IS, e.g. a given Dog's caretaker.

Home Domain (HD)—the virtual representation of a given AFFIRM Subject. e.g. a Personal Domain representing and under the control of a given Home Personal Subject (PS) Main (Home) Domain (MHD)—the one main home domain of a given IS. Everyone who is a member of a secure AFFIRM network must have one of these.

Input/Output Object (IOO)—a uniform basic data unit in AFFIRM, usually in the form of a record, packet, string, or message that represents an object (e.g. its state relative to the sending and/or receiving Subject) or an action (e.g. a potential or actual change or state) involving that object. This is also referred to as an UBDU. One of the unique aspects of AFFIRM is that this IOO or data record has the same format for all objects in all aspects (data store, data process, or data interface) of an instance of an AFFIRM embodiment/implementation.

Prospective Interaction Partnership (PIP)—potential bi-directional link(s) between PD's, initiated by one of the potential partners and pending required approval or affirmation by the other. The IS or controller of a domain may send a request for partnership directly to a prospective partner domain for which the address and other link information is known. At this point a PIP is established. It would then be up to the potential partner receiving the invitation or proposal to then affirm or approve the PIP and make it an actual partnership. A PIP can be initiated from either side of a PIP, i.e. from either of the two domains, (or a common partner) as long as the initiating PD or IS knows the domain address and other access information of the desired partner. This partnership information would not normally be available unless it was provided by the prospect through some explicit means. Also, this information may or may not include the identity of the IS or controller of the domain. In such a case this would be an anonymous prospective partner. Usually the PIP has either sent a proposal for partnership to or has received a proposal from the PS/IS under discussion.

Partner—a home subject HS of an AFFIRM domain that is directly related or interlinked (as a sub, peer and/or supra domain) to the Home Domain of a given AFFIRM Subject. A given subject and its respective domain has the option of communicating (e.g. send/receive IOO's or structured messages) with a Partner subject and/or domain. In AFFIRM a given Subject is a partner of itself and its parent(s) (ancestors), origin and/or source by default, which should (ideally unless this subject is the first using AFFIRM) also have Home Domain(s) where it is the Home Subject.

Input Output Definition Object (IODO) is an IOO representing a Concept or measure.

Concept—a meaningful description of a class of reality (the Use of which can be a measure). In AFFIRM a new Concept must be created by a PS and is represented as a whole (W—see below). A given Concept is considered an idea in its most abstract form. As it is actually emerging or being actualized or implemented, it is normally within the framework of a group (We) domain with partners involved in implementing the concept. (See GAIA Re-DESIGN Example Application) A specific Concept can be represented and passed around as a Type (a representation of one or more Xs) and in this way its use can be used, monitored and evaluated for its merit, worth and significance.

Concept Domain (CD) is a Domain or data location used to persistently store information, such as words or symbols and other associated data found in an IOO, about or related to a particular Concept. There is an IOTO (see below) or set of object(s) for every Concept usage context. This usage context is established in a CD as users use a Concept (as an object) in their PD's. A CD is created when the Concept is conceived of or registered for the first time in an AFFIRM network, and a CD gets linked to and used (as well as updated) whenever another Domain uses the Concept.

Type—any meaningful representation of a part of reality. In the Preferred Embodiment of AFFIRM, Type is whole subject in its domain, but is only capable of being a component, part or process (set of Xs) in its use as an object in other domains. Although this preferred design choice could be different and still be an implementation of AFFIRM, this regulation assists AFFIRM users that create products or other artifacts, such that they can be better tracked and monitored from the W whole domains that create them. In this way there will be a prevention of the kind of insecurity that may exist when Types are able to be instantiated as wholes (Ws outside of themselves) without any way to monitor their unlicensed use. Not having such a regulation would enable replication without integrity and/or responsibility. This is allowed in concepts, as a concept is a whole and capable of replicating (while maintaining a permanent interconnection without requiring Partnership).

Type Domain (TD)—domain that may optionally be used to persistently store information about a Type. It is usually comprised of data found in an IOO, about or related to a particular (Type of) object. This is the type of domain or data source normally found outside of AFFIRM, and, particularly for security reasons, AFFIRM treats domains and data sources that exist outside of an AFFIRM network as such. In an (AFFIRM) Type Domain there is an IOTO (see below) or set of records for every Type interaction context. This interaction context is established in a TD as users interact with a Type. (users, such as an IS in their PD or other HD). A TD is created when the Type is conceived or registered for the first time in an AFFIRM network, and a TD gets linked to and used whenever another Domain partners with or uses the Type. In the preferred embodiment of AFFIRM if a Type Domain exists, it maintains continuous contact with AFFIRM users of the Type (in other AFFIRM domains)

Whole Entity (W)—the Home Subject and other related subjects (e.g. partners) represented in the first (OD) dimension of an AFFIRM Domain (those objects located in the first column off the first row of the GUI), e.g. Subjects that are represented as wholes (individual, person, concept, etc.) in AFFIRM.

Exchange Object (X)—any object that is represented in the second (1D) dimension of an AFFIRM Domain. Xs can be exchanged (received in or sent out) or used in the process of interacting between W's. A complete group of Xs, both incoming and outgoing, (e.g. those objects located in the second column off the second row of the GUI) represents a process that the whole (W) is involved in. The net or balance of the incoming and outgoing is considered part of the W within which it exists. From the perspective of the W this grouping of Xs is considered a sub-system (or X part of the whole W system).

Attribute (a)—any asset, skill, quality, characteristic or other existing property of an X.

Benefits (b)—any benefit, result, reason, effect or other outcome (positive or negative, intended or unintended, envisioned or actual, etc.) of an X.

Symbol List (SL) is a list kept by every domain of the words and other symbols used to refer to different concepts. There is a record for every word/concept combination. (A Symbol List is sometimes called an Item list, and it may or may not be kept within the disclosed AFFIRM Domain data structure.

Concept List (CL) is a list kept by every domain of the concepts authored and/or used in the domain. There is a record for every concept. (A Concept List is sometimes called an Option list, and it may or may not be kept within the disclosed AFFIRM Domain data structure.)

Type List (TL) is a list of all Types used in a domain or network. This list also may or may not be kept within the disclosed AFFIRM Domain data structure.

Community—a shared ecosystem or AFFIRM network in which a plurality of PS/IS's belong, communicate, interact and build a common or agreed ontology and/or metrology.

Uniform Interface (UI) is a device, structure or process through which data (transformed to or from the prescribed uniform domain structure) can be read, viewed or communicated.

Input Output Definition Objects (IODO)—an IOO with specified qualitative definition and unspecified quantitative value (see Value Object).

Input/Output Object Template (IOOT)—a metadata wrapper that complies with the uniform domain data structure that acts as a purveyor of context within and between Domains. An incomplete IOOT holds one or more unspecified Input Output (Definition) Objects (IODO). An IOOT provides all the data and structure necessary to enable multiple IS Domains to be able to communicate about one or more Concepts, Usages, Types or Entities (represented by IODO's). An IOOT provides definition, enabling pieces of ontology to have meaning and to be shared between IS Domains. These IOOT's are shared to prepare ISs (including PSs) for asynchronously envisioning and negotiating a particular exchange and eventually recording and tracking actual change and Usage of Concepts as CIOOTs (Complete IOOTs). The IOOT is determined by the DC, its DCAL, its DCBAL and its DCAAL (see below definitions). Other properties such as those represented by the CID of the AIOO also determine the extent of what is included in an IOOT.

Complete IOOT (CIOOT) is a grouping of IOOs that represents a change in its entirety such that a given change is fully represented or defined within a CIOOT. A CIOOT must have all the elements or IOOs of a change completely specified. (e.g. all 0 or 1's in the CID) An IOO of a change, including future prospective change, is completely specified when each state and Value of (each dimension of) each object involved in a change is known by all parties involved.

Data Object Instance (DOI)—set or packet of data (including AFFIRM 'messages' that pass between AFFIRM methods, classes, sub-domains, domains, tiers and/or other 'aspects' of an AFFIRM domain or system). Content of a DOI is determined by the IOOT, IODO, CIOOT or other set(s) of IOO that make it up. The uniform structure of a DOI across AFFIRM networks, systems (e.g. servers), tiers, domains and/or other 'aspects' of AFFIRM help give AFFIRM its unique quality and value.

Link ID (LID) is like an object ID that uniquely identifies an object. It provides a relative or absolute (entire DC) address used to link or path to a (e.g. the next) node or data object in a domain. It is a field or part (Basic Element) of the uniform structure of each data object (IOO) or record. It is included in the preferred embodiment, but it may not be necessary in all embodiments of AFFIRM.

Option (Concept or Usage) ID (OID) is a LID used to identify a generic option, class or Concept or a specific option or Usage.

Item (Type or Entity) ID (IID) is a LID used to identify a generic item, class or Type or a specific item or Entity. An Item Type is a subtype of one or more Options and an Item Entity is a subtype or specific instance of a Usage.

Object Class ID (CID) is an identifier of the state of an object in particular dimensions, in relation to the IS or other HS. It is the name of the files in which data is stored. Therefore, the CID specifies how data in an IS or other HS's Domain is partitioned or stored. Embedded in the CID is all sorts of state information about the object, e.g. whether the object is a Option or Item, singular or plural, general (Concept and Type) or specific (Use and Entity), potential or actual, and proposed or affirmed, as well as the active or residing dimension for the object. It is a field or part (Basic Element) of the uniform structure of each data object (IOO) or record. It is included in the preferred embodiment, but it may not be necessary in all embodiments of AFFIRM.

Object Label (OL) is a word used to describe a Concept or Usage or a name used to describe a Type or Entity. It is normally a field or part (Basic Element) of the uniform structure of each data object (IOO) or record. It is included in the preferred embodiment, but it may not be necessary in all embodiments of AFFIRM.

Object Description (OD) is a description, definition or other information about an object. It is normally a field or part (Basic Element) of the uniform structure of each data object (IOO) or record. It is included in the preferred embodiment, but it may not be necessary in all embodiments of AFFIRM.

Object Universal/Unique Resource Locator (URL) is a unique relative or absolute address used to locate and access the media or other physical object that the data object represents or points to. It is normally a field or part (Basic Element) of the uniform structure of each data object (IOO) or record. It is included in the preferred embodiment, but it may not be necessary in all embodiments of AFFIRM.

Object Rank (OR) is what determines the relative order of the storage or presentation of a data object or record. OR is dynamically recalculated when a data event might change relative OR within a data file or other storage location. It is normally a field or part (Basic Element) of the uniform structure of each data object (IOO) or record. It is included in the preferred embodiment, but it may not be necessary in all embodiments of AFFIRM.

Object Value (OV or Value) is a value in a data object or record representing an IOO. The value is a quantitative measure or property of the real object the data object represents. It may be the mass, unit quantity or other measure of a physical object. It may also be a Total, Count, Average, Correlation (or Regression) Coefficient, Visualization, etc. depending ONT specification, or if not specified in ONT then determined by default depending on dimension. Value type is determined by an Object's Number Type. Value is used when determining the OR. It is normally a field or part (Basic Element) of the uniform structure of each data object (IOO) or record. It is included in the preferred embodiment, but it may not be necessary in all embodiments of AFFIRM.

Object Media Type (OMT) is what defines the type of physical or digital media the object represents and the type of player/recorder or other interface that should be used to access, activate, control, manipulate or transform the real object that the data object represents. It is sometimes part of URL. It is normally a field or part (Basic Element) of the uniform structure of each data object (IOO) or record. It is included in the preferred embodiment, but it may not be necessary in all embodiments of AFFIRM.

Object Number Type (ONT) is what defines the type of number the OV represents about the object, how that Value is measured, how that Value should be handled in functions, and how that Value should be presented in output. It is normally a field or part (Basic Element) of the uniform structure of each data object (IOO) or record. It is included in the preferred embodiment, but it may not be necessary in all embodiments of AFFIRM.

BID is an interactive code that is derived to or from an AIOOs CID and OR to dynamically determine where the real object is physically located in real multidimensional space, e.g. on a video monitor, and/or where the data object is represented in a data Domain. It is sometimes considered a field or part of the uniform structure of each data object (IOO) or record. It is included in the preferred embodiment, but it may not be necessary for all instances of AFFIRM).

Domain Chain (DC) is the LID or a string of one or more LIDs that makeup a path through the data structure of a domain. A domains structure can be thought of as a type of hierarchical structure only somewhat modified and more complex. As you can traverse through a hierarchical file system by following a path, you can also traverse through an AFFIRM Domain structure using a DC or path. IOOT's including CIOOT's are identified, located, read, handled and written in accordance with their DC. A CID (or BID) and DC is all that is needed to identify and locate any IOO in an AFFIRM Domain. It is sometimes (when it is the LID) considered a field or part of the uniform structure of each data object (IOO) or record (included in a preferred embodiment), but may not be necessary for all instances of AFFIRM).

Active Input Output Object (AIOO) is an IOO that is the activation or anchor point of an IOOT. It determines the Active Link of the DC. The AIOO is designated by the user, record or interface to control dynamic Domain and Object (data and real) manipulation functions, particularly functions such as send and receive that involve handling of IOOT's and physical transformations that involve interpreting, enacting and/or recording CIOOT instructions.

DC Active Link (DCAL) is the active link of the DC that is determined by the AIOO. It is used to determine what is included in an IOOT. It is determined by which object is active (in focus) when the IOOT or IOOD is created (e.g. what button is highlighted in the GUI at the time a message is Sent).

DC Before AL (DCBAL) is the part of the DC that specifies part of the domain made up of the parents of the DCAL that will be included in an IOOT.

DC After AL (DCAAL) is the part of the DC that comes after the DCAL. The DCAAL represents or specifies the inclusion of subsections of a Domain in an IOOT. The IOOT includes all or multiple children or sub-items on down from the DCAL location and potentially all or multiple sub-options on down from the DCAL in the hierarchy of a Domain. Other properties such as the CID of the AIOO also determine the extent of what is included in a IOOT.

Active Primary Processing Method (APPM)—a function, process or method that can or is authorized to create CIOOT at the request or service of a given subject and/or its domain.

The above terms, objects and other aspects of the present invention are considered part of the invention in the sense that their definitions make them distinctive and useful. This will become even more apparent in light of further specification, claims, and drawings to follow.

In one embodiment, the present invention is directed to a computing architecture and method for managing the socio-economic interaction of any entity or network of entities (e.g. single private individual, formally organized closed group, self-organizing closed group, or open public group, etc.), essentially comprised of: (a) a uniform subject and object oriented data structure framework where each real entity represented in the system is referenced by a main subjective domain where it is the Home Subject (HS) and also by other reference objects located in other interacting domains where the real entity is reflected as an object; (b) uniquely addressable and accessible locations for each AFFIRM Domain in a network space; (c) subject and object oriented application programming environment that enables Home Subjects that don't know the syntax of a scripting language to create, access and operate applications to manage interaction from within their domains by bilaterally interacting with other domains in the process of planning, proposing, selecting, instantiating, staging and modifying reference objects referring to other entities and interactions with them; (d) reference objects and bilateral links representing new bilateral interactions or changes are able to be created and proposed by one Home Subject and approved by another each in their respective programming environments or domains with each relevant AFFIRM Domain being updated with reference objects that represent the state of the change from the perspective of that domain's Home Subject; (e) reference objects for agreed changes can include bilateral links representing the joining of two Home Subjects and their PDs in a partnership agreement that will exist until one of the Home Subjects decides to dissolve or discontinue the relationship; and (f) bilateral discrete messaging, sharing or interaction mechanism where any reference objects, particularly in the uniform data structure (described herein), can be sent by the Home Subject of one domain in its prescribed structure to one or more other partnering domains to be received by their Home Subjects.

BRIEF DESCRIPTION OF THE DRAWINGS

The accompanying drawings, which are incorporated in, and constitute a part of, this specification illustrate several embodiments of the invention and together with the description, serve to explain the objects, advantages, and principles of the invention. In the drawings:

FIG. 2 is a depiction of a Landscape of Competitive Systems that currently must be combined and integrated to satisfy the needs depicted in FIG. 1;

FIG. 4 shows a highly insecure state of security in today's systems;

FIG. 18 shows a Partner Inspiration Matrix (PIM), which is a preferred way of breaking down components and stages of change to plan specific costs and benefits, predict overall impact, guide transformational change and monitor actual value-add resulting from interaction of multiple real entities;

FIG. 24 shows parts of the uniform record (Input Output Object—IOO) that are editable from the browser by the data owner, guardian or other authorized designee in this particular AFFIRM implementation. In this embodiment, the URL field can be a link to any media accessible on the Web. This URL field can be filled in manually by a domain owner (end user) or automatically populated by an upload function selected by the user with the appropriate file and server Internet address selected by the user for the uploaded media (Notice the "Upload" button in the bottom of the edit window also showing uniform record properties for the active button object). These views show just one way that a GUI implementation of AFFIRM could be implemented;

DETAILED DESCRIPTION OF THE INVENTION

Figure 1:
FIG. 1 is a depiction of main goals and interactive processes needed to nurture synergistic relationships and knowledge in a learning individual or organization.

In general, an embodiment of the present invention comprises uniform data structure adopted in computing device to efficiently store, distribute and process data in a variety of applications. Said data structure comprised of multiple complementary subparts that together and independently facilitate communication of inputs and outputs through one or more defined interfaces to facilitate secure access and coordination between an individual subject and other real (physical) entities. Methods are disclosed that (at least in the preferred embodiment work in tandem with the disclosed data structure and interface components to) enable given subject(s) (through their AFFIRM subject domains) to interact as subjects (in a secure and easy flowing manner) and be interacted with as objects (e.g. created, represented, designed, constructed, discussed, observed, possessed, owned, licensed, used, implemented, tested, graded, ranked, scored, apportioned, evaluated, communicated, negotiated, transacted, learned, developed, integrated, nurtured, coordinated, etc.) by other given subject(s) and in the process determine the merit (quality and meaning), worth (quantity and value) and significance (impact on others) of the given Subject(s) throughout their entire life-cycle. Methods are also disclosed that may work in tandem with the disclosed data structure and interface components to enable and require given single human user(s) or other individual personal subject(s) (e.g. legal corporations) to maintain exclusive self-control over at least one data domain (a Personal Domain) that represents themselves (and their relationships). These exclusive data domains, organized according to the disclosed data structure, each act as an interface and regulating mechanism through which an individual personal subject (owner) manages (plans, organizes, motivates and controls) and is accountable for their actions and their impact on other real entities. Coordination is achieved through the disclosed mechanism by having the complementary actions of each real change enacted twice, first through an asynchronous (interaction) planning and/or negotiation process that progresses as a result of successive message passing and/or mutual agreement and then as real synchronized coactive implementations of the interactions upon established times and/or other events. In this way, given synchronized clocks, independently controlled yet interdependently effectual change can be implemented at the same time, even in distant locations. An interaction management mechanism monitors the stage of each change process at one or more levels of detail or aggregation. In the process each individual personal subject can use their personal domain(s) to anticipate potential changes and their effects based on data representing expertise or experience (including information about their potential deeds valued based on the actual unmet needs they have the potential to meet of others), decide whether to agree on specific proposed changes or interactions, compare expectations with actual outcomes, and use past outcomes to predict future outcomes. Another mechanism processes, distributes and stores this experiential information and uses it to guide future action. There is also a process and/or mechanism that allows individuals to keep their own dictionaries of words they use and their meanings while contributing to socially building an ontology of words and their conceptual meanings within one or more different networks or social contexts in which they are involved. The mechanism designates each given concept or other object with a code or Link ID (LID) (at least in the preferred embodiment). Upon creation of a new concept, the LID is randomly generated by this mechanism, saved in a new IOO for the new concept within the concept author's domain and used to create a bi-directional link between the position within the author's domain where the concept is created and a new concept domain that is also created. An IOO for it is also placed in appropriate Concept List(s), depending on who the author wants to make the concept accessible to, which can include being open to the public, AFFIRM network, or specific partners. The same LID code is received, through transmission within an IOO, by other domains that use the concept. When a domain uses a concept for the first time, an IOO with the LID is saved within the using domain in the appropriate position for the given concept. This position is known as a result of its location in an incoming message or as a result of the domain user adding it in what is considered an appropriate position from an accessible Concept List. This later method can be a result of the concept being on a Concept List that is accessible to the using domain. Whether the concept is shared with the using domain as part of a message or selected by the user of the using domain off a Concept List, it can be in any dimension (column on the preferred embodiment of the GUI) that is appropriate, other than the first (0D), e.g. as a Type (X diagonal header in 1D), an attribute (a in 2D), benefit (b in 2D or 3D). This Link ID for the concept is then used to link to the given concept's domain from those other domains that use the concept. A message in the form of the IODO for its use location is sent to and placed in the Concept Domain when the concept is used. When a user wishes to use a different word to represent the concept this word is recorded in the Label Field by the user and both recorded in the user's Concept List and also in the domain of the Concept (in the form of a CIODO). In this way the concept domain knows what other words are used to describe the concept. So all communication and interlinking of information about the concept is based on the LID of the concept, but if a domain uses another term to describe the concept that is what is used to label the concept in that given domain. This mechanism enables individuals who use different words or languages to refer to the same concept or objects, e.g. across different cultures or fields of knowledge, to better communicate and understand each other. The conceptual meaning an individual subject user refers to when utilizing a word in a particular context, that can be inferred based on the logical architecture of the invention's data structure, effects the conceptual meaning attributed to the words or other symbols in the ontology of domains that share and represent a use context, e.g. field of study, with the individual subject (user).

The technical challenges solved in the present invention overcome the above mentioned limitations with prior art and provide other unique and useful functions that are significant. The invention should be considered both in whole and in part. Each benefit or utility and the part(s) of the invention that facilitates that utility should be considered as distinctly separate claims or inventions. It is also true that the invention as a whole provides utility and therefore should be considered an invention in whole as well.

Several valuable economic benefits will accrue to socio-economic entities that use the present invention to organize themselves and their participation in collaboration networks. These benefits are a direct result of the innovations present in this invention. The benefits primarily result from the way the invention can facilitate the secure management of the economic/business affairs of unlimited numbers of independently distributed and located economic entities, the ability to converge them into common collaborative organizational structures on demand. The technology enables users to propose and visualize collaborative alternatives, manage collaborative relationships, keep track of the value created by each collaborating entity, and even equitably share gains with participating parties.

These valuable business functions are feasible because of the technology's innovative architecture and processing methods that facilitate both analysis and transactions in a closed feedback loop. The methods that make it possible to do this are unique and unprecedented. Some technical areas the innovations impact include: Peer-to-Peer Network Computing Architecture, Authorization and Access Control, Performance Management, Information Personalization, Distributed Data Management, Partitioning & Processing, Graphical User Interfaces & Applications, Application Generation, Knowledge and Ontology representation, Knowledge Delivery & Syndication Protocols, Enterprise Application Integration, Internet & Mobile Device Services, and Privacy & Security.

Peer-to-Peer Distributed Network Computing Architecture—The advanced functionality of the technology is achieved with highly sophisticated yet efficient procedures made possible by a uniform subject and object oriented architecture that enables distributed processing of data objects on a peer-to-peer basis, while being cognizant of and keeping track of subject and object grammars. This architecture also provides a uniform yet flexible way to both distribute and integrate the data that makes up all the different knowledge bases on demand. In peer-to-peer file sharing of music and other digital content it is particularly difficulty to manage distribution rights, so it is currently difficult to directly invoice for consumption of digital content in a proactive way. An ability to do this would help this situation. This is something the present invention does, and also, when content will be shared between individuals using software based on the invention, it will not be the actual content files being sent. Rather it is categorized (structured) links to content on other content servers that are passed between users. Therefore, this will be an efficient and effective way of sharing "playlists" and other information, without, automatically empowering or requiring the user to have the content. Then it is up to the authorized content server (most likely the content producer or provider themselves) to manage the streaming (or downloading) of the file direct to the end consumer. This will have the added ability to control licensing fees, etc. The authorized content provider or server also then has a better opportunity to build a relationship with the end consumer.

Authorization and Access Control—Whenever it is important to identify users before access is provided to digital systems, or content, identification systems, like bioID, etc., become important. To work well these systems need to work with systems and content that can efficiently and effectively partition content and system resources by user, and the present invention, again, solves this problem better than current technology.

Real-time Performance Management—The architecture also makes it possible to measure and manage the performance of an enterprise or collaborative effort, including the individuals involved, in real-time. Unlike most analytical applications, with AFFIRM this is achieved using the same data architecture as that used for transactions. Thus, real-time analysis is possible without the normally required data export, transformation and loading (ETL) from transactional systems to analytical ones.

Information Personalization—Configuration of appropriate information for a given user is converged for each individual situation (into individual or personal domains) based on what is shared by content providers or partner users. This creates different personalized or customized information for each user.

Distributed Data Management, Partitioning & Processing—Through applying the proprietary architecture, the technology can partition and process data in infinite (or an unlimited number of) separate (sparsely populated) locations and still bring data together when appropriate on demand. In this way the technology supports scaling to unlimited numbers of individual users, servers, enterprises and industry segments. Also, the data can be organized according to user defined schemas or data structures and still be able to be merged into the uniform AFFIRM data structure.

Graphical User Interfaces & Applications—The technology's graphical user interface (GUI) enhancement can coexist with any Internet content delivery system to improve the organization and access of context specific knowledge. All applications are accessible through the same standard interface, thus giving users familiar with one application, the ability to operate any application without any relearning. The GUI can morph to any size, depending on the screen size available.

Application Generation—Specialized or industry specific applications can be developed or "programmed" by those that poses the specialized knowledge without the need for a separate technical person or step requiring knowledge of a computer coding language.

Language/Symbol Processing, Knowledge & Ontology Representation—Comprehensive studies of language (e.g. semiotics) distinguish pragmatics as an important complement to syntax and semantics. Syntax is about rules of expression. Semantics is about defining conceptual meaning. Pragmatics is about shaping language/symbols through use. Modern digital communication networks and computer programming methods now address the first two (with capabilities like those found in the "semantic web" still under development) Pragmatics is not well handled in or with current art and therefore we provide a much needed practical value by enabling what we call the "Pragmatic Web".

Knowledge Delivery & Syndication Protocols—The technology has one standard way of communicating packets of any type of knowledge. This enables databases to evolve and integrate easier and improves the performance and fault tolerance of the messaging system without limiting the type of knowledge that can be shared between collaborators.

Figure 6:
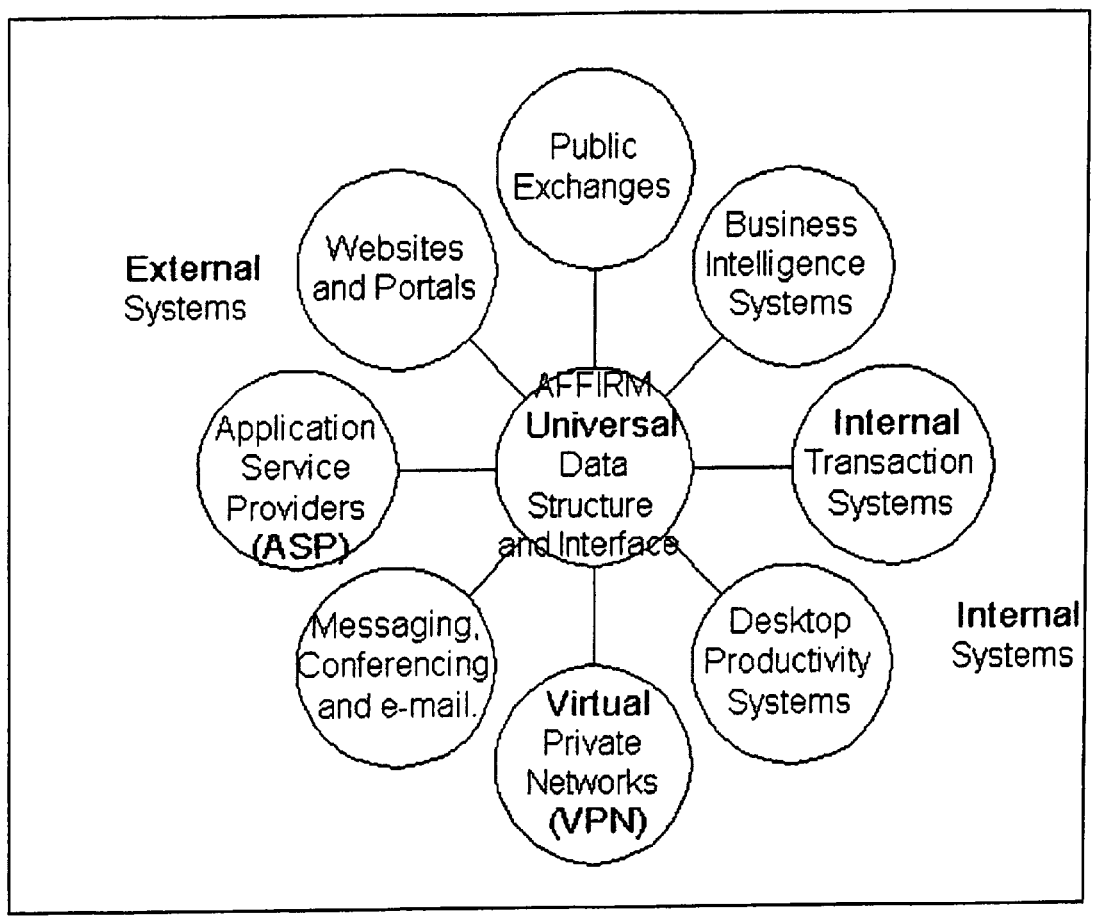
FIG. 6 shows an example of how an AFFIRM personal domain can integrate access to all sorts of applications across a Value Web Platform.

(Cross) Enterprise Application Integration—By providing a uniform data structure that can store virtually any type of structured data and maintain its integrity, we provide a common format that different types of structured data can be converted to as an interim stage in the transformation of data between applications needing structured data in different forms to pass between them. By providing a uniform interface we enable an individual entity such as a user or other functional device to easily control or integrate with other disparate parts of a greater system connected through a communication medium. (For an example, see FIG. 6—Personal Domains and Value Web Platform)

Internet & Mobile Device Services—The technology's knowledge protocol and GUI features make our infrastructure technology ideal for portable devices asynchronously connected through packet switched IP protocols with limited screen sizes and processing power. The combination of these devices with our infrastructure will enable the application of the right knowledge, to the right place, at the right time, no matter where that may be.

Security & Privacy—By combining the inventions data partitioning features with standard cryptographic and public private key methods a highly secure infrastructure for collaboration and exchange has been created. It provides protection while enabling the simplest implementation and maintenance requirements.

One embodiment of the present invention is directed to the enhanced ability to manage and coordinate change—resulting from how advanced technology enabling structured data to be logically distributed within and across domains by state of change as well as levels of relatedness and aggregation.

Another embodiment of the present invention is directed to the enhanced ability to leverage resources, knowledge and relationships—resulting from advanced technology enabling structured data to be efficiently and effectively distributed across domains in mutually meaningful and efficient as well as effective ways.

Lastly, another embodiment of the present invention is directed to the enhanced ability to secure intellectual property and other private information resulting from advanced technology enabling structured data to be secured within domains while coordinating its use across domains.

The above embodiments achieve their objectives by providing new data record structures, new data communication networks, new data partitioning methods and new data dictionaries. The above embodiments can be used together or separately.

Figure 7:
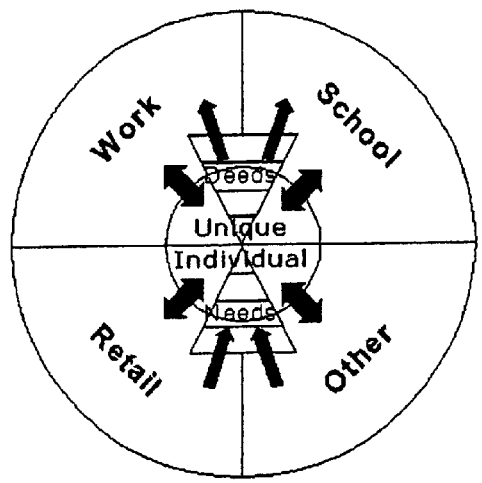
FIG. 7 shows a unique individual's Personal Domain or value web hub.

AFFIRM includes uniform data structure adopted by computing devices for storage, distribution and processing in a variety of applications. The uniform data structure is comprised of multiple complementary subparts that together and independently facilitate communication of inputs and outputs through one or more defined interfaces that facilitate coordination between individual subjects and/or other physical entities. Methods are also disclosed that work in tandem with the data structure and interface components to enable and/or require a single human user or other individual subject, using the invention or participating in a network using the invention, to maintain exclusive self-control over at least one personal domain (PD) virtual domain or value web hub that represents themselves and their relationships. See FIG. 7—A Unique Individual's Personal Domain (or Value Web Hub). It is through such a Personal or Home Domain that an individual subject (IS) manages interaction between parts of itself, i.e. its other domains, including sub and supra domains where it is the exclusive Individual Subject (IS), with concept domains and with domains of other individual subjects (IS).

These exclusive virtual domains organized according to the disclosed data structure act as an interface through which individual subject owners regulate their actions that impact or interact with other's actions and effect their environments. By virtue of having exclusive control of a domain using the disclosed structures, interfaces and methods, an individual (personal) subject is able to regulate their interaction with and impact on the environment. Individual (personal) subjects control and/or manipulate their environment by providing command inputs (proposals or orders) to their domain(s) that represent potential and/or actual commitments to future action or change.

The domain structure and change (interaction) protocol require that any action that affects or is effected by other independent (personal) subjects (each with their own exclusive domains) be explicitly or implicitly (through pre-authorization) agreed to by all the interacting entities. Proposed changes are first sent out from the initiating or proposing domain to potential interacting entities. These interacting entities may include any other domains using the disclosed structure and change protocols whose controllers have agreed to partner with the initiating entity. When two or more individuals each have a personal domain they are able to manage interaction much more fluidly, securely and intelligently.

An AFFIRM network may include group domains made up of multiple individual members (e.g. teams or organizations), but each individual member, participating in a secure network, must have at least one exclusive domain from which each individual manages its interactions with the group domain. (See FIG. 8—Collaborative Value Web Hub Example You/Me/We) In this way, by enabling the ability to also create individual group domains (essentially individuals made up of multiple individuals), different levels and structures of organization and interaction can be achieved in a flexibly evolving communication network that explicitly implements and effectively represents the social network that is most appropriate for a given situation. These group domains act as collaborative process domains with shared control instigated from the individual personal home domain(s) of member(s), personnel and/or other authorized executors (each as a "Partner" of the group). Each would be expected to act in accordance with the governance policy established by domain owners and/or members. And the specific actions of each Partner is known and tracked by both the individual's personal domain and by the group domain, so both have a record of proof of what transpired. This provides enhanced accountability for action and the security that goes along with this. AFFIRM technology ensures that a Personal Subject has exclusive control of its PD and that impact attribution can be given to the actions and members that deserve it, whether positive or negative. It is possible to have this enhanced attribution (even non-repudiation) by using AFFIRM in private, semi-private and public networks. The added accountability and/or transparency achieved using AFFIRM technology should motivate both improved performance and improved security. In order to enhance coordination and security, each real interaction requires data to be changed and/or affirmed by all involved partners. Each data change is controlled and/or consented to from the exclusive and separate database or domain of involved individual(s). As a result, the data owner, i.e. the HS or owner(s) of the domain where a piece of data is created, has complete control over data dissemination. They are able to control which partners are sent each piece of data (IOO) on an as desired and/or as needed basis. So if a certain specific piece of data is not needed for a certain participant in a transaction (group process) it is not shared or accessible for them. The data owner has complete control over who and/or which other domains have access to each specific piece of data of theirs, on a transaction-by-transaction or share-by-share basis. Also, each individual has an archive of each interaction, including what data was shared with other domains, and again, a domain is not able to send data to other domains that it did not create and therefore a record is available of all domains and exclusive home subjects (HS) that have access to each particular piece of their information. By controlling the dissemination of data to others a data owner has control over their own data and data only flows to necessary parties when it is considered appropriate by the data owner. This data sharing and security protocol obfuscates the need for third party security personnel and provides an audit trail of who has had access to what information. As a result there is less cost for security personnel, less chance of third party abuse, and greater security for private information and intellectual property. Also, by not putting all of an organizations data in one database, it limits the amount of people accessing a given secure database from many potential abusers of access rights to one exclusive and responsible individual subject (IS). Not only does this minimize the need for write locks on data (in a database), but also minimizes the risk of data security breaches. (See FIG. 9—Individual Responsibility, Authority and Security)

In the case of a hospital (or health care) patient, an individual patient would only share their personal private information with others on an as needed and trusted basis. It is a basic requirement of the Health Insurance Portability and Accountability Act (HIPAA) that a patient should be able to be in control of their medical records like this, but other systems are not able offer this type of control to individual patients. Therefore, most healthcare providers require patients to give up their HIPAA rights before they will treat a patient. (See FIG. 10—Expanding Universe of Trust and Application) One can see from this diagram, that as data is shared out from a specific personal domain to other semi-private or more public domains, data can be increasingly "de-identified" and/or pared down to include less specific or personal information. These more public or more specialized domains can include granular records from multiple other domains (See FIG. 8—We) that can be aggregated into more general group summaries or more abstract individual identities. These aggregate or more abstract domains, that are still considered individuals in their own right, e.g. corporate domains, can also be used as search directories. They are basically domains where the unit of analysis, attribution or assignment is represented and/or managed on a more abstract or aggregate level. It is the ability of domains to fluidly share and separately locate data between and among themselves, without the difficulties and insecurities found in other system types, that makes this possible and/or more practical. Also, unlike with other systems, with AFFIRM it is also possible to communicate back to the more specific, private or granular data source domains to alert the source, e.g. a specific patient, about a specific threat or opportunity that should be considered given the source's general condition. More will be explained about how data is fluidly shared later.

Figure 11:
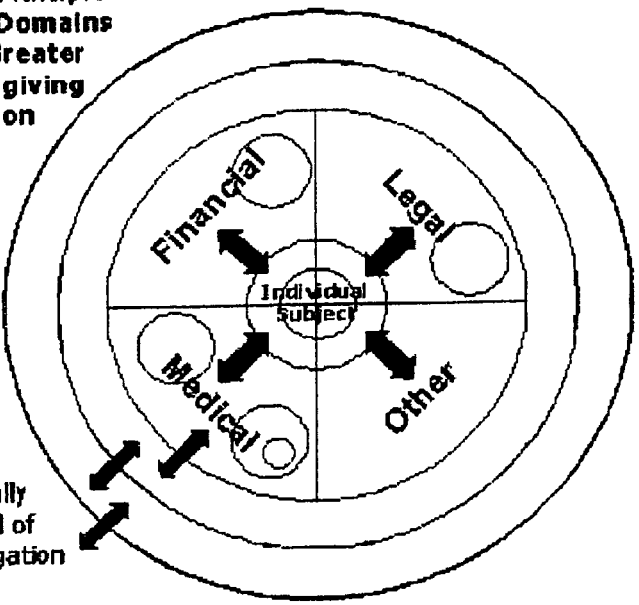
FIG. 11 shows a new paradigm in security achieved with AFFIRM.

Also, with the ability to have each individual have their own individualized databases or domains comes the ability to have more that one domain per individual. An individual subject's AFFIRM data can be broken into multiple domains according to various organizational schemes. For example data can be partitioned in separate domains based on different levels of aggregation (granularity or specificity) and/or different amounts of relatedness. For example, medical information for a given individual could be in one separate domain, or medical procedure information at the total cost level of aggregation could be in one separate domain. An individual's personal(ized) domain could include separate view(s) from within one or more different given domain(s), depending on the security and level of dimensionality needed for the significant perspectives roles that need to be observed and managed by a given individual personal subject. Also, in a preferred embodiment it is possible for users to access all separate but related views, whether they are in separate domains or not from one personal domain (PD). For example, an individual's view of a group domain would be a standard view within that individual's personal domain. A group or organization domain would be divided into as many logical perspective(s) or "position view(s)" as would be appropriate and these would be divided up among personnel as appropriate for each individual personnel's position(s). The system is particularly helpful in easily managing the complex array of views needed to effectively manage a global "matrix style" organization. In any case, as the number and variety of domains an individual has and/or uses increases the security of each piece of the whole set of AFFIRM data increases. This is because each domain of data will be separately protected with separate passwords or bioID type authentication. (See FIG. 11—A New Paradigm in Security)

Figure 19:
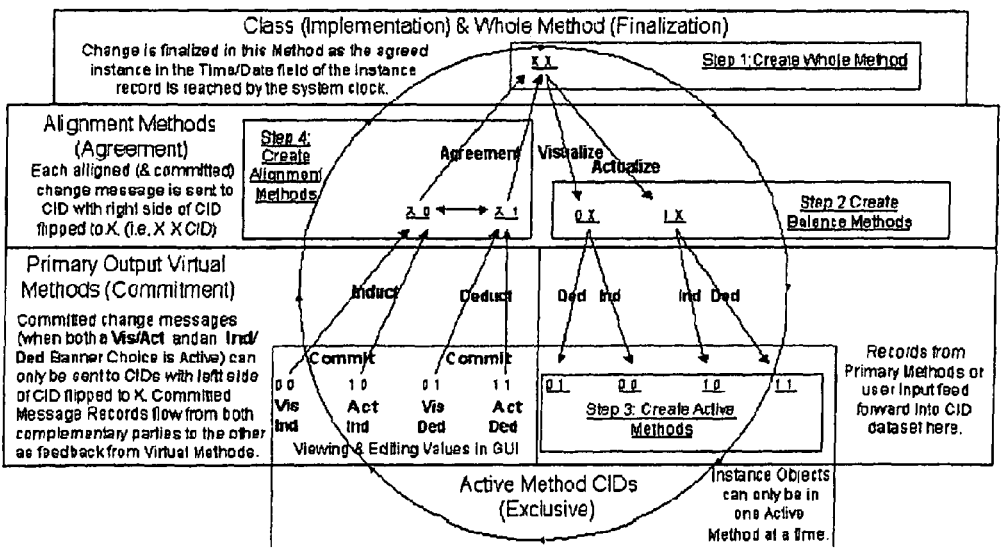
FIG. 19 shows a preferred embodiment of the way AFFIRM implements classes and methods (for new or existing domains/entities and processes) according to uniformly consistent and logically ordered CID transformations. AFFIRM uses the same type of successive CID transformations to coordinate processing & flow of data through logical stages. This together with AFFIRM style meta-modeling frameworks enables logical and flexible processing of data in a domain without rewriting application software programs.

When all individual subjects interacting in a particular potential change, i.e. involved domains, have either proposed or affirmed a change for an agreed time this change is then scheduled to happen in all interacting domains. Then at the scheduled time, which may be immediately, the domains of all individual subjects involved in a planned change simultaneously cause their respective acts in the change or interaction to really happen. Through this mechanism real (physical and metaphysical) change must be enacted twice, first as an asynchronously negotiated plan, and then as a real synchronous implementation. Since a plan is normally not allowed to be actualized in reverse or without the interacting party's approval (affirmation or informed consent) (See FIG. 19), there is assurance that the creators and participants in the visualization and actualization of a plan (idea, concept, etc.) are all informed throughout the entire lifecycle. The lifecycle of a change emerges from visualization to actualization by incorporating inputs and outputs along the way on various dimensions (FIG. 19 shows the first 0D dimension, but the other dimensions essentially operate the same way, while being dependent on other dimensions. For example visualization of general Potential (ideal) change happens in 4D or above and matching of incremental change with specific partners happens in 5D or above. Initiation of an incremental change, e.g. adding a new partner, starts with the visualization of a new incremental change in the transition between the last and first columns ("vis" in 6D/0D dimension), e.g. for a prospective new partnership/interaction (See example vis/act of new partnership in FIG. 19). These incremental changes can represent inputs or outputs both potential or actual and therefore can represent flow of exchange in multiple directions and emergence of change from the imagined idea or ideal to the actual. Then actualization of an affirmed real change can occur e.g. implementation of a new partnership in the first dimension (with an affirmed "act" in 0D).

These capabilities are able to handle and model non-linear change, keeping track of data in these various successive dimensions for example also enables the coverage of data representing dynamic processes across the range statistical moments, e.g. from counts, to mean in the first moment, to variances (as well as covariances, correlations, regressions, etc.) in the second, scewness in the third, kurtosis in the fourth, among just a few standard measures. This enables researchers and evaluators as well as authors or creators and other contributors to science, engineering and other value-added process to better understand their work and control the use (and licensing, if desired) of their creations. Also, quantitative (and qualitative) feedback measures, confirming (through "updating", etc.) the effect of planned and real actions, are triggered and passed between interacting domains (from the domain or location of the real effect to the affecting (source) domain(s). (See FIG. 12 Real-time Interaction through the External Messaging Aspect of AFFIRM between Multiple AFFIRM Systems, from One Single AFFIRM Instance or Implementation)

Figure 12:
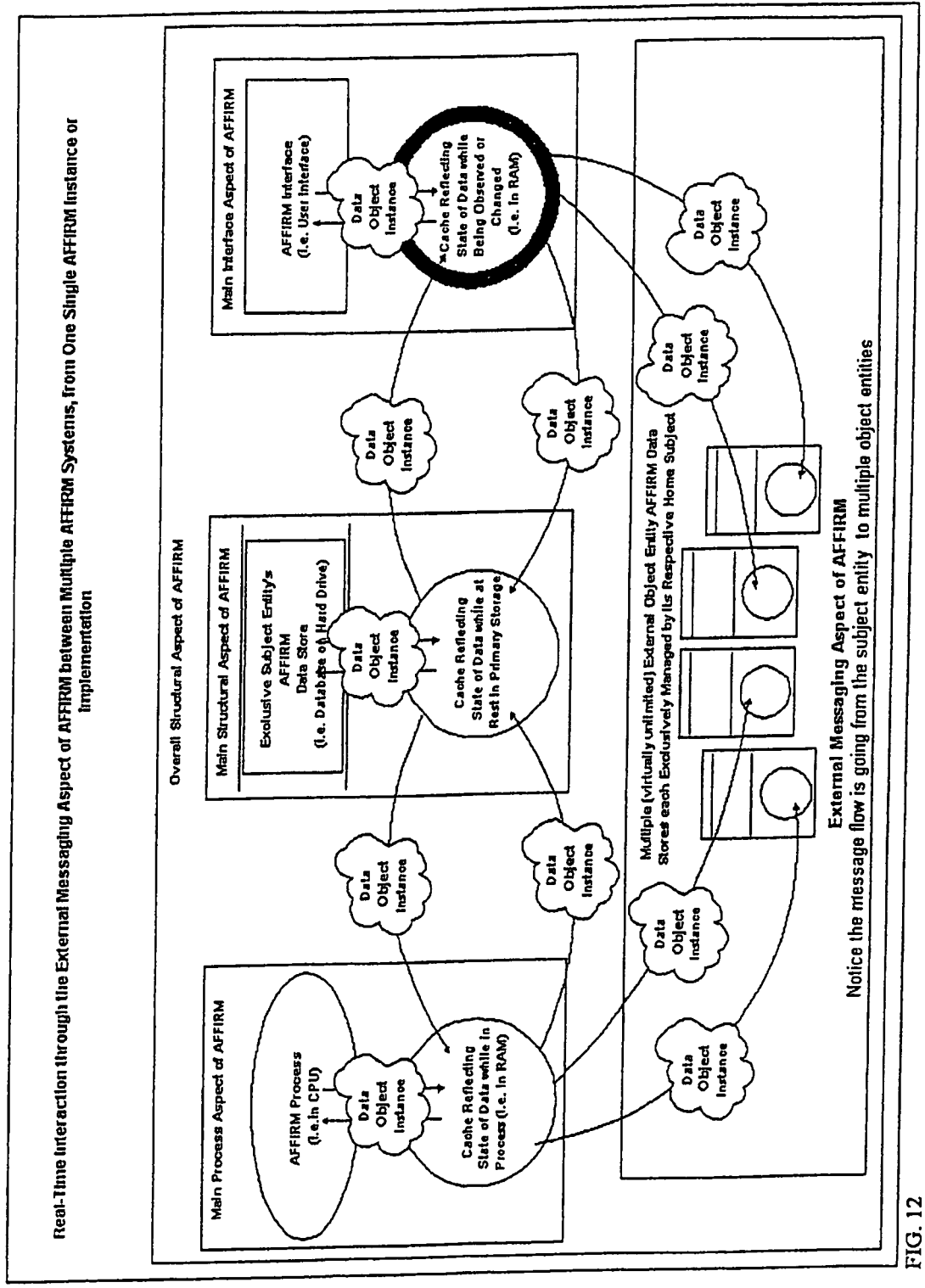
FIG. 12 shows the real-time interaction that takes place between the three main aspects of an embodiment of the AFFIRM and through the external messaging aspect of AFFIRM between multiple AFFIRM-based domains or systems.

FIG. 12 Shows the real-time interaction through the external messaging aspect of AFFIRM between multiple AFFIRM systems (domains, servers and/or networks), from one single AFFIRM instance or implementation, with its three main aspects of AFFIRM for a given home subject entity, to the data stores of other external object entities. Each domain is exclusively managed as an AFFIRM instance by and/or for their respective Home Subject entity. Messages or data object instances (IODO or IOOT made up of IOO and their Basic Elements of the AFFIRM data structure) can only pass to external entities (other domains) that have approved of a data sharing partnership with the sending entity. If the receiving entity desires, (pending) messages can be reviewed and approved prior to receiving (a message into the receiving domain's server).

The same kind of one to many relationships (from one given home subject to many external object entities) can exist for all external AFFIRM object entities where they are the Home Subjects. In fact every instance of a relationship (e.g. partnership) in the process of being initiated by one subject entity (by creating and sending a proposal message in the form of a Data Object Instance), has the potential to have a reciprocal message returned in the form of an affirmation message (Data Object Instance) from within an object entity (where it is the subject). Once a proposal gets its matching affirmation, from interacting parties, the relationship is consummated, and the mutually agreed action/event (e.g. the creation of a partnership) is set to take place at the prearranged time. Once a partnership is created between domains, there are reciprocal (bi-directional) links between the two domains. The fact that there must be a reciprocal link, or a complete circuit between two related (e.g. partner) domains or objects, for any link to actually exist, or any communication (subsequent sending of data between the domains) to take place, enables AFFIRM to prevent "lost links" (e.g. URLs to non-existent locations) and unauthorized communication, e.g. spam or denial of service attacks. A reciprocal link can be modified or removed by either party, but since they always have a link back, it is possible to always inform the other of a move, or changed link location, before or as a link is being modified. Also, if one removes a link the other must remove the reciprocal link as well. This is unlike the World Wide Web where links can go only one direction and become a "lost link" when the destination shuts down or moves.

Figure 13:
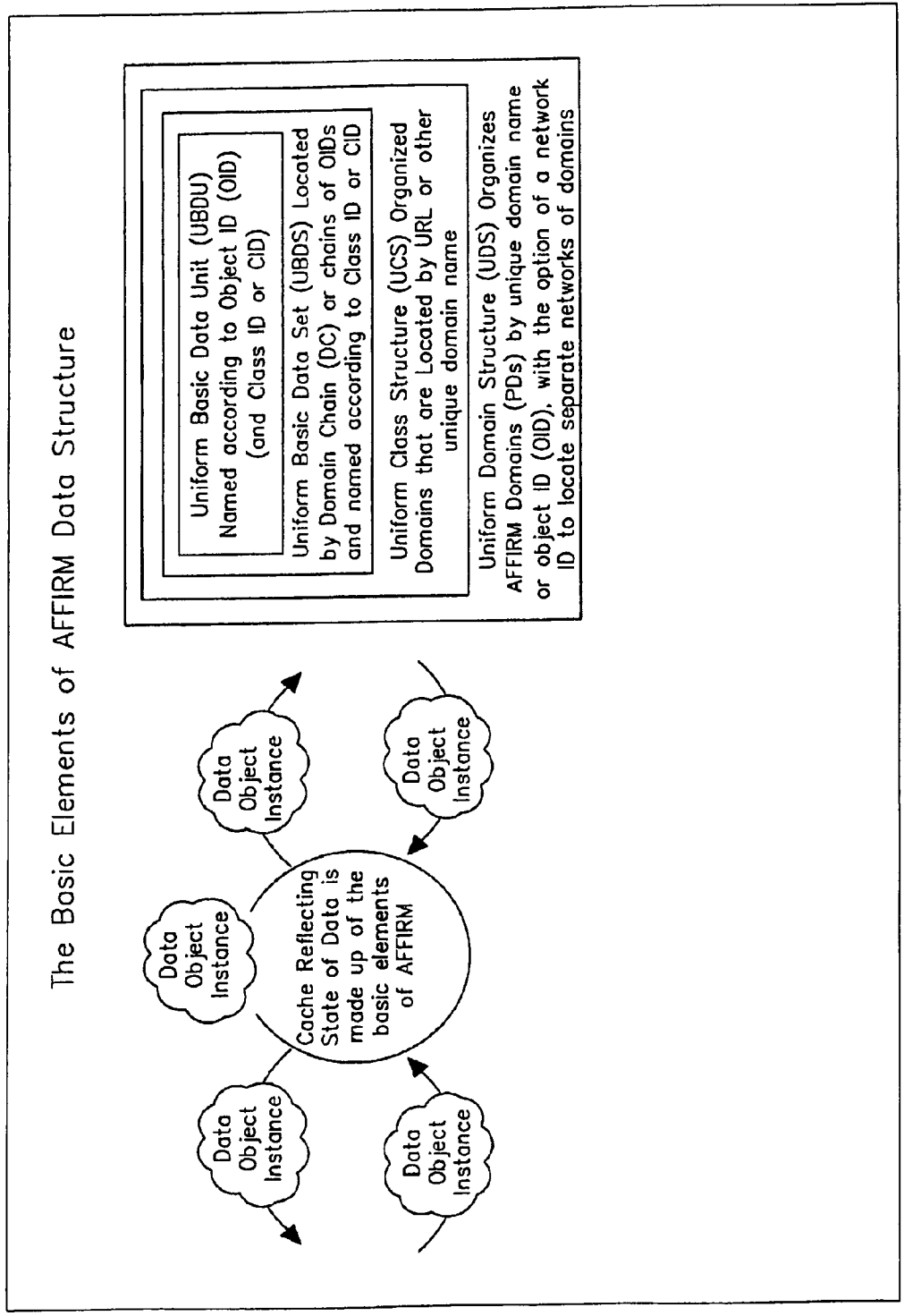
FIG. 13 shows basic elements of a preferred embodiment of the uniform AFFIRM data structure (IOO) that can be uniformly instantiated within and/or between three main aspects of AFFIRM as well as through messaging (in the form of carrier waves over a network or otherwise) between multiple domains or systems that are internally organized and/or interfaced according to the AFFIRM.

The uniform data structure (for a domain or parts of a domain, e.g. IODO or IOOT) is a hybrid graph/tree (network) structure that can be used to represent sets of objects that are logically organized (or structured) in a unique hierarchical form, with objects and their inter-linkages represented on various levels or dimensions. The elements of the AFFIRM data structure are the UBDU, which elsewhere in this document is called an Input Output Object (IOO), which is encapsulated inside of a Uniform Basic Data Set (UBDS), which are groups of data files each of which is named and located according to what is elsewhere called a called Object Class Identifier (CID) and a Domain Chain (DC) within a Domain. Domains overlap in terms of the objects of their data content, but they each have a different or unique subjective perspective (which is that of the Home Subject). Domains all have the same uniform data structure, but have varying levels of abstraction, scope, etc., can be used to represent anything, and are distributed to different part of a network space. AFFIRM Domains are located and linked within a network of domains by bidirectional links that use the Universal (or Unique) resource locator (URL) of each domain (e.g. an Internet Web-based preferred embodiment uses http://www.web_domain_name/AFFIRMdomain_name). So the data structure aspect of the AFFIRM invention can also be described as having four independent yet also interdependent elements, each of which also have their own basic elements. These four elements applied to a computer readable medium enable a computing device to efficiently manage data about an entity and its relationships in real time. The basic elements of the AFFIRM data structure are sometimes referred to as the Uniform Basic Data Unit (UBDU), Uniform Basic Data Set (UBDS), the Uniform Classification Structure (UCS), and the Uniform Domain Structure (UDS). These AFFIRM data structure elements are either interdependently or independently used repeatedly (primarily to structure, store, or cache data) in the various "aspects" of an AFFIRM implementation, the architectural frameworks (for persistent data storage and caching), functions (for efficient data processing) and interfaces (for easy data access and transformation). This AFFIRM caching (of data that comprises parts of a domain)

is made up of one or more UBDU instances within one or more UBDS instances within one or more UCS instances within one or more UDS instances. UBDU instances or UBDU's are what may appear to be redundantly located in other sets of data on the same level (in a class with a 1 or 0 state as well as in an X state) or nested under multiple appropriate higher structure instances (UBDS's, UCS's, or UDS's), but the appropriate location of a particular UBDU in a unique combination of instances of these peer and higher class structure instances makes each UBDU instance unique, identifiable, and locatable within a subject entity domain. UBDU's are quickly and/or directly accessible (without doing a compare on every record) within a UBDS by rank. This can alternatively or optionally be done in other embodiments according to a sort by Value, which prioritizes records for access, but may not provide such a direct access method as rank. The Value field or Object can be any number of value types. In the preferred implementation even the Value field is stored as a string and cast as a number (according to its Number Type) when necessary or appropriate. Each complete UBDU instance points to an object entity. The object entity domain each UBDU instance points to is either a virtual (external) object domain (actually represented inside the exclusive subject entity oriented data store (domain) at an internal address that is derived, relative to the subject, from the actual address where the object is represented as a subject) or an actual (external) object domain where the UBDS instance the UBDU instance belongs to is an Active Primary Processing Method (APPM) (as determined according to data class or CID). An APPM can (or is authorized to) initiate or commit real change (as a result of its instances having evolved through the negotiation process between actor domains (and their subjects) to the 'complete' 'actual' state (all is in the CID). Again, in a given situation (or state) the same given CID (which is appropriately named according to that state) is used to help appropriately identify and locate both the method itself and its instances by sending messages or Data Object Instances (DOIs) (with CIOOTs in them) to either actual inside objects (sub-parts of the current domain) or actual outside objects (in related 'external' domains). DOI's or messages are also made up of (or organized according to) the same uniform data structure elements as the other 'aspects' of AFFIRM (as a mobile cache). Optionally there may be another layer of structure, (e.g. a private network, an Internet domain or a messaging system for a given network), which keeps one network of AFFIRM domains distinguishable from another, but in the preferred embodiment there is an AFFIRM domain (that could be considered to be at another, say network, level of abstraction) for each AFFIRM server. (See FIG. 13—Basic Elements of the AFFIRM Data Structure) The sub-parts of an IOO (sub-elements of a UBDU or fields of an AFFIRM record) are also all the same for a given AFFIRM embodiment (although they can vary between AFFIRM embodiments, i.e. different ways of writing or implementing AFFIRM in hardware, firmware or software). So a significant characteristic or attribute of AFFIRM (that gives AFFIRM value and makes AFFIRM special) is that is that all sorts of applications in all sorts of fields for all sorts of subjects can be created using the same data structure (across a given embodiment of AFFIRM) in all 'aspects', tiers or levels (e.g. data store, cache, process, interface, message, etc.) of a given AFFIRM system.

Figure 14:
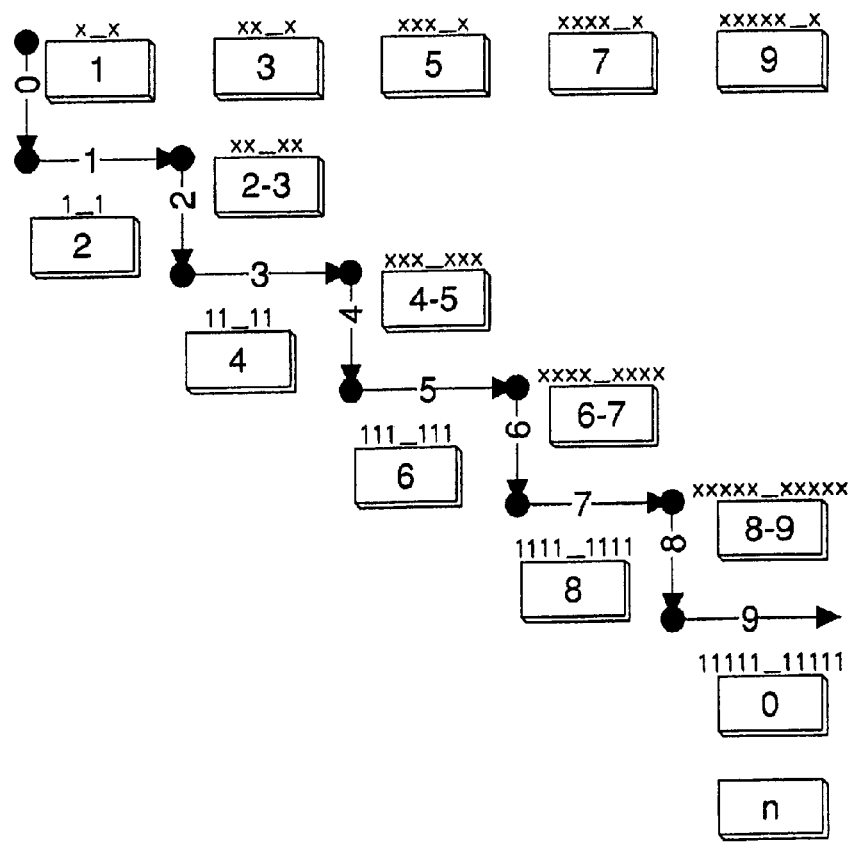
FIG. 14 shows an example of how an instance of data is created or organized in the AFFIRM. It is depicted as it could appear in a user interface or otherwise. Seeing this rough representation of an AFFIRM graphical user interface (GUI) helps to demonstrate how the basic elements of the AFFIRM data structure fit together, since AFFIRM interfaces (e.g. GUI), message protocols (e.g. carrier waves), processes or classes, (e.g. programmed in software and run on a processor) and frameworks (e.g. implemented in memory or storage of computing devices) are all created, instantiated and/or organized according to this same uniform data structure that, once created and/or instantiated can be traversed, read and/or manipulated in forward and backward directions.

An AFFIRM interface (e.g. a graphical user interface or GUI or s data transformer between particular data formats of other systems outside of AFFIRM and the uniform structure of AFFIRM) reflects this data structure, and uses it to interact with AFFIRM based data (stores, caches, etc.) and/or methods. FIG. 14 shows an example of how the data is organized in a GUI. Seeing this GUI like representation of the AFFIRM data structure also helps to understand the basic elements of the AFFIRM data structure described above, since, as mentioned, an AFFIRM interface, along with other AFFIRM 'aspects' (e.g. data stores and caches), is also organized according to the common uniform structure. For example you can see the Domain Chain (DC) embedded in the organization of the GUI like depiction of the data structure. You can see the Class Identifiers (CIDs) that ID each successive UBDS that is accessed to gather or save data records (IOO) for display in a GUI or use by some other interface. Together the DC's (in or made up of LIDs) and the CIDs are used to link through a domain and locate/access any data set(s) (UBDS) or object(s) (IOO) for use in an interface, function or other aspect of AFFIRM.

Any element within an instance of the data structure or a representation of the data structure (e.g. in an interface like the GUI) can be accessed by knowing what is called the Domain Chain which is a string of object ID's, sometimes called a Link ID's (LID), including the one that helps identify and locate the needed element(s) like a UBDS (e.g. file) and/or UBDU (e.g. record) and the CID (file or UBDS name). This CID (class and/or method ID) represents the state of the data objects (IOO/UBDU in the UBDS), the name of the data set or UBDS and the name of the method(s) that can be used to process the data in the UBDS. IOO representing related IOO/UBDU or UBDS are also located in each UBDS so as to facilitate parallel, backward, forward and other (optional) navigations or messages to other objects. The Link ID need only be unique within the particular CID named UBDS instance in which it (the object) is found. In fact, this same LID can be used to represent the same object in other data sets with either different (often complementary, e.g. a CID of 11-00 in one domain may represent the exact same object as 11-11 in another, since one domain's demand/input is another 'partner' domain's supply/output) CIDs (file/method/record/names or identifiers) or different locations (based on different LID's in the Domain Chain). This ability to represent a given object (or component of action or potential change) from multiple perspectives is very powerful. For example, it enables the same object or change to be part of more than one domain and/or level of abstraction and/or to participate in more than one ontology or metrology and/or to be recorded in more than one UBDS (or represented more than one state/class or combination of states/classes). As a result of this ability of the AFFIRM data structure to represent objects (or changes) simultaneously in such a variety of ways, the AFFIRM methods designed to take advantage of this are able to provide an unprecedented level of monitoring, evaluation and coordination functions from different complementary perspectives, levels of abstraction, etc.

It is also possible to access records or UBDU's within a UBDS based on the current Rank of the data object. From the Rank the line number of a record in a sequential file can be determined to enable the (record access) "cursor" to go directly to the record (elsewhere called a UBDU or IOO depending on the context) for quick access without doing a compare on each line to find a particular unique but random or non-sequential ID. This improves the speed of access to a specific UBDU element and enables AFFIRM to efficiently and practically access and save changes to a UBDS and/or an individual UBDU (record) on an incremental and real-time basis no matter how distributed the data sets and units are throughout cyberspace (or other network). The rank also prioritizes data by ordering records or UBDU from most important to least based on the Value of each individual UBFU. This is particularly helpful to humans viewing an AFFIRM interface or GUI since it helps people prioritize or see what to focus on. This reduces information overload. This rank access method the ability to visualize the attractiveness of various changes (using the algorithm depicted in FIG. 15), the ability to account for potential and/or actual value creation from multiple perspectives, and the ability to have given objects appear in multiple locations and/or state representations work together to enable AFFIRM to efficiently and effectively locate the best alternative change(s) (e.g. "option", "decision", "move", etc.) in a "search space" (or set of real options, decisions, moves, etc.), apportion or allocate resources and optimize value creation. Also, a UBDU can be located within a UBDS by Link ID (LID) when necessary. (See CID of the end IOO of the Domain Chain in the FIG. 14) In addition to a 0, 1, or X digit in the CID for each of two properties per dimension there is also a correlate LID segment of the Domain Chain (for each of these CID digits). LID's are usually randomly assigned codes, but in this example the LID's are single digit numbers representing the sequential alternating order of 'items' and 'options' that need to be navigated through in the GUI or data of an AFFIRM Domain in order to access the IOO in the end column or last dimension (although numbers of dimensions can modified in a given AFFIRM instance of a given AFFIRM implementation, an IOO in the end column would normally be an item in the 5th column (of the 'knowledge navigator') of a GUI or the IOO with the CID of 11111-11111 in the lower right of FIG. 14. Each of the single digit numbered buttons in FIG. 14 represent an IOO (record or UBDU) selection from a set of one or more choices available in a UBDS (file). These selections can be made by a user on the GUI or AFFIRM methods and/or interfaces in different procedures. The odd numbered buttons across the top are Option buttons that represent Concept or Use (class) selections and the even numbered buttons going diagonal are Item buttons that represent Type or Entity selections. In the 'knowledge navigator' part of the GUI from the preferred implementation, which is roughly represented in FIG. 14, when the buttons are Concepts or Uses they are Column header Option buttons like the odd numbered rectangles in FIG. 14. Different Concepts or Uses can also be optionally represented in (an incrementally increasing number of) additional column header Option buttons (as you increase dimensions and move over columns in the depicted GUI) that are not depicted in FIG. 14. They would be located in the open space between the top button and the diagonal button in the 3rd-5th columns. More of these Use selections would allow modification of or conversion to other measures from defaults referring to (unit of measure of) Values of objects depicted in the column of an AFFIRM GUI or stored in a dimension of an AFFIRM Domain. When the buttons or objects are Types they are diagonal header buttons like the double-digit buttons in FIG. 14. In the preferred embodiment the LID of these diagonal buttons, and therefore the location where the files and records these buttons represent are found/stored, are a concatenation of the LID for the item chosen in the previous column and the LID for the option chosen in the column header. When the buttons or objects are Entities (individuals, persons, etc.) they are Item buttons like the diagonal one in FIG. 14.

Among other things this data structure enables entities, processes, and their properties to be organized according to a method that facilitates language processing.

AFFIRM enables the pragmatic use and development of language (real-time dynamic communication process between one or more individuals with inherent or agreed structure) and other human culture (tools, artifacts, etc.) by enabling users to create and negotiate shared concept meaning ("what we mean"), apply concepts to specific contexts and objects ("by what we say"), exchange digitized words or symbols (or other creations) and the real objects they represent through different mediums and media ("when we talk about what we do"). The way our data structure enables structures of data to fluidly move (as messages) between AFFIRM domains and the other "three main aspects" (or elsewhere called "basic elements") of AFFIRM (Process, Data Store as in Domain, and Interface, as shown in FIG. 12), as well as the way an object can be represented in all appropriate states (UBDS) (of a generic or global socioeconomic model) plays a large role in enabling this language processing. This structure enables a processing logic to be inherent in the way data is organized. And as a result it is practical to have AFFIRM methods or functions that can access/or be provided data incrementally from different UBDS's (or sources, whether external to AFFIRM or not, e.g. sensors distributed throughout a Subject's environment) as the function is being processed. Also, the inputs (e.g. data to be aggregated) and outputs (e.g. results of an aggregation) and work in process of each method or function can be stored in their respective UBDS those with the previous, subsequent and same CID as the method respectively. This enables a new level of real-time response (e.g. in the analytics of data/knowledge warehousing, mining and discovery, including instant alerts of threats and opportunities) of the AFFIRM system to changes in the environment (that is not available in other systems). This response includes the ability of an AFFIRM based machine (device and/or Domain Home Subject) to discover knowledge (about its environment) and learn incrementally.

Figure 15:
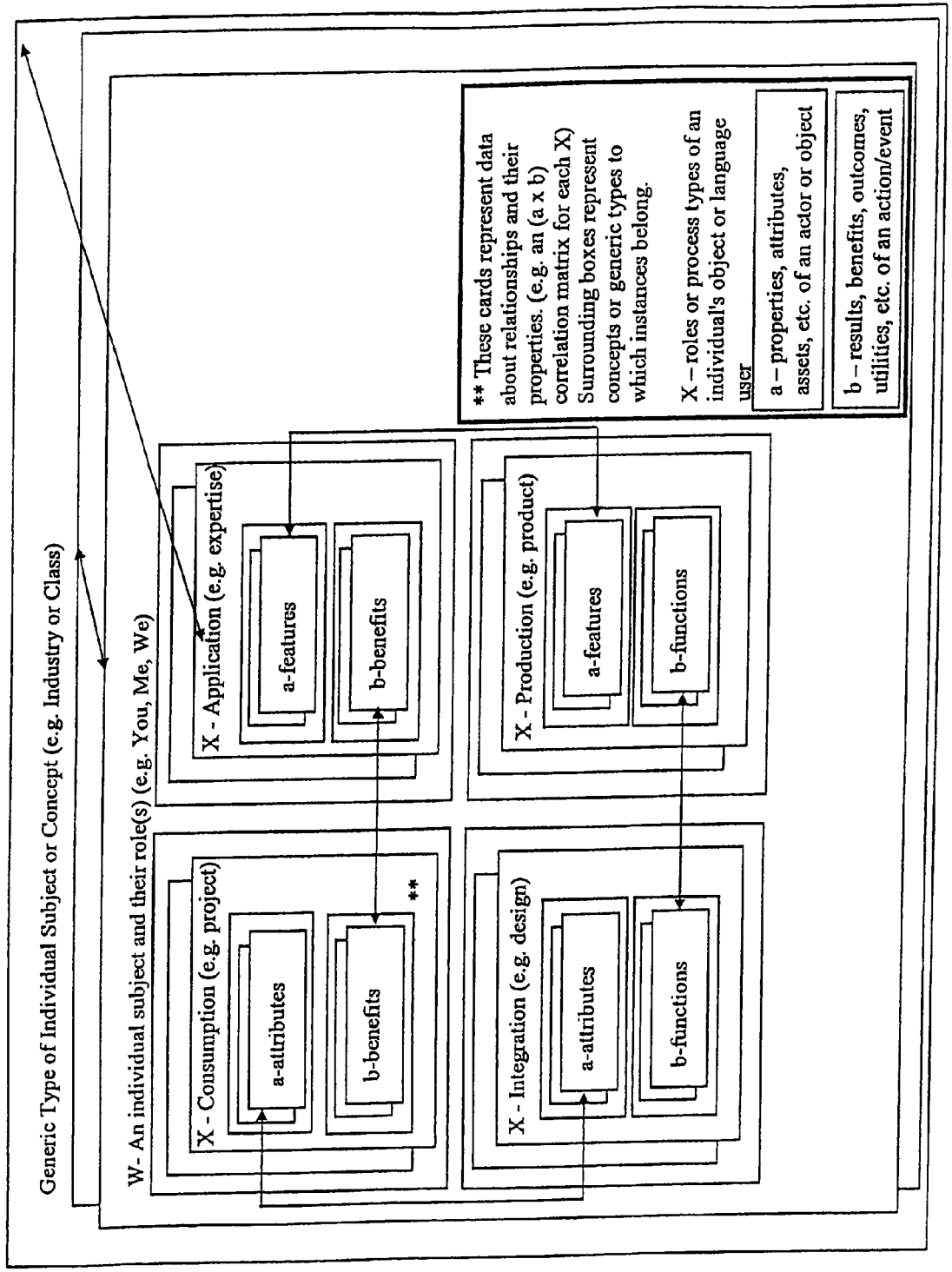
FIG. 15 shows the type of socioeconomic classification, prediction and clustering meta-model or framework that when instantiated and processed within the uniform multidimensional AFFIRM architecture of a particular domain will logically evaluate (e.g. classify, grade, rank, score, prioritize, apportion, etc.) options to search, rationalize, justify and motivate plan(s) and action(s)

FIG. 15 pictures one way that the data structure is or can be applied to create a Data Dictionary in such a way that it embeds process and intelligence. As a result artificially reasoned moves or actions or recommendations or decisions (or real options, etc.) can be made or followed by the system, at the complete discretion of and on behalf of the Home Subject (HS) who is always in control of and responsible for the domain that represents the data and eventually triggers the enactment of (at least it's affirmation of it's part) a move or change. The arrows in the figure represent the way this data can be aligned in a generic model and/or processed in a generic algorithm (that is designed to mimic aspects of human common sense or cognition) to visualize options and make intelligent (common sense) recommendations. The Home Subject can optionally allow certain decisions (actions, moves, etc.) to be processed automatically through to actualization (through a standard sequence of state sequences (CID method processes) based on setting conditions for when HS (of a PD or owner of another AFFIRM Domain) involvement in control is required. This does not abdicate the HS from responsibility for actions implemented by its Domain, as these actions are only able to be transacted as a result of the Domain owner's explicit settings. This means that although AFFIRM Domains may appear to operate as autonomous agents, they are actually dependent on the owners explicit or implicit direction, and therefore responsibility of legal persons for actions implemented through AFFIRM (for both good and bad results or outcomes) is maintained and thus the security of humans and their AFFIRM networks are enhanced.

Figure 20:
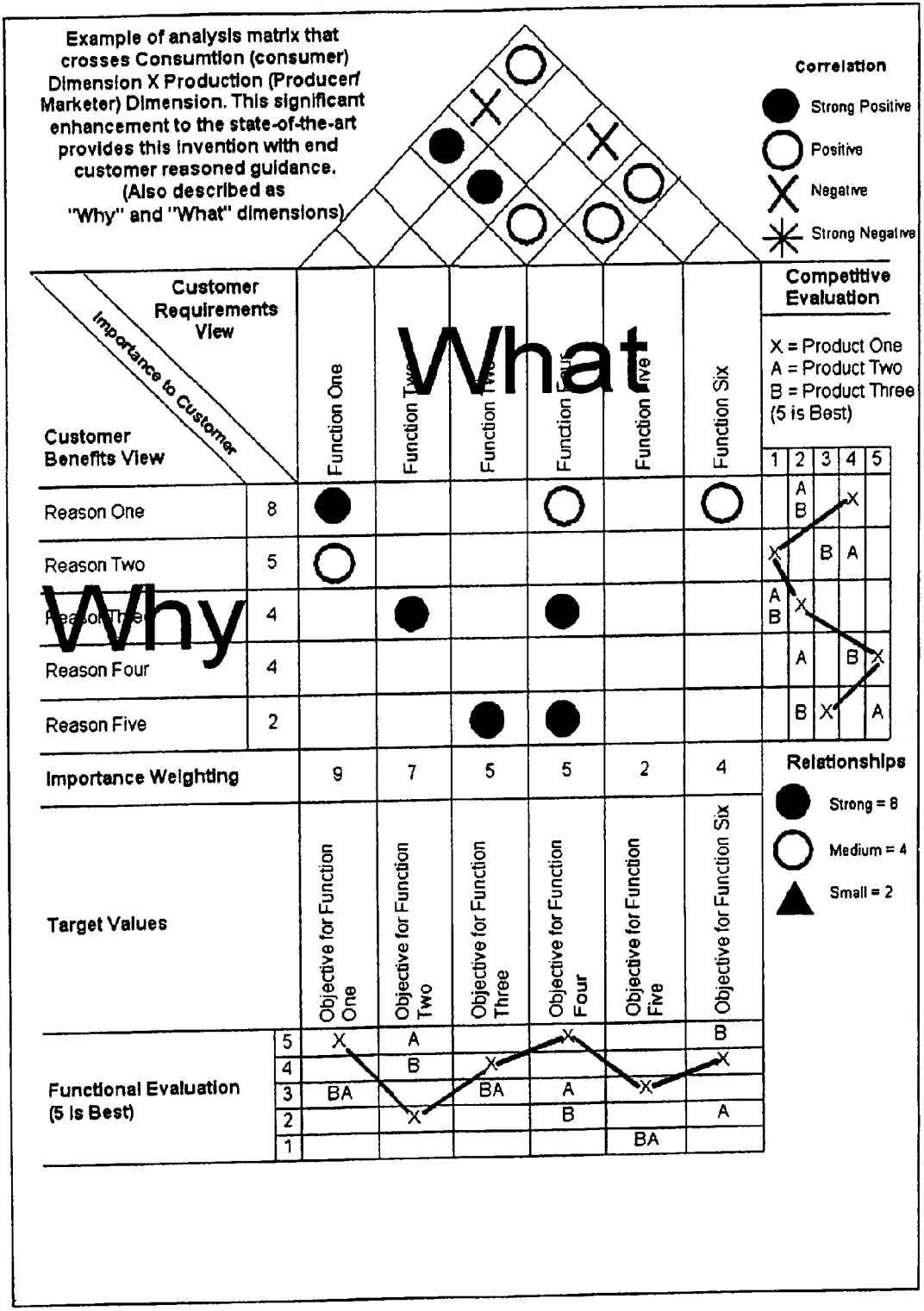
FIG. 20 shows one way AFFIRM can calculate and communicate to participants in a shared process or network "Why" a given product ("Product 1") would be recommended over alternatives as most beneficial for a given customer or market. The view shows how an AFFIRM based system can go beyond traditional analysis matrices to address not only the particular features and functions of a particular product (e.g. medical procedure) but also the particular reasons "Why" (e.g. monetary costs and benefits) the features and functions of a product (i.e. "What") are appropriate for a particular customer or market (e.g. type of patient). This is one way AFFIRM is able to reliably, accurately and/or validly justify, reason and/or rationalize expenditure, allocation, rationing, and/or apportioning of resources.

The multi-layered card layout in FIG. 15 is intended to demonstrate one significant way that data about relationships between object and their properties can be represented in our data structure. (e.g. an a by b correlation matrix for each X). It also shows one of the generic uses of the multi-dimensional aspect of the data structure. This exemplary generic model (which is a unique and important aspect of AFFIRM) can be used to represent virtually any socioeconomic exchange relationship. It explains how knowledge about any socioeconomic situation can be structured, represented and analyzed in a consistent way in AFFIRM. Surrounding boxes represent generic concepts or types of object classes to which specific usages or unities belong. (Also see the further explanation of these terms) To give an idea of the generalness of applicability of this model as well as the AFFIRM data structure which is used as the framework for this and other models, an X can be a role, product or just about anything else (such as merely a word) which represent a component of an exchange process (such as a business transaction or communication dialogue) through which an Independent Subject (as a W) or language user may complement given attributes, features, etc. (a) to achieve intended objectives, outcomes or benefits (b). Specific X, a and b objects can be singular or plural, general (concept and type) or specific (use and entity or individual), potential or actual, and proposed or affirmed at each dimension level where they reside. Objects can be held in common (e.g. in a 'We' PD) or shared (abide in multiple domains or sub-domains) wherever conceivably related or relevant when authorized by the author of the object. Specific uses or entities can belong to multiple generic Concept or Type Domains, respectively, as either the same identical instance or as a separate clone or copy of another instance. In the later case the object is considered a separate instance and has both common and unique parts to its object ID (LID) that act as a sort of model and serial number. By affecting data in this data structure (either through a HS directly creating or modifying the data or indirectly as a result of the actual and potential actions, e.g. AFFIRM monitoring, updating, coordination and management functions) change (effects and impacts of actions) is implemented through AFFIRM Domains and/or attributed to AFFIRM Subjects. Through their Domains a user or IS/PS/HS maintains dominion and control over the interrelationships and interactions between their Home Domain and other objects. Another alternative description of this embodiment is FIG. 20 (Customer Market Matrix).

There are other functions that are more or less multi-dimensional and/or therefore more or less complex in scope and application that can be represented in the AFFIRM data structure in a relatively similar way as depicted in FIG. 15. These other functions are supported by just adding or subtracting a dimension or by using the different states inherent in data found and processed in different AFFIRM classes (according to CID) to flexibly translate/convert and consider data from among different ontology/metrology employed within a given AFFIRM network or domain. Also, by focusing on optimizing the potential and actual value created in the different (X or other) categories or classes that represent processes the Home Subject is involved in (e.g. consumption, production, etc.) and by negotiating the amount of credit or value the Home Subject gets for its contribution to these joint processes, optimum apportionment of resources throughout an AFFIRM network or portfolio can be arranged such that optimum value can be created from aggregate and/or distinct perspectives, e.g. of either or both the perspective of the Home Subject (Personal Domain or portfolio, e.g. 'You' or 'Me') and greater common good (shared portfolios of a given Home Subject, e.g. 'We'). So again the AFFIRM type of generically applicable socioeconomic model, whether exactly as shown in FIG. 15 and/or modified to include more dimensions or other X perspectives or in other ways, can be used to manage profit and/or welfare production in diverse socioeconomic situations. A way to allow end users to modify the model shown in FIG. 15 in the preferred embodiment is to enable users to use a simple graphical user interface (GUI) to modify and add to the model and/or the way it is applied in their situation. For example different classes of actual data can be accessed and processed by users easily clicking on buttons to manipulate the "right side" states (CID codes) and metrology identifiers (LID's in a DC) to change and/or convert between quantitative measure of units for supply/demand/total(net balance) or input/output/total(net balance) change tracking. Also "left-side" states (CID codes) and ontology identifiers (LID's in a DC) can be modified by users to change and/or translate between qualitative conceptual or categorical terms for switching views between showing vision/action/whole and/or potential/actual/whole objects. In this way the user can control the way the model is to be applied, evaluated and viewed.

As a result of taking advantage of these AFFIRM functions, each independent individual subject (IS/PS/HS) can determine anticipated (planned) effects of any change they are potentially or actually involved in independently and whether a real implementation and outcomes happened according to plan (i.e. were enacted as planned and had intended effects). By explicitly recognizing and partitioning interdependent actions into secure common domains (e.g. 'We' like domains) these interdependent actions can be better understood by all involved but also treated by others outside this domain as independent and/or exogenous of their domains. Interacting objects (e.g. parties or participants in an interaction, whether human social or otherwise) are more likely to reduce the gap between perfect/ideal and actual awareness of complex correlations and other (perhaps higher moment) aspects of complex interactions (complementary causes or actions that are most likely to achieve valued effects, outcomes or impacts). Also outsiders (as in their domains that are modeling their independent behavior) can then treat the net effects of this interdependent group that is actually independent or exogenous of them as independent. This way common assumptions of statistical analysis used on the sciences can be met and inferences using these methods in AFFIRM domains can be made more reliable and valid. Also, as a result of the knowledge that is captured in AFFIRM domains and distributed through AFFIRM 'updating' normally tacit knowledge can be coded and experience can be better used to guide future action. Also the results of future action can be added to previously coded experience and the models encapsulated in AFFIRM domains are updated and/or improved. Also, as the subjects are able to transparently view and readily share (an as needed, desired and authorized basis) all information or knowledge that is about what they do through their Personal Domains, the ability for not only AFFIRM domains (user tools) but also users themselves to learn is greatly enhanced. So just by using the invention to participate in the change process each independent individual subject is able to receive information that enables them to anticipate potential changes and effects and compare these with actual. Another mechanism stores this experiential information (appropriately distributes the information within and between domains through a process called 'updating' or 'downdating') and uses it to guide future action. Also by facilitating commensurate compensations of correlatives within and between interacting domains (i.e. credits equitably distributed among those involved in an interaction for potential or actual impacts mutually recognized within a common domain, e.g. 'We', as being attributable to a given potential or actual cause or AFFIRM Subject action), the system can maintain accounting books that are naturally partitioned and consolidated according to the way domains and their subjects self-organize and codes shared learning based on experience in the process.

The disclosed invention acts as an efficient and effective universally applicable protocol for planning, regulating and improving interaction between entities. Valid knowledge and synchronous coordination is achieved among real individual subjects using the AFFIRM invention and between one or more of these individual subjects and their environment through asynchronously using the AFFIRM data exchange and messaging protocol to negotiate change.

Prior to this invention when individuals would work in collaboration with other individuals that have different ideas about how data should be typed and structured the potential for communication problems was great. Individuals in different locations using different words to describe the same "concept" would not be able to communicate about that "concept" using computers because those two words would be handled as if they were two separate "concepts". Now with this protocol for interaction, that is flexible enough to allow each user to describe and control their work (from their perspective) and still be on the "same wavelength" with other collaborators using different vocabulary, interaction can be more effectively planned, communicated and coordinated between independent entities and their hubs. (See FIG. 16—Evolution of Communication Networks—Hybrid) The new hybrid possibilities enabled with the present invention provide the ability to flexibly facilitate interpersonal inter-hub communication of structured data that can still be specified differently by each independent entity, and this is now possible and practical to implement down to the level of the individual. As a result a new generation of valuable applications (built on the backbone) of existing networks is possible.

Historically computers have not been able to securely and indisputably distinguish between you, me, we or some other entity in a flexible way that would enable the recombinant synthesis of organizations made up of multiple other individuals without program code being specifically written to handle each of the details. Now AFFIRM has been created to enable each and every individual subject (e.g. a unit of analysis, assignment or attribution in an experiment or quasi-experiment) to be separately identified, independently represented, and self-managed through a secure and coordinated real-time interaction analysis and processing system. The present invention does this and as a result alleviates unauthorized data access, "identity theft" or impersonation of ones identity that is not your own, and unauthorized control of an non-consenting individual (all while providing the other benefits described).

Again, a common person lacking sophisticated computer programming skills is not able to do this (as well) with (other) current tools, but is empowered to do this with AFFIRM based systems. For a computerized service to effectively be responsible for performing these regulating functions it needs to have to "think" as if it were an individual from that one individuals perspective, with all data about the world organized from that one individuals perspective, and with the ability to understand and communicate with other individuals from that one individuals perspective. A basic reason why everyday computers are incapable of doing this today is because they do not distinguish between the subject and the object(s) involved in an action. Therefore, this is a very important aspect of the present invention.

Figure 8:
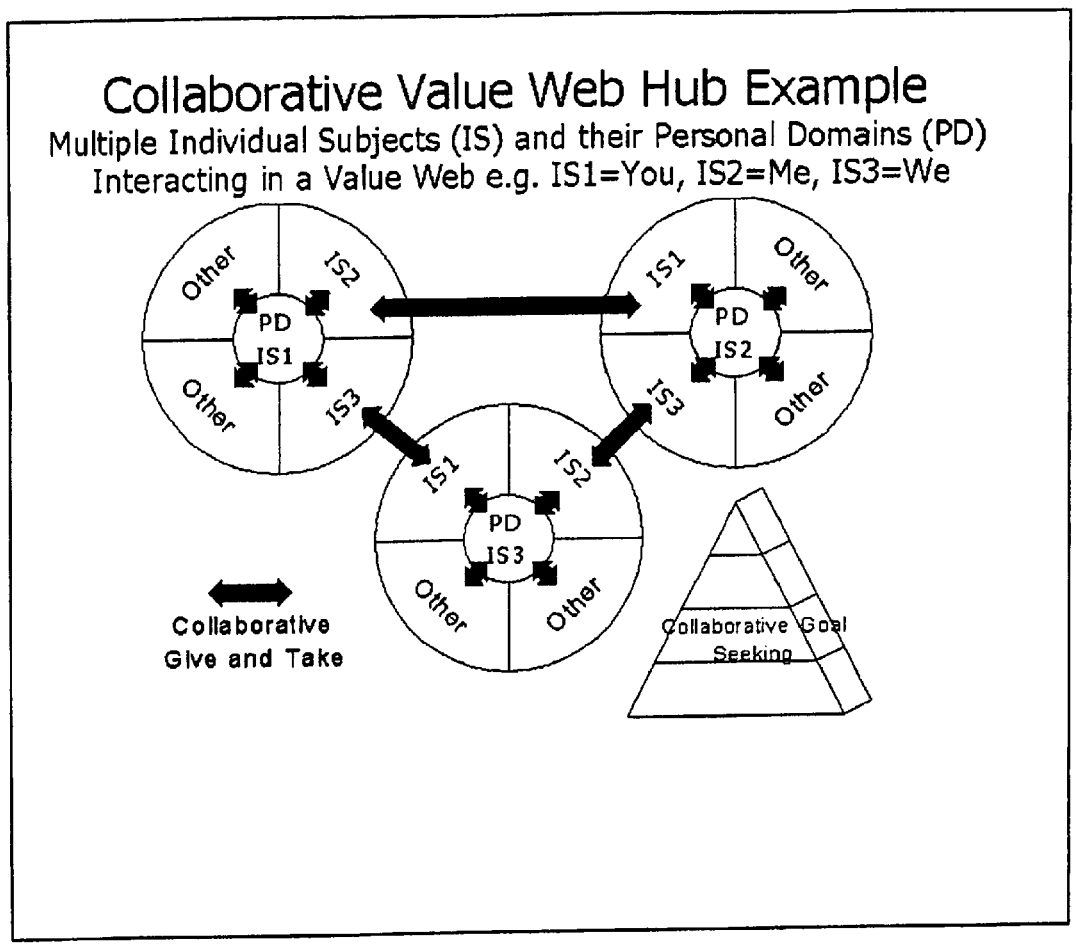
FIG. 8 shows a generic example of a collaborative value web hub with You/Me/We exemplar.
Figure 9:
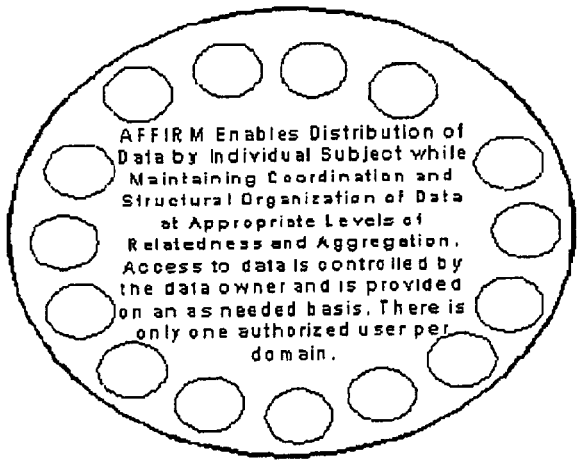
FIG. 9 shows how AFFIRM enhances individual responsibility, authority and security.

(Please see FIG. 8, the value web hub chart showing domains for You/Me/We). These charts demonstrate how users are virtually made up of their relationships with other AFFIRM Subject entities (or Ws). Within each sector designated for a given (W) exchange partner, information about the objects exchanged with that partner (through ongoing interaction) is kept. One of these sectors or "sub-domains" is even designated and maintained for the Home Subject itself, where the HS can control and maintain interactions between it's own parts. As a specific interaction takes place, the involved entities and the objects shared or exchanged between involved entities are represented in each domain of all involved entities in the sub-domain designated for exchange with the relevant or related external party (W) for each exchanged object (X) (within a process Type) from the individual domain owner's (or Home Subject's or W's) subjective perspective.

It is useful to be able to maintain (persist) data (about past, present and future interactions) from each individual subject's perspective in each individual's exclusive data store or domain. This enables each individual to have exclusive Control over data in their data store that is about their future actions, to provide a transparent audit trail about their decisions and actions (relative to other subjects), and to possess data about their past experience from which to learn and improve. An individual using this type of system will be the only one that can change their data. In this way, even though data is kept about all "Objects" related to an individual and interaction would still be coordinated between multiple individuals, from each individual's perspective, only one individual would be able to change a particular piece of data, the UBDU's or IIO's that represent their side of an interaction from their perspective. Again, there are at least two basic advantages of this technique. First, each individual is able to have complete control of and responsibility for its own actions, and second the data management problem of needing write locks on data that can potentially be changed by more than one individual is alleviated.

Figure 17:
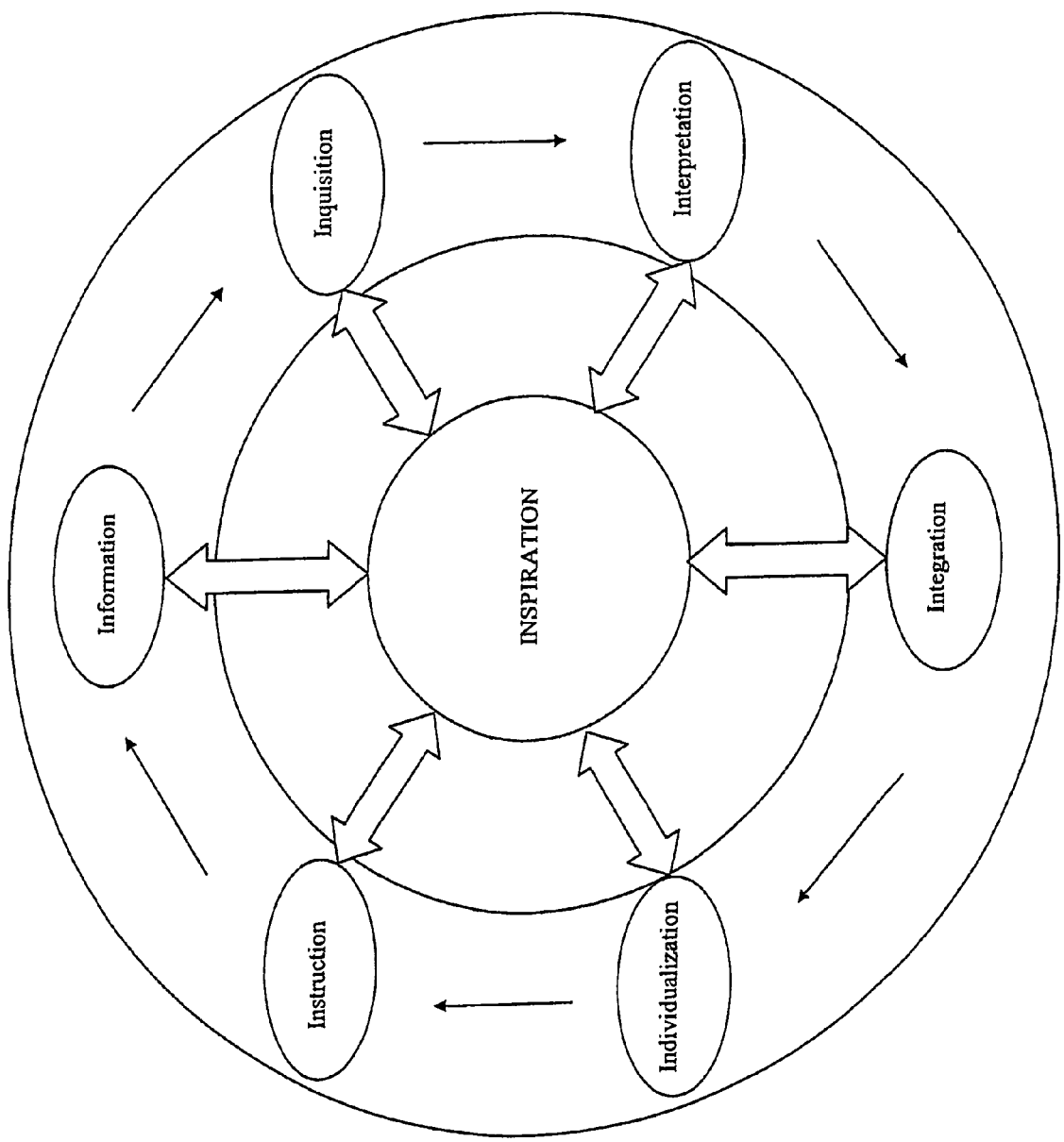
FIG. 17 shows an exemplary set of essential stages of collaborative development—Information, Inquisition, Interpretation, Integration, Individualization and Instruction, all driven by Inspiration.

This enables the system to provide access to data and allow change or variation of data according to the behavior of the individual (subject) within relationships in a way that is not only empowering to the individual, but also facilitates the evolution of a knowledge base that is able to support real-time reasoning and learning from the individual's perspective. And in the process this helps transform the individual and its partners in a positive way (that can also better for the common good). The following chart shows examples of stages of transformational exchange or interaction that take place between entities (The stages of emergence or development of an object, located in the first dimension which is similar to the way it works in other dimensions, is shown in FIG. 19. The invention recognizes the importance of and enables the control of the ability to intelligently determine at each stage whether a particular partner should continue to interact with other partner(s) on a particular endeavor. At each decision point the anticipated value change resulting for the partner is checked (whether it is anticipated to be a positive gain, relative to its opportunity cost) before making commitments to move on to further stages. (See FIG. 17—Collaborative Innovation stages, FIG. 18—Partner Inspiration Matrix, and FIG. 19—Implementing a Class and Method(s).)

The best analogy I have seen for explaining this is to think of relationships between individual entities like a grapevine. For example one might think of parents to children as one thinks of a grapevine to its branches. The branches must be connected to the vine for it to flourish. By describing a relationship in this way, it becomes obvious how one partner cannot thrive without being intimately interconnected with the other. The grafting of a branch to a grapevine is an effective analogy that helps describe the type of intimate relationships that are most fruitful or transformational. But how do we represent these types of transformational relationship in a data structure such that a man made device can use it to regulate a human's or other real entity's interaction with other real entities in their environment and manage the value created by that interaction? (See FIG. 18—Partner Inspiration Matrix—Transformation or Value-Add Resulting from Interaction of Multiple Real Entities.) This exchange and resulting value-add can take place between two or more domains at one or more levels of aggregation or abstraction.

This invention has made it possible for a common person to set up a programmed computer to delegate the actual implementation of interaction and manage value creation in any context. A common person can now set up a computerized service or system to do this. For example a web or Internet service, by instructing a computer to automatically model their relationships based on data about the outside objects they relate with and the state of those relationships. The states or status of the relationships change as exchanges or interaction happen between the related parties. To facilitate this, the present invention first provides mechanisms or services that monitor and stage data about past performance of exchanges or interaction between related parties. This information is also able to be input from a human user or other physical entity monitoring and input process. The present invention also is capable of allowing humans to further control their future interaction and transformational impact by first manipulating data about proposed change from their perspective. The present invention then uses these interaction plans to regulate the real implementation of the change or entity interaction on an as mutually agreed basis. The present invention automatically exchanges real objects and changes the state of the relationship between the parties based on mutually agreed or planned "interaction events". By defining a universal "interaction protocol" that classifies data about "Objects" based on the state of the relationship between those objects and each individual subject involved, this invention is able to manage real interaction or transformational change processes between real entities.

Notice that, unlike other application "programs" (compiled or interpreted computer instruction codes), an AFFIRM based application "program", using this "interaction protocol" and other aspects of the AFFIRM invention, is not designed to only handle a specific type of "Object". Therefore, an end-user that uses a specific domain or application program based on the AFFIRM invention to handle the processing of one type of "Object" can use the same domain or program to handle any other type of "Object". This flexibility, without requiring additional "programming" (writing of programs), provides large benefits over existing application "programs" and languages.

In a preferred embodiment of the present invention, first each new Individual Subject (IS) (a user, person, field, concept, type or other main object) (e.g. YOU), is provided a Domain. In the case of a person, a private or Personal Domain (PD) on a network (e.g. the Internet) is created and made accessible for the person. A PD stores and provides access to data that represents the private or semi-private network of a given exclusive Person or Individual Subject (IS) (e.g. YOU). The Home Subject (HS) is in complete control of its Domain or PD. A PD is owned or possessed by the HS person. (e.g. YOUR PD belongs exclusively to YOU)

The HS is represented in the Domain or PD as the Subject. This Subject can be a Whole Entity (WE or see W below) or a part of a WE. This is one aspect of how AFFIRM enables levels of relatedness or aggregation. A part of one given Domain can incorporate a part of or all of another Domain, and the given Domain can represent part or all of a given object. In any case each Domain has an HS, characterized as the 0D W with X 'spin' (not X, as in an exchange object, but X as in 0, 1 or X 'spin' or direction) in our preferred implementation. Other objects related to the HS in some way and the status of the relationship between these objects and the HS are reflected in an HS's Domain. These objects can include other IS(s) and their potential (0 spin) or actual objects (1 spin) of exchange with the HS, as well as Concepts and Types (see below) that describe properties of the related objects. Among other things, these objects may include parts of public or semi-private shared vocabularies or ontology and qualitative and quantitative knowledge about these objects.

This knowledge is represented in the structure, state and values of the objects. See FIG. 15 showing the way certain aspects of knowledge objects can be logically structured and represented in a PD according to a generic socioeconomic exchange model embedded in the AFFIRM data structure. In this case we describe multiple dimensions of a PD using the letters W, X, a and b and perspectives within the X dimension as Consumption (who), Production (what), Integration (how), Expert (why). Changes in the way the generic meta-model (and coinciding "visualization" algorithm) is implemented in a given AFFIRM implementation or embodiment can vary without changing or diverging from the essential character of the AFFIRM invention. Again it is well known that AFFIRM data structures and methods, e.g. those used in "visualization", can be modified, e.g. by using different types of qualitative and quantitative data as well as by changing the number of dimensions and/or perspectives, without changing their essential character. In fact it is this flexibility in application that gives the uniform AFFIRM data structures and methods that make AFFIRM unique and give AFFIRM its power. By directly or indirectly labeling and valuing IODO's (Concepts or Types) and IOOs (Uses or instances of Concepts or Types) in these W, X, a and b dimensions of a domain, a user can give different meaning to these objects. For example, knowledge may be incorporated in a Domain and used in visualization as probabilities, correlation or regression coefficients, etc. describing the likelihood of coexistence or causal relationship between different concepts or instances and other concepts or instances (disjointed or otherwise). For example, correlation values would be found within the a by b matrix for a given X (Type exchange object) in a W (Whole Concept) and would be interpreted as within "W" in the context of "X" given "a" what would be the likelihood of "b". Various combinations of inductive and/or deductive (including adductive) reasoning methods in AFFIRM use this knowledge to make logical inferences or insertions, recommendations and actions. The arrows in FIG. 15 show how an embodiment of one such unique and valuable reasoning method called "visualization" functions or operates.

The multi-layered cards in FIG. 15 represent data about relationships between object instances and their properties. (e.g. an a by b correlation matrix for each X). Surrounding boxes represent generic Concepts or Types of object classes to which specific Usages or Entities belong. An X is a role or process in which an IS or language user is involved. X, a and b objects can be singular or plural, general (Concept and Type) or specific (Use and Entity), potential or actual, vision or action, incoming or outgoing, and/or proposed or affirmed. Objects can be held in common or shared and abide in multiple domains or sub-domains wherever relevant, by any other object that is conceivably related. Uses or Entities can belong to multiple Concepts or Types, respectively, as either the same identical instance or as a separate clone or copy of another instance. In the later case the object would be considered a separate instance. By affecting data in this data structure (either through a HS directly modifying the data or indirectly as a result of the actual and potential actions (monitoring, coordination and management functions) relegated to or implemented through a Domain by an IS. Through their Domains a user or IS maintains dominion and control over the interrelationships and interactions between its Domain and other objects.

Each PS or Personal Subject involved in a network is in complete control of at least one Domain or PD that they have exclusive rights to as the HS. Each of a PS's exclusive Home PDs (HPD) keep track of planned and actual actions and the other ISs with which those actions interact. Each HPD stores the Ps's or HS's own data from their perspective about the relationships and interactions in which it is involved. An PS's HPD has a subjective view of everything it is in control of (its assets, actions, etc.). Although an PS can have more than one HPD, an PS will usually want one W HPD where all of the PS/HS's data and access points to their other, optional, HPD's are consolidated. This enables a W HS or PS to manage and coordinate itself in a holistic way.

A PD (as well as other domains) also has a reflexive view of everything that it is (not in control of but that it is) interdependent on for the interactions in which the HS is involved. These reflexive views of related ISs (as well as CSs, etc.) and their objects represent the extended existence of a HS and it's interdependencies with other Subjects and other objects with which the HS interacts. These reflexive views are encapsulated in Input and Output Objects (IOOs) passed as messages between Domains (e.g. PDs) from a source Domain to a destination Domain. Each HS has control of the IOOs that pass in and out of its Domain. These IOOs represent offers (proposals) and acceptances (affirmations) of agreements to specific action, and commit participating PS/ISs to enact these specified actions at an agreed time. Each PS or IS owner is in control of its own actions or the interactions that it is involved in because every action requires proactive consent as either a proposition or affirmation by each party involved. These specific actions must be completely explicitly or implicitly negotiated. (See CIOOT below)

An HS can propose a given exchange or interaction with other IS(s) in a common network, but other IS(s), or Prospective Interaction Partners (PIP), must then affirm the proposal before it can be enacted. A PD keeps track of all the IOOs that might, will, have or could have been passed between the HS and its Partner PS's Domains (as well as with other interacting AFFIRM Domains). The way partnerships are controlled and monitored as they are being set-up is similar to how the negotiations of relationships with other newly identified (created, recognized or registered) objects are coordinated. (See FIG. 19) A partner registration would be an example of a main object registration in the first or lowest dimension of a domain. There is a particular sequence of stages that a prospective partnership or other potential external object must go through before it becomes an actual part of a given Domain. See the way this works in the Zero Dimension (0D) in FIG. 19—Implementing a Class and Method(s). This works in a similar way, but often automatically (depending on user choices/settings), in each successive dimension, 1D, 2D, 3D, etc.

This same process or sequence is happening (tracked or controlled) in the Domains that a given Domain is interacting with, only one Domain's proposed object is the other Domain's accepted or affirmed object and/or one domains incoming object is another domains outgoing object, etc. As mentioned above, the same sort of sequence involving development and interaction or negotiation happens on higher dimension levels as internal process loops inside each sequence on the lower level. The properties being manipulated at each stage in the sequence (as the CID's are changing) can mean slightly different things and can be interpreted in slightly different ways. Nonetheless the processing happens in the same way. For example, instead of potential (0) and actual (1) in the preferred implementation on the left side of the CID these properties mean vision (0) and action (1) on a higher dimension level. You can still see that both 0s mean something planned and 1s mean something implemented. It just involves another set of digits in the CID to add the ability to record these additional higher dimensional states for the objects represented in those dimensions. Similarly in the preferred implementation the properties on the right side of the CID mean deduct or supply (1) and induct or demand (0) instead of propose (0) and affirm (1). You can see that both are a matter of give and take. To incorporate these higher dimensional states or properties it is accomplished in the preferred implementation CID in a similar way to that shown in FIG. 19 (e.g. X-X). Another set of digits (left and right) is merely added for each added dimension (e.g. XX-XX).

By enabling the PS (or other HS) to use the above procedure to control relationship development and object interaction this aspect of the invention provides a way to tightly regulate the security of a domain (e.g. an individual's PD). PD's presumably have private information in them and therefore it would be in the PS's or IS's interest to keep the information private. The development of a partnership is the first step in providing at least the potential for a partner to access or receive some of the private data inside a domain. The above mechanism or protocol charted in FIG. 19 also provides a way for coordination of the interaction of multiple domains and there PS/IS's, e.g. creation of partnerships.

There are vocabularies or pieces of ontology (that include Concepts, Types and Uses that can be non-active instance objects, usually without mass Value) that are shared between AFFIRM Domains as IOO Templates (IOOT's) with one or more IOOs. These IOO Templates are shared to prepare PS/ISs for asynchronously envisioning and negotiating a particular exchange. They are made up of one or more Input Output Definition Objects (IODO). An IODO is a generic form of one or more IOO that can be a Concept or Type or Use and/or or some other AFFIRM Subject from some other AFFIRM Domain, e.g. Individual, Personal, etc. of some kind that is not specifically active, i.e. designated as actual as opposed to potential, with unit or mass quantity Value until all involved actors in an interaction approve the change.

Again, in the preferred embodiment, each of the IODOs refers to a designated Concept or Type object or subject and like any IOO is represented by a record comprised of different fields. These fields, which can and are sometimes left blank or unspecified (and sometimes may not even be included in a particular AFFIRM instance), include a word or other symbol (Label), a definition, a LID, a CID, a Value, a Rank and possibly other information such as Number Type, Media Type etc. These fields are used in a uniform way for each record, so the system can allow users to flexibly add new objects represented by unique new IOO records and still know how to handle them. There may be multiple IOO or IODO records that refer to the same Concept or Type in different situations, i.e. in domains and sub parts of domains. The IOOs words and other symbols (e.g. Label, media) used to refer (as in normal spoken language) to a specific Concept or Type can differ at the discretion of different HS users and is recorded as a specific Usage of the Concept in appropriate CD or Entity of the Type in TD. This helps give the system its pragmatic language and metric processing capabilities needed to facilitate the Pragmatic Web, i.e. the ability for network users to communicate at a new level of understanding.

In the preferred embodiment, a Concept Domain (CD) is used to reflect the usage of a Concept including the users (partners in use) of the Concept and symbols they use to refer to the Concept. In the case of a CD the Symbol List (SL) has a record of each symbol used to refer to the Concept and the Concept List (CL) has a record of each Domain (user, IS, or other concept) using or related to the Concept. As a result, not only are all the symbols and the users of a given Concept recorded, but also, the context in which the concept is used is also recorded. The popularity of different words for describing the Concept in different contexts is also monitored and this is used to know what word a domain is to use in a particular context (to refer to a specific concept, for the purpose of a human users understanding). Also, when a IS changes the word or other symbol used to refer to a particular Concept in a Domain under their control, this is reflected in this Concept's Concept Domain (CD).

Through this mechanism a word or symbol user impacts the evolution of ontology, concepts, words or symbols used and their meaning within a Community. This also is how an IS (usually as a PS) and a PS/IS's PD/ID is able to understand and control interaction with the environment. This (language) processing mechanism can also be used to enable an IS (or PS as well, since a PS is an IS) controlled Domain to synthesize visual, auditory or other symbols into commands that humans and other entities that participate in the (semiotic) network can understand.

This processing mechanism can also be used to enable a Domain to efficiently and effectively synthesize real (physical objects) into products and packages of products that humans and other entities that participate in the network expect to receive. Once an exchange agreement is made between PS's and IS owners using the AFFIRM invention, the PS's and IS's are obligated to actually make the agreed physical changes or exchanges (e.g. send out the packages of products) and the PS HS (or IS owner) of a particular HD can set their HD to automatically enact agreed physical changes. In this way the disclosed invention enables and requires a Domain to control both physical and metaphysical (e.g. mental) aspects of an PS/IS's environment.

So through this mechanism PSs and IS owners connected by an AFFIRM network understand each other and can negotiate and enact agreements about real changes. Again, once future changes are negotiated asynchronously by PSs/IS owners, the Domain interfaces of these PS/IS owner's regulate the enactment of these (physical) changes in the environment. These enactments involve physical transformational changes in the PS/IS's and other physical entities that the IOO's actually refer to. Again an IOO refers to a real (quantity) whole or part of a specific object or entity involved in the real change. The amount of change is determined by the value of the IOO record for each part of an agreed change. Although there is a standard unit of measure, the IODO records in an IOOT describing a change may also encapsulate alternative units of measure and conversion ratios used to quantify, and if necessary convert, the amount of change. The measure conversion function works in a similar way to how language concepts are transformed and translated during or as a result of use.

In this way the disclosed invention enables AFFIRM Domains (TD, CD, ID and PD of CS, PS, e.g. a PS's exclusive PD(s) and/or owned ID(s)) to synthetically create understandable commands and real changes through interaction with (other entities in) their physical environment.

Lets get more specific about more aspects of the invention. The IOOT is used to efficiently and effectively communicate the language used to describe the context for the activity or change to be negotiated. The IOOT is also used to prepare the specific path within the recipients data storage system that will be used to store information about particular interactions. IOOTs are made up of one or more chains of IODOs. Within the records that define or make up these IODOs is a Link ID (LID) that defines the object ID used to name and link to the nodes in the (relative) paths through which data is organized in a domain. LIDs are used in related domains to demarcate where within the domain or in relation to the subject of the domain the object identified by the LID is related. If an entire DC made up of all LINK IDs is used it then provides an absolute path as opposed to a relative path from the current location.

One or more of these LIDs make up what is called a Domain Chain (DC). DC's can be used to know the absolute path to anywhere in an AFFIRM based (search) space or network or a relative path to data located in a Domain relative to an objects current location. The data will be located in a file or Uniform Basic Data Set (UBDS) by the name of the active CID. DC's are represented both persistently in the organizing structure of stored data and in memory. DC's are used by Domain data interfaces to know where data is located (for read and write operations).

The IOODT's do not represent (potential or actual) change itself, but are used to organize or give structure and meaning to what is described and negotiated in communications or representations about potential or actual as well as proposed or affirmed change. IOODTs are syntactical representations used to describe a context of action, not representative of a certain "completely specified" action with a certain force or extent. An IOODT can be exchanged between Partners once the FIRST PHASE partnership development process is complete, where an envisioned partnership (PIP) is not only "proposed" but also "affirmed".

The defined paths of a DC identify locations in which data is stored about a given AIOO. For example, data about a specific most granularly defined change (See IOO Value's below) is found in the IOO at the end of a specific DC within a CIOOT. (For a depiction of this see example in the last or lower right button (other than n) labeled with "0" as the LID and 11111-11111 as the CID in FIG. 14) This DC is identified as a string of one or more LIDs of an AIOO and its parents, as well as the LIDs of the selected Options from the AIOO on down. Each of these LID's is a node in the path to the IOOs in a represented IOOT or to the real change data in a represented CIOOT. The DC represents the context and the CID of the AIOO represents the state of the negotiation of the change represented by the IOOT both before and after it is complete. The CID is also the name of the node (or file) located at the nexus of the change represented by the IOOT.

Once CIDs are completely specified and OVs or Values in records representing IOOs describe when, how much and to what extent a change will take place, then a CIOOT is defined that can represent a change in its entirety. A CIOOT must have all the elements or IOOs of a change completely specified. An IOO of a change, including future prospective change, is completely specified when each state of each object involved in a change is known by all parties involved. This is the case when the CID is made up of all 0s and/or 1s (no X's).

Again, other objects related to a HS and the states of interaction objects (or status of the relationship between these object and the HS) are reflected in a HS's Domain. These related objects and relationships are represented using Link IDs (LID) (in our preferred implementation) and relationship status IDs (called Class IDs or CID s in our preferred implementation). The CID represents the status of an object. A CID is used to describe all the various states objects might have or that must be known about all the objects used to describe a given change in its entirety in a CIOOT. A CIOOT, or a real envisioned and/or (partially or wholly) enacted interaction, can only be exchanged between "partners" once the SECOND PHASE of the "partnership" development process is complete (where an enacted partnership is "proposed" and "affirmed").

Again, these templates or strings of one or more IOOs, complete or otherwise, can only be passed between one IS and another when both parties agreed to relate (i.e. have completed the partnership development process). Partnerships are envisioned in the FIRST PHASE (0 in the preferred implementation) or enacted/actual in the SECOND PHASE (1 in the preferred implementation). In addition to partnerships, the other IOOs (which could represent anything else, information or otherwise, that can be passed between partners) are also in one of these and other evolving states of readiness for exchange, or passing of an X (exchange object) between Domains. In this way each Domain keeps track of the current state of all IOOs that are part of interactions in the process of being planned or enacted. Current Interactions (CI's) are planned for enactment sometime from the current time they are affirmed into the future. Past Interactions (PIs) are interactions planned or enacted in the past that are logged in Domain archives organizing IOOs of all PI's by CID as they happen or expire. CI's are organized by CID in each IS Partners' Domain and include anticipated date/time of the CI in addition to other information.

All data is not only partitioned by IS, but in the ultimate implementation would also be represented as packages of single units, according to the smallest measurable unit size of each piece of an inter-partner exchange. These Unitary Objects (UOs) can be exchanged one unit at a time as well as in groups of units, when relevant, with the other IOOs with which they are exchanged in a given interaction at an instance in time. A Uniform Basic Data Unit (UBDU) is the way each IOO is represented in a Domain in which it belongs. It is comprised of fields or pieces of information for each of the fields mentioned in the "Terms and Software Objects" list above. One or more UBDU(s) make up a set or group of UBDU(s) called a Uniform Basic Data Set (UBDS). A UBDS includes UBDU(s) that describe Parents, Options, Class, Items, etc. that are related to the data in the UBDS. The UBDUs (items or records) are complete IOOs with CIDs the same size as the CID Name (filename) of the UBDS and has all specified states (0 or 1) for each (two) digits, for every dimension of the CID in the preferred implementation.

The Active IOO (AIOO) is the UO or IOO at the nexus or interior anchor point of a DC of particular interaction. It is represented by the Active UBDU that is selected in the Interface when the HS chooses to enact or actualize a change. It is the point at which a IOOT whether active or not diverges from one Item IOO per dimension to multiple. By setting the active point prior to sending the sender determines the context and granularity of what is to be sent. Then when the recipient receives the data it includes the DC and other information necessary to put it in the right place. This sending and receiving can be set to be done automatically. When receiving data you have rights to control you can receive in different places than it was sent from. In this way data can be moved from its current location to any other location. This function can be used to change the location or establish an additional location for data. If the user desires the same data objects to be updated in the other locations when it changes somewhere else, the user can elect to have this done. This is controlled and managed through author and use tracking. This mechanism can be used to capture experience or experimental data in one location and have it update detail and summary records of this experiential data in another location.

This AIOO has a time/date value that is the time/date at which the interaction is to actualize. All interactions are made up of UOs or IOOs with completely known states. These known states are negotiated and agreed to between interacting partners during the planning process prior to actualization of the agreed changes. Once the AIOO is triggered by a timer (attached to an all X file), all the sub processes of which a given interaction is made up are initiated. The actualization of the interaction is represented in the form of each IOO that was intended to change as a part of the interaction in an affirmed actual state with a past time/date. (Also in the preferred implementation the 0D Quant State part of the CID representing the stage grouping of a UBDS that is now turned from X (potential) to 1 (actual) and the change is complete and archived.

A Domain, its structure, and its coordinated interaction with other Domains enable a network of interacting Subjects to coordinate, manage and/or simulate interaction and sharing of IOOs that can represent any object of exchange (including revenues and expenses) in an economic or ecological system. As a result, the system implementation of the present invention enables the planning, simulating, actualizing, organization, motivation, development and control of manmade networks. An embodiment of the invention can also enable simulation of and/or interaction with natural networks, such as evolving biological ecosystems or communities, neural networks in brains, or concept and word networks in ontology. Ontology are made up of shared vocabularies or agreements on what words are to be used to communicate specific concepts and/or describe certain interaction between Domains of concern to particular knowledge domains.

IOOs that are a part of a given interaction are stored in the ISs Domain as reflections of the way the interaction is stored in the Domains of interaction Domains or partners. For example, in an IOO describing a partnership (in the 0D first dimension) we would have information about the partner in a ISs Domain. The information about themselves, the HS, is assumed to be about the currently active Domain of the IS. In this way a Domain only needs a single record to be a particular reflexive relationship, e.g. for an AIOO describing a partnership, around which an interaction takes place. Because each party to an interaction has control of whether it participates in a specific interaction or change and has complete control over specific records that describe their part of the change, the system not only enables self-determination for each IS involved in an interaction, but also enables the system to manage the concurrent writing of data about a specific change, without requiring the prevention or management of the otherwise possible scenario where the same data record or individual IOO to be changed by more than one party at a specific time. Therefore, the system alleviates the need to solve the previously unsatisfactorily solved problem of how to manage concurrent writes of the same data record field by multiple users in at the same time. As a result the system enables each HS of a PD to have exclusive control of specific changes to current state information while still enabling the free flow and coordination of change in data and the real objects the data represents.

An embodiment of the invention in the technical arts is capable of simulating, enabling and/or enacting simultaneous change in multiple respective Subjects or their Domains at a distance. Therefore, the method of this invention is one way to explain the Bell phenomenon in quantum physics. Each partner in an in an interaction, must trust that the planned future interactions or changes to the current state of IOOs represented reflexively in different HS Domains will be changed according to previously agreed parameters negotiated by involved partners. When using the System, users are involved in a negotiation process that enables any Partner to initiate (Propose) a particular change to one or more related IOOs. Then the other Partner must decide whether to agree with or affirm this Proposal. For example, if one party wants to share in a partnership with another IS, they would then initiate or propose a partnership with the prospective Partner through their Domain. Then the prospective Partner would be sent a Message, (a communication packet comprised of one or more IODOs), about the proposed Partnership. This prospective Partner would then see this proposal and have an opportunity to agree to (affirm) the partnership.

An PS/IS is able to send a partner whatever IOOs the PS/IS authors. There is a dictionary that keeps track of everything an author (HS of a Domain) creates Parts of a Domain can be sent on an as needed basis by setting the active point at the context and level of granularity the sender desires to send the recipient. The sender only sends what they want so share with the partner. In this way an author has total control of the content that it creates and shares. Also, a "use dictionary" (points to and/or) is comprised of a domain for every type or concept that is authored by and/or available to a domain. This keeps track of all the location(s) where everything created is sent and used, so when the data changes, those users (who elect to be) can be updated. This is how all separate Domains are kept in synch with each other.

Within Domains, data about IOOs move between stages, or staged data locations indicated by the CID (filename) according to the state these IOOs are in at a particular stage in the negotiation process. Domains keep track of the Current State of everything related to the HS. The complex relationships between interrelated aspects of a change or interaction are monitored and controlled by representing IOOs on multiple dimensions in a Domain. IOOs represented at each dimension are able to move or change freely within the dimension in which they are represented, within the confines of the set state of all objects represented in previous or lower dimensions. The IS is provided control over change to IOOs through an Uniform Interface (UI), which presents this complex multi-dimensional data about pending interaction in a form that can be understood and controlled by the PS/IS. A user of a GUI, or other entity implementing AFFIRM, is able to set the state and Domain location of objects it is interested in managing (or viewing) at a particular point in time. Multiple perspectives or views of data about currently pending changes (planning decisions or actualizing actions) can be accessed and controlled by the PS/IS in the UI. The Position Views (PV) are able to show different perspectives of the same context or IOOT. Therefore, the system enables individuals to view and manage data about (future) change from the perspective of different roles. A given PS/IS can view and control its data from these multiple perspectives, or in a situation where an PS/IS is managed by more than one person (e.g. a group or an organization), each person can see the organization from the authorized perspectives or Position Views (PV s) that are appropriate for their roles within the IS.

As the states of IOOs change they move into successive staging areas for objects in the particular state to which they are changing. Every data set comprised of data for a particular aspect of an interaction is grouped according to state and is linked to other IOOs in the same and other dimensions describing other details about the specific interaction. A particular interaction has multiple related IOOs that have common states and reflexive Link ID s (LID s) in common dimensions. This commonality exists for all dimensions from the AIOO on back through the LID of the Domain Chain for previous dimensions to the first dimension which identifies the specific IS with which the HS is interacting. Each of these commonalties, an AIOO and its ancestors (parents), has a reflexive LID with one that exists in the interacting IS's Domain. For example, if the HS has money it is exchanging for a product from a partner IS, the partner has the HS's money, represented as an IOO with a money LID and value, in the reflexive location (with the same Class ID (CID) on the left side and the CID and the opposite (in/out) properties on the right side) denoting a particular reflexive place in the related Domain. This is the method used by a partner (say the original HS mentioned above) in their Domain to represent the others products which the HS plans to exchange for.

Both sides of a reflexive exchange in a particular state like this are represented in each of the given Domains in the same CID location with reflexive LIDs. The same IOO is represented in exchanging Domains (with the same Class ID (CID) on the left side and the CID on the right side being opposite) They are in different parts of each Partner's Domain as a result of having the same LIDs (except the main 0D parent) and different but complementary or opposite Quantitative States (Quant S's) (In/out) in each dimension, (the right side the CID in our preferred implementation). In our preferred implementation the right side of the CID has opposite signs or spins to designate the complementary state of the SAME IOOs in each partner's domains.

Successive dimensions after the AIOO included in a given interaction focus would have the opposite state (represented in a specific dimension or digit of the CID) in each of the Partners. The Qualitative States (Qual Ss) would be the same. Also, all commonalties in a row are recorded in a Domain Chain (a grouping of successive LID s). So each Domain Chain (DC) in a given Domain has an equal and opposite DC for a partner domain. Complete IOOs are ready for exchange. Opposing sides or PS/ISs of an interaction represent opposing IOOs, e.g. money paid for products, in the same CIDs in their Domains in the Qual S properties as well as the Quant S properties of CID. They have reflexive LID s and the same IOOs in opposing Domains with opposite Quant Ss for each dimension and the same LID s except the far left IS LID which is used to reflect the opposing partner's LID or Domain location in each case.

Actually the left side Qual Ss will also be opposite outside the 0D first dimension when in opposing sides when the actual in one PS/IS is represented as potential in another. This is the essence of how Partnering can enable one PS/IS to capitalize on the resources or assets of another PS. For example, if I produce a product and have it in stock the product is actual in me (Qual S of 1 in preferred implementation) and the product is potential in you (Qual S of 0) if you are interested in the possibility of buying the product. The money you are planning to use to pay for the product had better be actualized in you (Qual S of 1).

In general, by using these structures and methods to become more intimate with interaction partners, an AFFIRM user can better manage collaborative goal seeking. AFFIRM enables enhanced management, negotiation, coordination and change of many aspects of and objects within social networks. Much of the benefits of AFFIRM result from the way it provides an integrated solution to many of the common problems experienced when attempting to manage interaction in a social network. There are also several specific features or aspects of AFFIRM that enable it to better address specific requirements of managing social network interaction. Again, the AFFIRM invention and these benefits are also applicable to many other "social networking" situations other than social networks between and made up of humans. The social networks an AFFIRM based computing device can help manage can be networks between and made up of humans and other living things, computing devices, robots and/or other devices from the nano to the macro scale. The point is that the AFFIRM based data structure or domain within a computing device is subject to human control and implements human effect on its environment by regulating managed (planned) action. But the invention will be described in terms of how it enhances security and performance in this area of application, specifically human socio-economic networks.

AFFIRM is made up of models, methods and tools that enable it to provide these benefits. Specifically there is a generic service-oriented (socioeconomic) model on which the data structures are based. These data structures are designed in such a way that they efficiently and effectively support/enable AFFIRM methods that are used to develop and operate AFFIRM based applications or tools (according to this model). As a result of the AFFIRM models and methods, these AFFIRM based tools, including but not limited to computer network management, business commerce (exchange) applications or other systems based on AFFIRM, are able to develop, negotiate, guide and operate real interaction and transformation in a flexible way that appears intelligent and logical.

Perhaps the greatest benefit of using AFFIRM in socioeconomic network applications is the ability to leverage resource productivity through partner interaction and collaboration (at Internet scale) without jeopardizing security of private information or other property.

Some of the other benefits of AFFIRM based tools include: non-technical end-users can "program" and control their group process interactions; data partitioning by Individual Subject (IS) gives IS complete control over their data; collaborative development and sharing of semiotic user determined metadata templates (packages for real object data that give the data meaning) enables evolution of a universal and pragmatic communication medium; collaborative development and sharing of business process templates (as data that represents negotiated change) enables nimble-quick development of business management applications that reflect business relationships; collaborative development and sharing of business process template (as data) enables nimble-quick development of real subjects and their objects; partner relationship and messaging management prevents spread of junk mail, viruses and other forms of attacks; dynamically gather synergistic partners into knowledge-based online collaborative networks; provide personal real-time work management interface on any Internet device; coordinate interactive planning, agreement negotiating, group decision-making, and fulfillment; structure, filter, and aggregate applied knowledge and specific recommendations on demand; manage the business side of knowledge-based collaboration and innovation; integrates vertically aligned industry specific socioeconomic entities (e.g. buyers and sellers) as well as horizontal cross industry co-developers in coordinated value creation networks; interoperate with any existing web content, media, or application; integrate knowledge-based collaboration across platforms/markets/domains/enterprises/etc; maintain strict security of private and intellectual property; manages coordinated interaction of multiple individual domains; enables access and control from "light-weight" (e.g. wireless/portable) devices.

In one preferred embodiment of the present invention, an RSVPortfolio (RSVP) comprises of several tightly integrated but independent components—at server level and at client level. The client level component, called the RSVP Client, is basically a User Interface that is, in our current implementation, displayed by either the client's browser as an applet or by an application using Java Virtual Machine (JVM). The client applet is fetched by the browser from a Web server whereas the application resides locally and is loaded at the time of execution. The client also maintains a local database of records obtained from the server, performs calculations and communicates with the different RSVP servers as needed. The RSVP servers listen to client's requests, perform the requested operations and return the outcome back to the client.

Basic Parts of the RSVPortfolio system: (a) server software provides web, data and messaging services (b) client software makes requests to server, as application or browser applet (c) browser applet running in secured "sandbox" requires synchronous communication.

Examples of communication include (i) Client Server communication-synchronous, bi-directional, temporary connections; (1) Server and client can be on same computer, even wireless handheld device; (2) Other servers including web and ftp can also be on the one device. (ii) Server to server communication through asynchronous peer-to-peer messaging; (1) If initial try of send fails then it is put in queue for retrying later; (2) Partner initiation and affirmation (incl. validation of users/domains); (3) Send/Receive coordination and updating; (4) Message oriented architecture; (5) Enabling asynchronous communication; (6) Efficient for Internet—doesn't require waiting for connections; (7) Enabling scalability—doesn't require constant connection; (8) Fault tolerant—will retry messages when not received. Next is (d) a Graphical User Interface—graphical software that enables user interaction with, for example, (1) toolbars—a user interface component that enables user to control Active function. GUI may also include (2) Active Window—Shows active domain component(s) or other Active function such as: (i) IN—Setup and maintenance interface; (ii) Partners—setup/add/edit partner; (iii) Bi-directional link requiring initiation and affirmation which prevents or alleviates one or more of the following: junk mail, spread of viruses, denial of service attacks, and/or hacker vulnerability.

Media Types that AFFIRM will contain and setup/add/edit: virtually any application, device or media, HTML—web pages, streaming video and audio, PDF—protects text from copying, graph—graphic of range of values i.e. trend analysis, document—any document that can be viewed in browser, such as, MS-Office documents, telephony—voice over IP, Instant Messaging, Web based E-mail, File browsers, Any web based application, Any web enabled device, i.e. player/recorder, Any web media Number Types that AFFIRM will contain and setup/add/edit: Default Number formats, Nominal, $, Other Currencies, Calculations, Sums, Averages, Etc, which may be sorted or prioritized and allows for user defined formats.

Examples of other various types that AFFIRM can contain and setup/add/edit: Items, Option, Ftp Servers, Lists of Active Components, Send (sends message comprised of Active Components to partner), Lists of potential recipient partners, Send to multiple partners.

Examples of steps included in the method include: Send it!—initiates sending of a message; Receive—receives message comprised of active components from partner; Preview—previews message from a given partner; Receive It!—receives message to from a given partner; Set an Active Point; Include parents (yes/no); From this point down (yes/no); Overwrite (yes/no); Refresh—refresh client with a domain's most current data on server (note that this doesn't allow overwrite of components that changed since read)

Also, another part of the Graphical User Interface is the Domain Navigator, which is a structured part of interface outlining components of a domain. Domain navigator further comprises components, which are object (instance) represented by a button. Specific component types are, for example: Option (Column Header)—optional view or path through domain; Diagonal Header—link to and aggregate of items; and Item—individual components under diagonal headers.

Navigation conventions for RSVP include, for example, Clicking Header to Activate column and show its Items, and all Items and their sub Items in sub columns are then considered Active. Next, clicking down arrow to scroll through Items in column, and clicking terminated down arrow to go to next set of Items in column. Next a user clicks any button once to activate it and its linked media, and then clicks Item once to activate only it and navigate over a column.

Further, clicking button a $2^{nd}$ time allows a user to edit the component's properties. Properties include, for example: Label—short identifier for the component; Description—long text describing the component; Quantity—a value measure for this component (instance); Number Type—type of value this component's quantity represents; Media URL—link location of component program, file or media; Sharing links prevents attaching/downloading problems; Media Type—type of program, file or media for this component; Label with all capital letters plays in same browser session; Label with non-capitals plays in separate browser session; Save—saves changes to the component instance; Replicate—replicates component to new instance; Upload—uploads to ftp server and auto-records location in URL; Remove—removes instance from Domain Navigator and archives; Find/Add—used to find/add components (Items and Options); Find—find Item/Option in column, domain or shared dictionary; GoTo—go to found column Item/Option; Replicate—replicate found column Item/Option; Use—use found domain Item/Option not in column; Import—import found dictionary Item/Option not in domain; Create—create Item/Option not found (This prevents duplication, creating only nonexistent Item/Option)

Next the Graphical User Interface further comprises a Media Window. Items within the Media Window include, for example, Media—program, file or media linked to component (Media plays in media window in right frame or in new browser session); New Browser Session—maintains media access when other media is called.

Advanced Parts of the RSVPortfolio system include Business Objects, which comprise, for example: Domain—(at least) one per entity, i.e. patient, doctor, partnership, provider network; Knowledge Template—component framework, i.e. OB primary preventive care; Template Author—expert that designs standard set of practices, i.e. MD, ACOG; Provider—performer/manager of service, i.e. physician, other providers; Service Relationship—ongoing shared process, i.e. patient/providers connections; Resource—domain possession, i.e. time, info, money, space, equipment, energy, etc.; Deliverable—simultaneously occurring Service Components, i.e. med procedure; Service Component—part of Deliverable derived from Resource, i.e. information; Decision Cycle—complete increment of time for planning and delivering services; Phases of Exchange—groupings of certain types of interactions between domains; Exchange Protocol—model for orderly standards based, but organic, process flow; Beneficiary—process result owner, i.e. patient/health, provider/payment.

Processing features of the RSVPortfolio system include: Partner Setup—initiates/affirms partner relationship, i.e. patient/doctor relationship; Sending and receiving of messages comprised of Service Components (i.e. easy sharing of medical information according to HIPPA regulations); Navigation of a domain, relevant applications, and media, i.e. easy access; Sharing Knowledge Templates, i.e. recommended medical record best practice; Links automatically call program or media, i.e. other application or media display; Media version management—keeps everyone updated with current media version; Interaction Model—coordinates inter-domain planning, action, and learning; Service Management—coordination of services, i.e. by primary physician, HMO; Relationship Management—direct result of use, i.e. doctor/patient communication; Purpose Driven—shared mission, i.e. patient health planning and monitoring; Survey research—evaluate partner needs, i.e. patient registration and review; Participant tracking—monitors interaction, i.e. provider/patient performance; Performance monitoring and reporting—graphs, reports and calculations; Benchmarking Research—turns tacit experience into documented knowledge; Portfolio Management—Analyzes and Synthesizes the components of a portfolio.

Types of RSVP Servers include, for example, a main server. Main RSVP server not only listens and handles client's requests, but it can also communicate with other main or supporting RSVP servers on a peer-to-peer basis to perform different tasks in a distributed fashion. All the servers are multi-threaded and can handle several requests concurrently. Any requests to the server from a client or from one server to another are made following a predefined request protocol, which may encapsulate other data structures that might be necessary for the request to be handled properly. Similarly, the responses from the servers are also made in a format based on predefined response protocol that encapsulates a response code and any other data that might have been requested. RSVP Upload server acts as an adjunct server, which can either run as a separate thread of the RSVP Main Server or independently on a separate machine. It runs at a port different from RSVP server. The client's browser applet or application requests to upload a document (could be any of the binary of text based formats) by posting a HTML form encoded using multipart/form-data (as specified by W3's HTTP standard). When the upload server receives such a request, it spawns a new thread to handle it. The submitted data is parsed for the header, request fields and files submitted. Request fields contain values for the server's address, username, password and folder where the file is to be uploaded. The upload server's thread serving the request then opens a connection to the specified server and uploads the document. On success, an appropriate HTTP response is sent to the client along with a complete URL of the uploaded page, which now serves as the address of the document in the cyberspace. The unique feature of RSVP upload is that this address now becomes the URL field of the related record and is saved both on the local client database as well as the back end database on the main RSVP server.

Another type of RSVP Servers includes, for example, a calculation server. Like upload server, it can either run on the same machine as the main server or on a separate machine. Several different kinds of calculations are to be performed by data server on a domain's data. These calculations are then relegated to the calculation server by data server to distribute the load.

Yet another type of RSVP Servers includes, for example, a message server. RSVP Message Server maintains a queue of messages for peer-to-peer communications between different RSVP servers. Whenever an RSVP server tries to communicate with another server but fails, the message is then stores in the queue of RSVP message server which then tries to resend the message at periodic intervals.

The data and file structures of the plurality of RSVP Servers includes, for example, a Uniform Domain Structure. In general, a domain is a physical location in a server where data owned by an entity is stored. The name of the database is a combination of host address of the main RSVP server and username.

All data and file structures will also comprise dimension, which is the hierarchical depth or linking in database. In a UI it is same as the number of columns of items.

Uniform Records form the core of RSVP data structure. All data files on the server are written using this record. The fields are separated by a '|' character and the record is saved as a concatenated string. Similarly, on the client side all the records in the local database, which also directly correspond to buttons on the UI, are an instance of this record. A Uniform Record has following fields:

BID/CID: This field is called a CID on the server side and BID on client side. A CID contains a number of 'x', '1' or '0' characters on either side of a '-'. The number of characters on the left side defines dimension of that record. Any record with equal number of characters on either side of '-' are called items whereas the ones with unequal sizes are called options. A BID on the client side defines type of record (identity or item), depth (dimension), index of the record in the list and the indices followed in the preceding records to reach this particular record;

Label—Label of the record;

Description—A detailed description of the record;

URL—Location of the media in the Internet/Intranet;

Media Type—The type of media to be used while showing URL of this record; and

Number Type—Type of the value contained in the record, which is used for formatting the value being displayed and performing calculations on the server side. It also defines min and max possible values and if the values (Items) shown are in any particular sorted order:

Value—Quantity as defined by number type;

Rank—position of the record within a file;

Link ID—A unique identifier of the record. When a record is copied from an original one, it inherits its link id which now defines the relationship between the two. It is generated randomly; and Date/Time—of the creation of the record.

All files in the RSVP system have the same name as the identity record they contain. Records other than identity in the file are either options or items.

Further, there are objects in the RSVP system and they comprise types of RSVP (User Creatable Knowledge) objects, for example, RSVP Knowledge Objects. RSVP Knowledge Objects are user creatable and definable objects that populate an RSVP Domain as records and User Interface as Buttons. They are instances of Uniform Records containing all the fields required for a complete record as defined above. On the server side, these records are maintained as lists under an identity record, including the identity record itself, and on the client side they reside in memory as instance of records and can be visually represented by the User Interface as Buttons.

Additionally, there are Item Objects, which are instances of Uniform Record. They belong to a particular set or file of data by virtue of their BID/CID (see BID/CID above) and are listed below headers in the User Interface. Headers comprise at least one or more of the following: Regular Items—Regular items are non-identity records in the data and item button in the user interface. All the items belonging to an identity record are listed as buttons in an item panel and are positioned below the corresponding header (see Item Header below); Option Items—Options items are also non-identity records listed under option identity records in the data and item button in the user interface. They are also defined using Uniform Records, but rather than being actual objects they form classes or categories that are separate locations for data to reside that fit that class or category. Default Options—A default option item is the first option item in the list and is a copy of the option header with only difference between the two being their CIDs. In a user's default view all the items and item header are chained to by using link ids of default options. A user can specify a non-default option to be default, in which case the new option becomes the header (identity) and first option item in the list.

More specifically, Headers are the "identity records" that identify the dataset they belong to. The Header records are called "identity records" because in a file system (on the server or client) it is the record that has the same CID/BID as the file or table name. On the GUI this Header is represented as a bigger button positioned over an Item Panel. This is why it is called a "Header". The Item Panel is filled with a smaller button for each item record in the dataset.

For example, Regular Item Headers (Diagonal Headers in the UI) Regular item headers occupy diagonal position in the knowledge navigation table on the client's User Interface. On the server side their CIDs have equal number of characters on either side of a '-' characters. The first digit in the bid is a 0 and second and third digits are equals. Regular Item Headers are located by an identifier that is a combination of link id of an option having same dimension as the header and an item chosen in the preceding dimension. Described another way, unique paths to all regular items or diagonal headers are formed by a combination of the link of a preceding item and the option category to which this header belongs. Hence all the items belonging to the regular item or diagonal header are accessible by following this unique path. Option Headers Option header is the same as default option except for its CID. The CID of an option header defines it as the identity record on the data side. On the client side, it appears as an option header button right above option panel. It can only hold positions in the $1^{st}$ row and any column except the $1^{st}$. The cid of an option header has unequal number of characters on either side of a '-', and on the BID the second and third digits are not equal.

RSVP Knowledge Object instances (as described above) are stored as data on the data server in a labyrinth of datasets that are located according to specific rules that depend on the specific situation. For example before RSVP Instance Objects can be displayed on the GUI, the data describing these instances must be read from the server. Therefore the server must link through the datasets to find the appropriate data for a given client request. In this example then the GUI will be able to display all the appropriate RSVP Objects in the "Knowledge Navigator" described below under User Interface.

For the GUI example the data files for the first column in the UI are found in data dimension 0 in datasets having CID filenames with one digit on both the left and right sides of the CID i.e. X_X). The option item listings are found under the Option Header buttons that start in the second column in the UI. They are still in data dimension 0 because the right side of the CID still only has one digit. Data instances for these option items are found in the dataset name (CID) for successive columns determined by progressively adding one more digit on the left side of the previous columns CID with the right side remaining with one digit, (i.e. XX_X for column 2/dim 0 or XXX_X for column 3/dim 0, etc.) These datasets are kept at the same level (dimension 0) of the file system or dataset hierarchy (same level as the top level where the domain begins).

The data for subsequent Diagonal Headers are in datasets (considered to be in further dimensions down and listed in Diagonal Header buttons progressively one more row down for each additional column) that are kept in dataset locations, directories or folders with names that are derived by combining a Link ID from an item in the option file for the subsequent column with a Link ID of an item in the preceding dimension. Once the new location is linked to, the dataset must be located for the items in that next dimension. The CID of the next Dimension is the dataset or file name where items can be located for the next dimension. The CID name of the next dataset holding Regular Item Instance data (to be listed under a Diagonal Header) is determined by adding another digit to both sides of the CID of the previous dimension. (See "CID Growth" in the more detailed description of the invention). Linking through the datasets to pick up appropriate data for a given GUI or other requirement progresses in this way through each path that has data in the next dimension for each relevant item until all there are no more subsequent dimensions with data.

There are different ways that the desired instance data is determined for a particular situation. For example, a client can choose to narrow down what is read from the data store to only include the top ten items in a particular dimension.

RSVP system also comprises a dictionary that maintains list of all the Uniform Records created for search and updating at a later time. A domain level dictionary contains all records that have been created, used or received by the owner of the domain. A shared dictionary on the other hand keeps all the records used, created and received by domains participating in the share. Each record in the dictionary also contains links to a usage file. This usage file contains a record of all domains and files that are currently using the record. If a user domain has opted to be informed of changes to the original record, then it is informed of such changes. Also, the domain of the author is kept track of so that an item can be prevented from being edited by someone other than the author.

User Interface (UI) Components (See Figure Depicting GUI) will preferably comprise, for example, an RSVP Window. In the preferred implementation, the RSVP window is the left frame of the browser window that shows the RSVP applet. It will also comprise a Toolbar, which is the topmost horizontal bar on the Graphical User Interface and contains following buttons: IN or Setup, List, Send, Receive, Refresh, and Home. Further it comprises Active Window, which is a container panel right below toolbar and above knowledge navigation panel. It can either show description of a record or other panels depending upon user's actions. Also, it will preferably comprise an Edit window which is below the toolbar and contains labels, text fields and buttons. It shows all the fields belonging to a currently selected Uniform Record (UR) other than link id and rank. The labels in the panel define names of the record fields and text fields their corresponding values. Number and Media types are represented as buttons that can be clicked to change their values. The buttons at the bottom of the edit window allow for saving, removing, replicating of the record, whereas upload brings up an upload page in the media window thereby allowing users to upload their documents.

RSVP system will also comprise a Knowledge Navigator Window and its Buttons. These buttons are instances of Uniform Records that show in the Knowledge Navigator (See figure depiction the GUI) as buttons with a label or graphic. Buttons can represent following records: (a) Header: These records are also called headers. In case of items, these headers form diagonal buttons on the navigation panel. In case of option these form all the headers on first row except the one on first column. The first click of such a button shows description on edit window and item panel or option panel beneath it. Second click allows for editing of the record on edit window; and (b) Items: The first click on a button shows description of the record whereas second click shows an edit window that allows users to edit different values of a record. If the record has a URL linked to it, it is shown on the media window. When an item button is selected a subsequent identity button is also shown on the navigation panel.

Item panel is a panel holding a list of item buttons under an identity record, also represented by diagonal headers in the navigation panel. No more than 10 items can be shown in a given view. A user can see the next or previous 10 listing of items by clicking down or up arrow on the panel correspondingly. Option panel holds list of options under an option header, just as the item panel.

RSVP system will preferably include an InPanel which is viewed within Active window and has following components: (a) Ftp Server: It shows the list of ftp servers where the user can upload his documents. Such a list is maintained on the servers-side and every time a client wants to view it, a request is made to the server for the list and displayed in FtpPanel upon successful reply. A user also has ability to add new ftp servers to the list, edit and remove existing ones; (b) Partners: Much like ftp server list Partner list allows a user to view, add, edit and remove partners. The details of this function are described under Partnership; (c) Number Types: Allows to view, add, edit and remove Number Types (d) Media Types: Allows to view, add, edit and remove media types; and (e) Items: Items can be added to the main dictionary from here, and (f) Options: Options can be added to the main dictionary from here.

RSVP system will preferably also include a media window. The right frame of the browser window is called media window and is used to show URLs of a Uniform Record as defined by the record's media type field and currently selected in RSVP window. In addition to Audio/Video, Web pages, Graphics and more, "media" can also be any other software that is accessible from a web browser. See exhibit showing all the types of internal and external programs that can be accessed that are outside of but accessible from RSVP.

In one embodiment of the present invention, INTV is a networked management and communication service that enables others, without prior programming experience, to easily program software applications that can be distributed under the Intellivision® (INTV) or other names and used to manage communication and interaction in a network. INTV is based on the AFFIRM technology that enables the representation, control and coordination of the dynamics of networks in a data driven way. Basically it helps any entity to communicate with other entities in the recognition and selection of opportunities as well as the coordination of opportunity realization. AFFIRM is a predictive and prescriptive framework for capturing and controlling the dynamics and behavior of a network. So as a result of the use of an AFFIRM based system, research is automatically being done and applied to enable learning and enhance performance network-wide. As applied in health, INTV is both an intelligent vision for how healthcare can be greatly improved, as well as a tool by which this and others' visions can be planned and enacted.

Although healthcare networks are only one of many different types of networks that will benefit from being better managed with AFFIRM based tools, discussing the AFFIRM application in this volatile, uncertain, complex and ambiguous environment will shed light on the technology's value in a host of other analogous situations. In terms of health, an AFFIRM based system enables all network participants (those involved in health related activities, actions, interactions, transactions, etc.) to have the intelligent vision necessary to make wise decisions and coordinate secure implementation of those decisions. Thus the AFFIRM based tool will provide users in healthcare with enhanced vision and action, with the economical enhancement of patient health as the driver. The underlying intellectual property (AFFIRM), that makes INTV possible, is relatively complex. This application review is not intended to give you an "under the hood" understanding of it, in the way the previous parts of this document did. This section will explain the concepts, so you can understand its potential, learn a bit about how it works, and also see some quick examples of its use in healthcare.

Both individuals and whole healthcare delivery networks will benefit from improved quality and efficiency, while reducing medical errors and increasing patient safety. And at the same time, with unparalleled security and control, any individual or organization in the network can be empowered to have an incredible array of valuable new integrative opportunities. These integrative opportunities tend to result from the better data modeling, collection and sharing capabilities that this data driven communication and management technology facilitates.

A Personal Domain (PD): provides a personal and secure digital portfolio or knowledgebase in cyberspace; organizes your business and personal info (work, health, education, etc.), enables you to access your personal information and take action from any web browser, and enables you to easily and instantly share organized parts with anyone as trusted and desired.

The core principle of our fourth generation communication networking technology is based on the concept of a Personal Domain. A PD is an individualized "knowledgebase in cyberspace". It makes all of your critical personal or business data (e.g. work, medical, legal, financial, educational, commercial, etc.) electronically accessible and actionable by YOU from anywhere. And last but not least, all of the pieces of data in a PD can be instantly shared (sent and received) with anyone on a secure and as needed basis. Each entity with a PD, e.g. a doctor's office, physician, patient, etc., can take a holistic approach to their performance, physical (health), financial (accounts), etc. In terms of healthcare applications one area in which this invention will be particularly beneficial is in managing (employer, employee) individual health savings accounts (HASs), a healthcare financing and administration tool recently approved by the US congress.

You can see from points 1-3 above why this invention is a mix of database and communication technology. And as far as databases go, many think that a PD will be to centralized databases, as the PC was to mainframes. You can see by point 4 that there is also some communication technology involved here akin to email or IM. But a PD is also better at communicating structured information than email or IM. One of the beauties of a PD is how it enables the information sharing (or collaborative) process to be organized, efficient and secure by allowing members of a network to share organization templates and each person in the network to immediately see the important or pertinent information, organized according to their priority settings, for their current context or activity.

If you've ever tried to organize your emails, attachments and other related documents into folders, and then tried to share this same information in the same organization scheme with others using different computers, then you know how difficult it is, today, to achieve just one of the benefits that become automatic with PDs and the AFFIRM technology on which they are based.

To help you better understand the significance of this new communication technology, I will present $1^{st}$ the evolution of communication networks, $2^{nd}$ why PDs are unique, and $3^{rd}$, why they are valuable in Healthcare. Basically the value or benefits result from finally being able to have the right information, at the right place, at the right time. If you are experienced with the healthcare system, you know this ideal is still just a dream.

The first generation of a communication network, such as used in the military and large corporations is the chain or top down network. Its weaknesses include the fact that it is rigid, insular, and has low member satisfaction.

Figure 3:
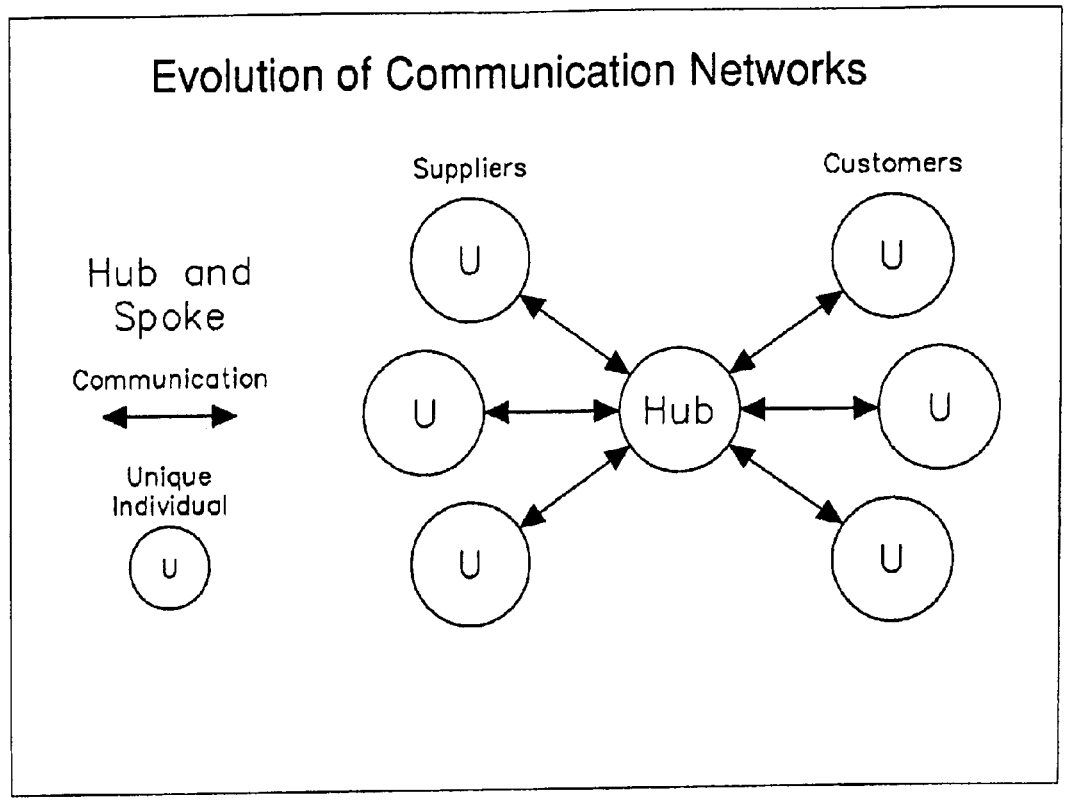
FIG. 3 shows a Hub and Spoke phase in the evolution of communication networks.

See FIG. 3 for a drawing of second-generation networks. The second generation, hub and spoke, is not secure, has only moderate member satisfaction, is disaster prone, and scalability is difficult. These weaknesses have plagued many e-commerce hubs.

Figure 5:
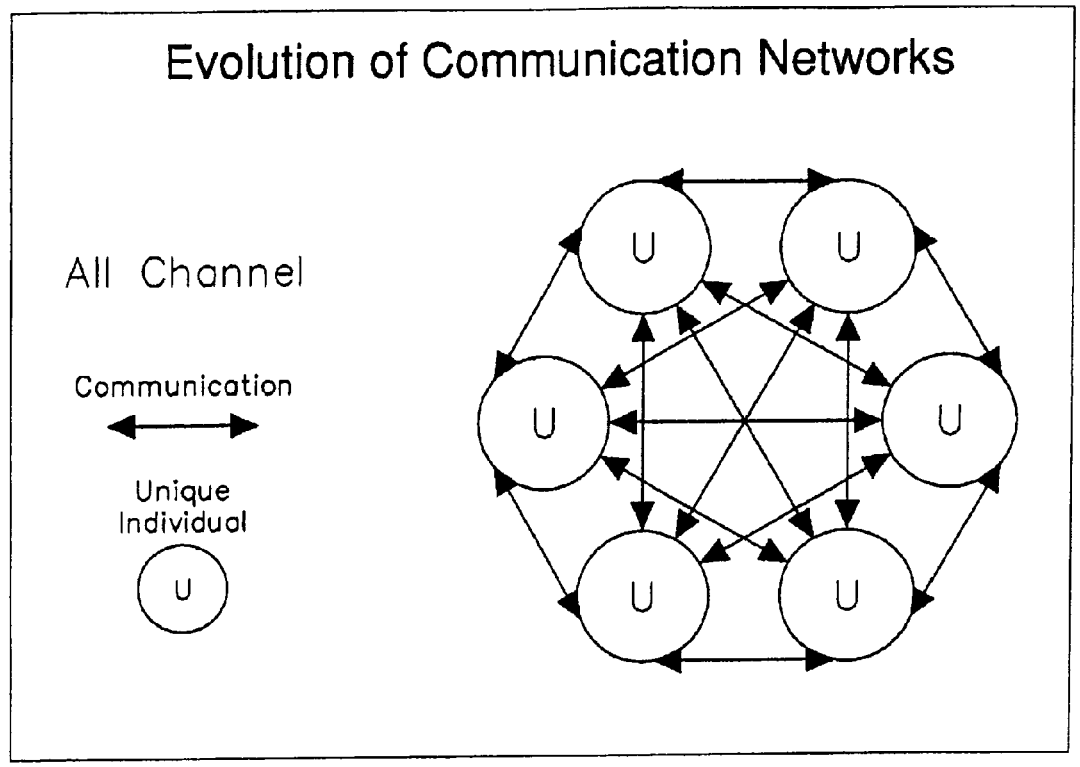
FIG. 5 shows a Channel phase in the evolution of communication networks.

See FIG. 5 for a drawing of third generation networks. Current or third generation is used in email and instant messaging. They are not platforms for passing organized (or what we call structured) data. Other programs that do handle organized data, like today's spreadsheets and databases, cannot share and integrate data fluidly. The third generation's all channel approach without data structure creates chaos and insecurity, causing users to be subjected to viruses, junk-mail, information overload, and constant interruptions.

Instant messaging is no better than a phone in that the doctors need to be online at the same time as the patient. Current methods involving fax and repeated data entry will no longer be necessary. Altogether, the current generation makes it virtually impossible for a professional care provider to use communication and information technology efficiently and effectively.

Figure 16:
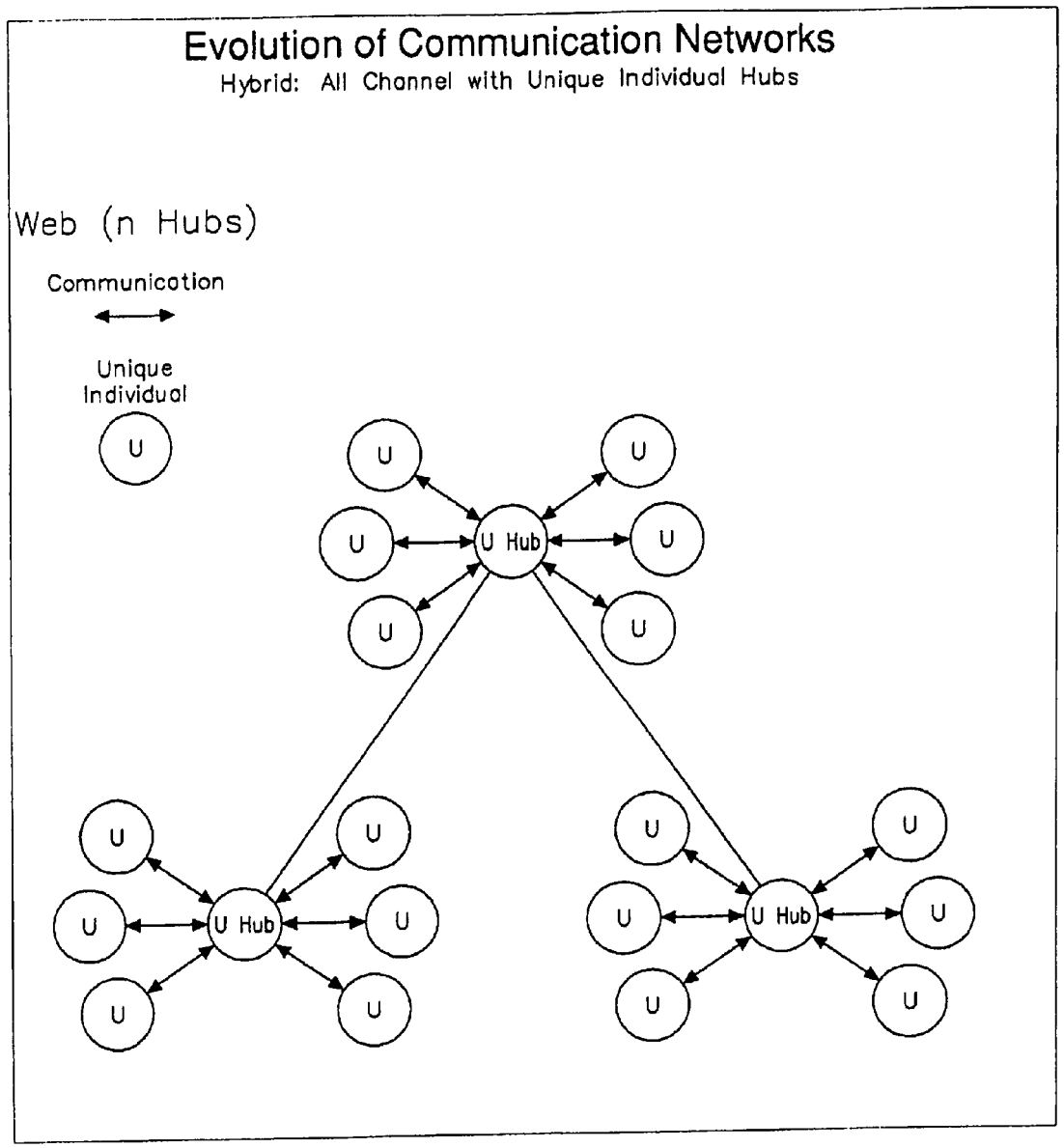
FIG. 16 shows a hybrid "All Channel and All Hub" phase in the evolution of communication networks, made possible by AFFIRM. The figure provides a look at how Personal Domains (PD) and other AFFIRM technology enable network-wide data integration and aggregation without requiring everyone in the network to use the same inflexible data structures or to continuously do complex data transformations, one or both of which are required by all other information integration systems available today. This unique achievement as well as the unique ability to inherently provide individual privacy and self-control over all interaction, e.g. data sharing from Private Person-to-Private, Semi-private and Public Partners without requiring a third party security provider, make AFFIRM based systems practical large-scale solutions for managing public health and other security applications. This chart shows on a little bigger scale than previous charts how the data from specific individualized domains can be securely shared (with optional de-identification) in order to provide increasing levels of aggregation in information as well as evaluation and decision support to any level of resolution in increasingly inclusive and/or more public domains.

See FIG. 16 for a drawing of next or fourth generation networks. In our Fourth Generation communication networks each PD represents a unique individual or organization. Each PD is a separate personalized interactive hub capable of sharing organized data in a secure manner. Anyone who is even remotely familiar with the limitations of current database and communication technology says "WOW"! And we challenge you to show us any weaknesses.

We enable Personal Domain (PD) users to set up "partnerships" by either proposing or approving each private communication link with another PD. We also then enable the sharing of common organization templates between partners. Then enhanced (organized, qualified, and prioritized) communication (including all sorts of media: voice, data, video, email, documents, etc., is easily managed and securely done on an as needed and trusted basis. Database gurus and end users alike are amazed because a PD provides an individual with control of "One Worldview through One Window!" ("OWOW!") As a result of this innovation not only are non-technical individuals and organizations empowered, but also an incredible array of valuable integrative opportunities become possible, all while maintaining an unparalleled level of security. Anyone who tries it is amazed at how they can better manage their world through this one window in an Internet browser or hand held device.

The application areas in healthcare where this new enhanced form of interpersonal and inter-organizational communication and management can be used include: Provider Network wide Communication, Education and Dissemination of Knowledge, Patient Case Management, Patient Driven Health Improvement, Practice Research & Development Management, Product Portfolio and Change Management, and Supply Chain Management.

So, whatever your field, there are 6 listed here, Intellivision (and other AFFIRM based software or services) offers a unique and valuable solution. As mentioned above using a PD to manage ones health, including a Health Savings Account (HSA) and ones health maintenance activities is an excellent application. One requirement to enjoy the benefits of an HSA, e.g. tax deductibility of all contributions, is that participants owning HSAs are responsible for substantiating the legitimacy of expenses from HSAs. Since a PD connected to a health network is able to automatically monitor and track all healthcare transactions, having a PD would be an excellent way for HSA participants (i.e. patients) to do this.

Figure 21:
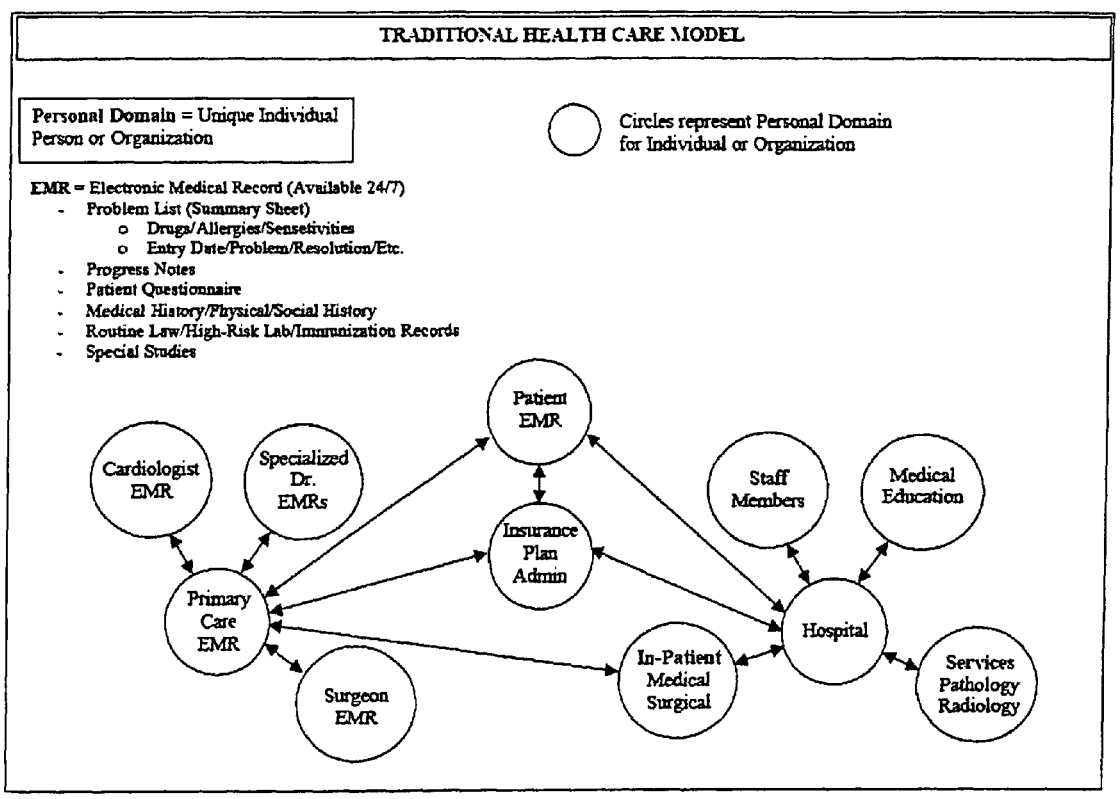
FIG. 21 Personal Domains enable electronic medical or health records while maintaining the strictest privacy and HIPPA, all within tradition health care models.

The focus of the rest of this description of use in healthcare is on how it can be used to better manage communication and care by sharing Electronic Medical Records (EMRs) across and along the healthcare network. Another beautiful thing about this enhanced communication technology is that it flexibly adapts to any type of network, whether traditional, contemporary or futuristic. (See FIGS. 21 and 22) INTV can be used to enhance any healthcare model including: (a) traditional such as: (1) departmentalized; and (2) specialized; and (b) contemporary such as: (1) holistic patient centered case management; and (b) evidence-based; and (c) futuristic: (1) telemedicine; (2) practice based research networks (PBRN); (3) accelerated translation of research into practice (A TRIP).

Healthcare leaders anticipate that a national and international electronic health information network will provide a quantum leap in patient power, doctor power, effectiveness of care and reduction of health care spending by over 10%, as well as security and privacy of information.

By using AFFIRM technology, INVT Intellivision can be flexibly adapted to work with or support any network model. First, let see how this will work for the above traditional Health Care System model. Each circle represents a personal domain (PD), where each entity has their PD. There are three focal points in this particular model: the patient, the primary care physician working within the PC, and the hospital. The health insurance payer organization is also included. The EMR incorporating the patients history, physical, laboratory, allergies, medications, and life-style is initially developed, under the new HIPAA guidelines by the Primary Care Physician and is stored at both the patients location (perhaps on the Internet) and on the network of the PC where the physician practices. Selected information, with the patient's permission, is transmitted over an extranet to the health insurance plan administrator. It is important to understand that there is a separate location for patient data for every entity that is exclusively accessed and changed by that entity, i.e. hospital, care provider, payer, patient, etc. Since data is replicated in different locations according to the data owners wishes, everyone can have there own data that they control access to. And since the data flows so easily between these different distributed locations using an AFFIRM based system, the right (amount and parts of) information is still economically available for the right person, for the right reason, at the right place and time. This alleviates data ownership concerns that make centralized community data repositories a problem, while still enabling open sharing under complete control of information owners (information creators, authors, and/or in the case of "private" information, the individual(s) that the information is about). There are other systems that support the distribution of EMR and other data while enabling users to see data from these distributed systems in a common view, but they still rely on preprogrammed transformers that must be specifically programmed for each disparate data source (table format) and view. Because of this, each time the data being kept is changed, the transformers need to be reprogrammed. This means there is a huge expense for maintaining and integrating these other types of distributed systems. Because AFFIRM based systems don't require this, AFFIRM is a unique and valuable technology for healthcare and other applications of distributed computing.

Figure 22:
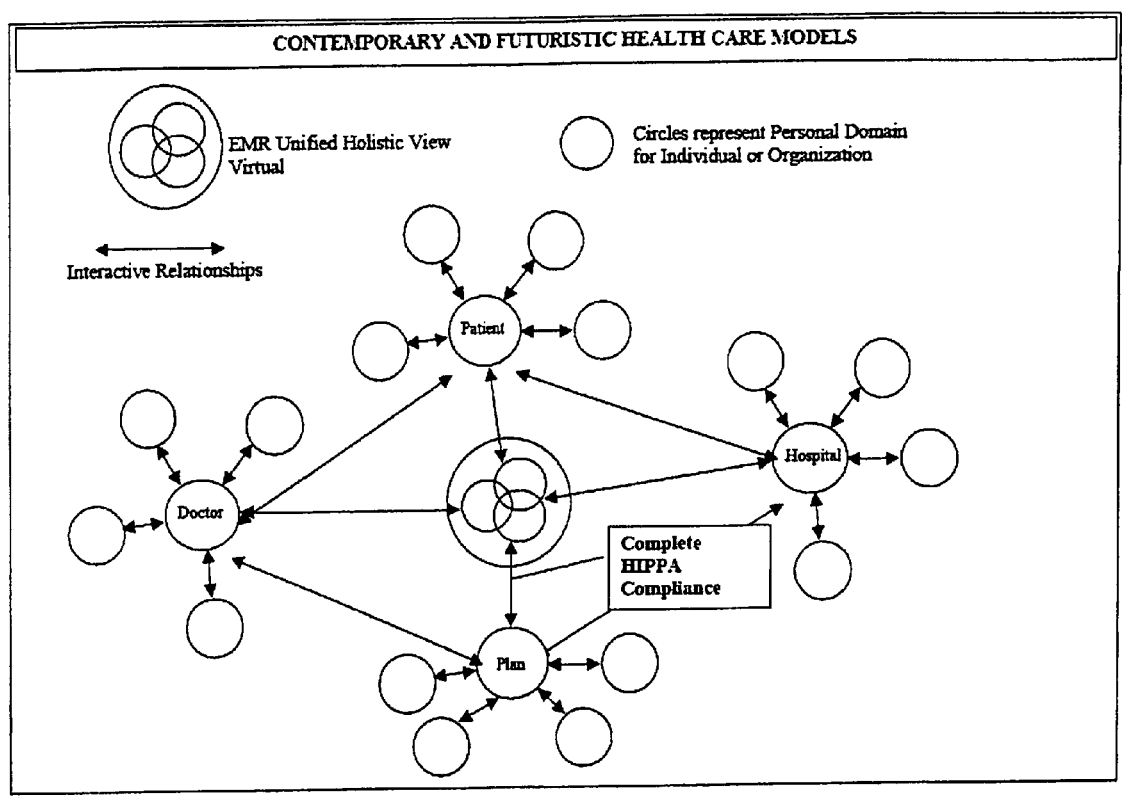
FIG. 22 by combining parts from all different sources while only showing personal information that is authorized by the patient or data owner, a unified holistic view is provided at any level of aggregation, inclusiveness, resolution and/or level of detail.

FIG. 22 shows how PDs support any contemporary or futuristic healthcare model. By combining parts from all different sources while only showing personal information that is authorized by the patient or data owner a unified holistic view is provided at any level of aggregation or inclusiveness and resolution or level of detail. Now whenever and wherever the patient returns for care, e.g. the emergency room, the EMR is modified and kept up to date. The physician can decide to add and keep track of any additional type of information that is considered appropriate without disrupting the flow and processing of existing types of information, without "rewriting the application program". The plan administrator (i.e. payer) can easily be consulted for approval of anything in a timely manner. The physician may refer the patient to a consultant, i.e. urologist, with their complete EMR, including specific problems, and/or admit the patient to the hospital. (See example below under the "Transactions" slide.) In either case the relevant aspects of the EMR with the important information summarized is delivered over the extranet to the specialist's, hospital's, and/or other designated party's domain. There is no need to duplicate information entry. The anesthesiologist, the lab, and other health providers would have access to that portion of the patient's information that is pertinent for them and be able to add to the EMR appropriate new data. Even emergency paramedics and other personnel can be given access to the patients EMR wherever authorized or needed through a simple Internet connection. The patient's URL and password can be on an arm band, ID card or other ID that is only accessible in case of emergency by emergency personnel. The finance dept. shares selected information with the payer for reimbursement. This system has great economy; improves patient safety, and improves the quality of care.

Each of these thirty circles represents a unique personal domain. Each individual person or organization sees the information about the patient from their perspective. In order to have a high quality care network, all these different record formats must not only coexist, but also be able to change as new research findings dictate. They are also necessary to reflect the unique perspectives of the different individuals involved in the care network. One big advantage of our system is that we can allow these different perspectives to coexist while still being able to easily unify them all into ONE WINDOW to give a simple yet holistic view of the patient's unique situation, without the normal data conflicts. One practical result of this breakthrough is that each unique health-plan administrator, primary care physician, hospital, or sub-specialist can decide, with the permission of the patient, what information they want (e.g. HIPAA).

Figure 10:
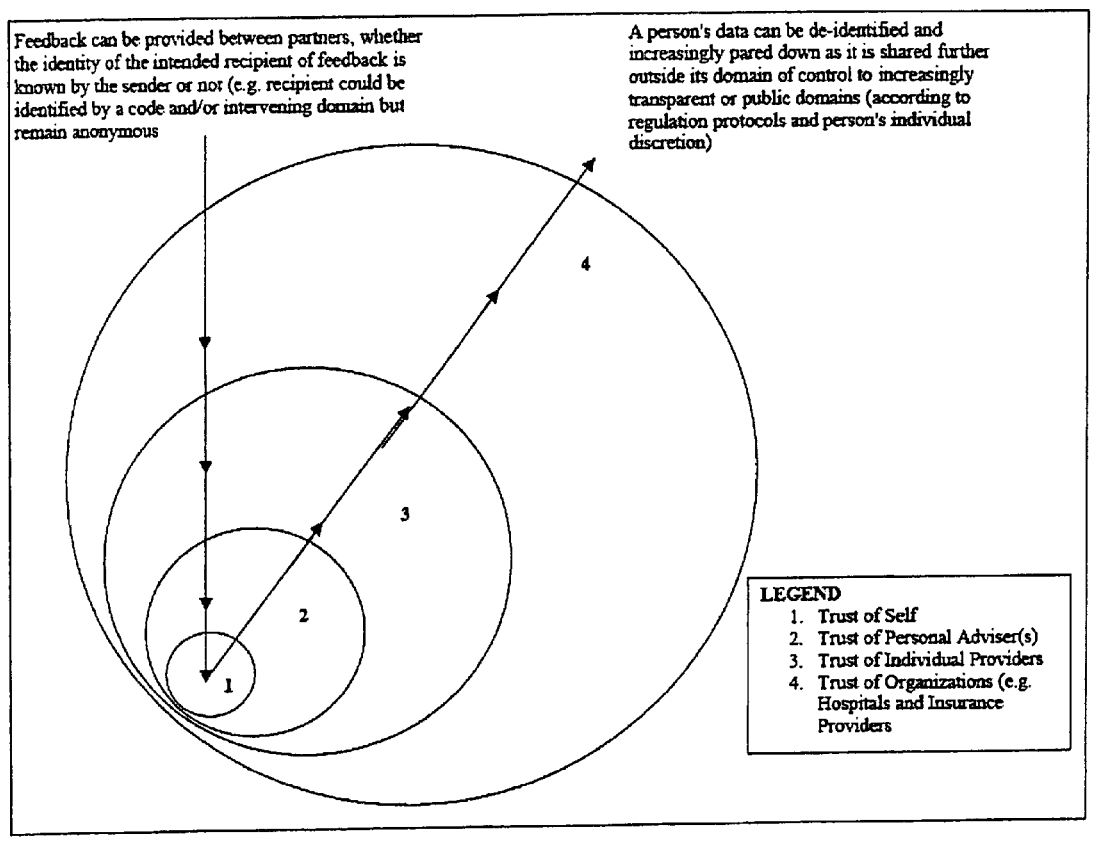
FIG. 10 shows the expanding universe of trust & application of an AFFIRM-system.

FIG. 10 shows the expanding universe of trust that is provided by INTV/AFFIRM and enjoyed by doctors and patients who share information with others on an as needed basis. This enhanced communication technology is very HIPAA compliant and develops trust between the patient, care providers, and others in the system. Another aspect of the AFFIRM technology is how the architecture enables important information to be shared from one aggregation level or sequential stage of the care (providing or receiving) network to the next without necessarily sharing the private details. This enables coordinated data capture, interaction and learning network-wide without requiring all parties to totally trust each other, agree on data formats or reenter data.

For example a hospital can aggregate all its performance metrics to include data on each procedure across all patients without requiring data specifics that identify patients or data structures to change. In the same way information from all hospitals in a network could be aggregated to a higher level, with or without details from lower levels, without reprogramming or restructuring data. Data structures don't even have to change to group procedures by any number of different types of procedures or even different schemes for and coding procedures. Also, as work passes from one point in a process to the next, the outputs from one sequential stage shifts to be the inputs for the next sequential stage without requiring reentry of data or changing data structures. For example, a certain type and instance of medical instrument functionality or material supply (e.g. medication) can be the output of the hospital and an input to the physicians procedure or the patients care.

See FIG. 1 for a depiction of the main goals and interactive processes needed to nurture synergistic relationships and knowledge in a learning individual or organization.

Individuals and organizations in healthcare have these same needs. They need a better way to manage interaction and organization in order to create value, lower costs and improve quality. The collaborative healthcare enabled by Intellivision (i.e. AFFIRM) satisfies these needs while maintaining privacy. As a result it creates value by better managing complex cases that can consume most resources and minimizing chances of problem escalation, resource over utilization and privacy breaches.

Intellivision offers the opportunity to enhance coordination of care wherever and whenever it is being provided. It enables Healthcare to better manage organization and interaction to improve collaborative healthcare on a 24×7 basis over the Web. As a result, care costs are lowered, quality is increased and mistakes are minimized. This preserves value by securely sharing private information and it creates value through innovation and collaboration.

INTV enhances communication, coordination and integration between different parties: Physician-to-Physician: information for second opinion, referral information, lab and radiology results; Physician-to-Patient: EMR information, reports, alerts & alarms, prescription information, education materials; and Health Plan-to-Provider-to-Facilities: EMR data, outcome data, evidence-based findings.

Workflow and interaction are enhanced, as all EMR based data can be easily communicated in an organized way on an as needed basis, again 24 hours a day and 7 days a week. Media are shared as URL links to files easily uploaded to the web, they are not shared as attachments. This alleviates passing viruses. [See GUI view showing the underlying properties (e.g. URL) of an Intellivision button object.] Direct IN-EMR word processing, messaging and other applications keeps everything together in the One Window organized by activity for a given patient care provider, etc.

The types of transactions that can be coordinated with the system are unlimited. Some different operational scenarios include: Physician-to-Physician: referrals, treatment ideas, EMR templates, on call agreements; Physician-to-Patient: Registration, scheduling, prescription refills; and Health Plan-to-Provider/Facilities: Authorizations, pre-certifications, credentialing.

For example tests can be ordered by the physician, i.e. to be performed by radiology or pathology lab, etc. (in conjunction with the patient), performance of test can be coordinated between the lab and patient, and both physician and patient can be informed of results, and further appropriate patient treatment can even be triggered and performed.

The below GUI view shows an example of a radiology test that has been shared with "Patient 1" by sending a button to the right location with the Patient1 domain and EMR.

Figure 23:
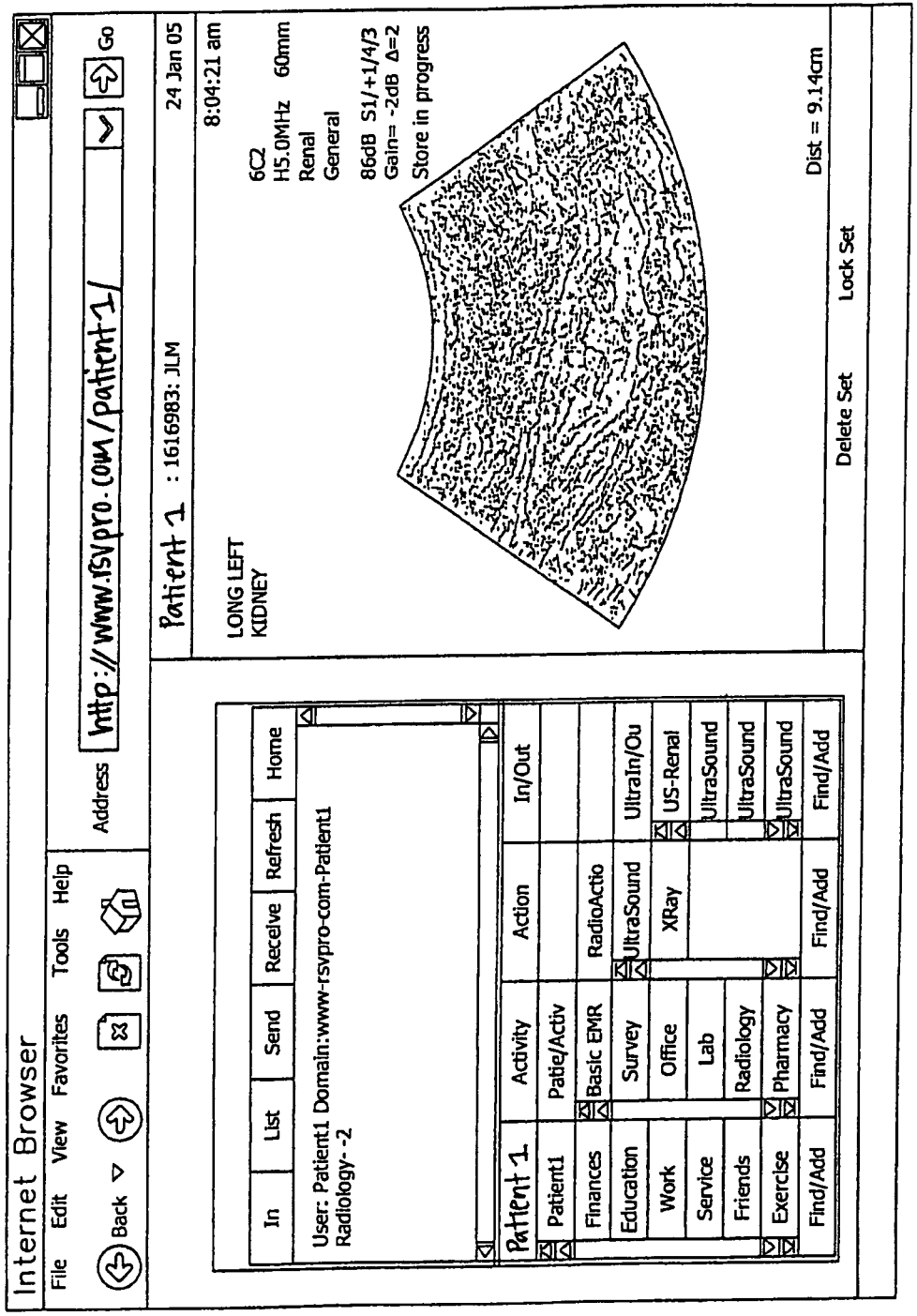
FIG. 23 shows the Internet browser view of an AFFIRM-based domain that depicts how a given media document (e.g. radiology test) has been shared by being linked through the URL of the uniform record (Input Output Object—IOO) for a end-user created button (object) in the graphical user interface (GUI). When shared with other users the button and access to the linked media or document is automatically synthesized into the larger domain and placed in the logically customized location or custom presentation that is appropriate for viewing within the record structure (e.g. electronic medical record (EMR)) of each domain and owner or Home Subject, (e.g. a patient).
Figure 24:
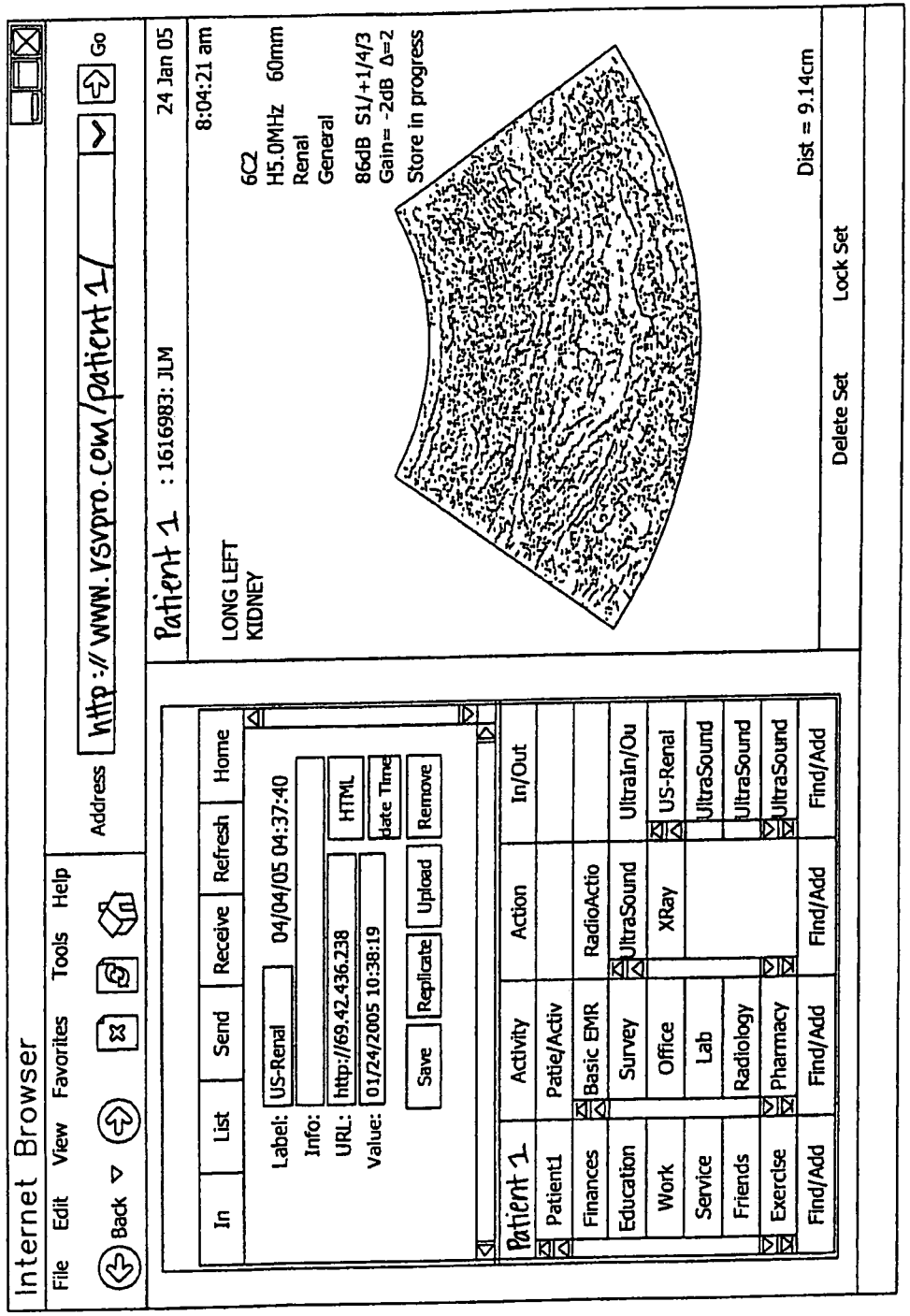
FIG. 24 shows the parts of the uniform record and object properties that are editable from the browser by the data owner in this particular AFFIRM implementation.

FIGS. 23 and 24 show the Internet browser views that depict how a given radiology test document has been shared by being linked through the URL of the record (Input Output Object—IOO) for a button in the GUI appropriately and automatically placed within the EMR structure for the domain owner, in this case the patient. FIG. 24 shows the part of the uniform record that is editable from the browser by the data owner. The button represents that given test and is automatically organized within each recipient's given domain. In the above example it is the patient's domain, but the button would be in the right position(s) within the EMR for each party, i.e. the PCP, specialist, and other domains the links have been sent to, under the control of the data owner/controller. In the case of this radiology test document, each button that represents this document, regardless of which domain(s) it is replicated in, has a link to a single archived radiology test document location (See "URL" text field in below view. Again, the AFFIRM technology enables the button representing this document object to be replicated and link to this one single document version, from the right data location and GUI view position within each of the parties' separate electronic medical record data store domain and viewer.

Any action, not just a radiology tests, can be planned and transacted in a very fluidly flowing process using this invention, and it can be done entirely electronically and automatically where appropriate. Going further with this example, if the results of a test are not normal an alert of both physician and patient can be automatically triggered, and actions can be planned and implemented by an AFFIRM based system. These alerts and other messages are prioritized according to severity and/or other factors relevant to each given party for each given party. For example a physician would see issues (represented by buttons and other content, related to potential, planned, enacted or other types of objects, events, activities, processes, etc.) for ALL patients ordered by priority according to that physician's criterion such as urgency of required response. And the patient would see all their individual issues and actions prioritized according to the patient's criterion. This enables each party to more productively manage and communicate their concerns and actions, i.e. the physician's time and care activities, and/or the patient's health treatment/maintenance activities. This was just one example to the unlimited types of things (objects representing the who, what, how, why, when, where, cost and extent of a shared healthcare process) that can be coordinated through the utilization of the frameworks, functions and interfaces of the AFFIRM invention.

The ability to do all sorts of evaluation right in line with other collaborative functions such as communication and transactions in is an important aspect of INTV. Evaluation can be done on data that is automatically as a result of the use of the system. Evaluative information can be provided right at the point were work is being done in records that go along with transactions and/or in interlinked report and graphs that include: Physician-to-Patient: Health indicators, med compliance, disease progression, care needs; or Healthplan-to-Physician: provider quality performance, financial performance.

Right in line with the medical record, the above types of analyses can be done to make better care decisions. Also, the quality and performance (financial and otherwise) of separate parts or entities in a network can be constantly monitored and tracked as they change over time.

Figure 26:
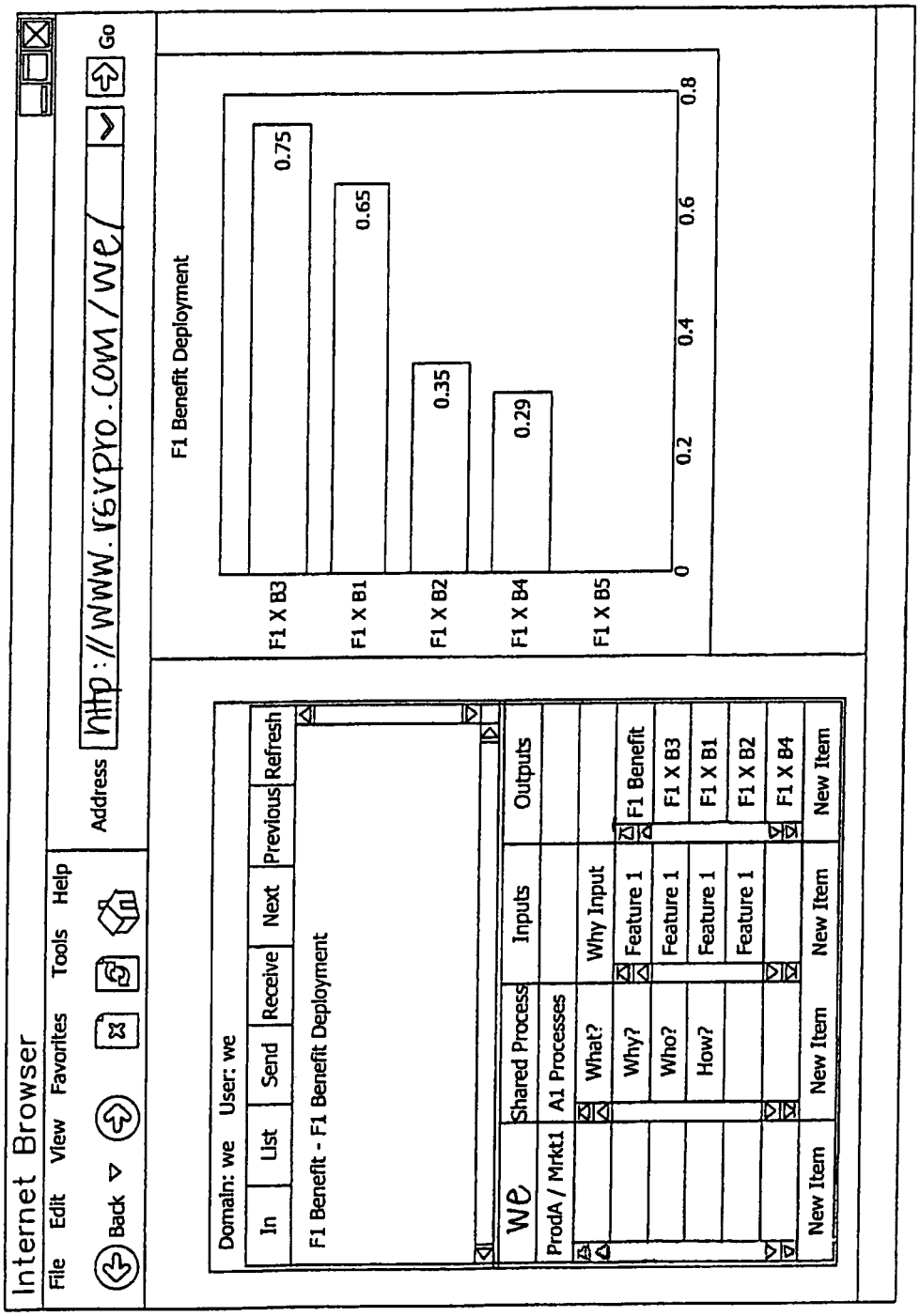
FIG. 26 shows that AFFIRM can calculate and tell participants in a shared process or network "Why" a given product ("Product 1") would be recommended as beneficial for a given market ("Market 1") need. The view shows how an AFFIRM based system can display the particular features of a particular product (e.g. medical procedure) and the particular extent of the benefits of these features for a particular market (e.g. patient). The specific view shown above is intended to communicate the answer to the question "Why". In the medical arena, it would help answer the question, why should my loved one have this particular treatment (e.g. certain surgical procedure)? In this type of situation, an appropriate instance of the type of view shown above would communicate the most important (top) feature ("Feature 1") of the particular surgical product or solution ("Product 1"), and the range of benefits ("Benefit 1-4") that would be produced for the particular patient ("Market 1"). By combining this with other features such as those that track the gaps between actual and potential needs and benefits currently being met and those that enable mutual planning, coordination and implementation, the mutual evaluation, planning and implementation of different scenarios for how to allocate limited resources between parts of a network or portfolio and optimize network-wide value can be done.

FIG. 26 shows that AFFIRM can calculate and tell participants in a shared process or network "Why" a given product ("Product 1") would be recommended as beneficial for a given market ("Market 1") need. The view shows how an AFFIRM based system can display the particular features of a particular product (e.g. medical procedure) and the particular extent of the benefits of these features for a particular market (e.g. patient). The specific view shown above is intended to communicate the answer to the question "Why". In the medical arena, it would help answer the question, why should my loved one have this particular treatment (e.g. certain surgical procedure)? In this type of situation, an appropriate instance of the type of view shown above would communicate the most important (top) feature ("Feature 1") of the particular surgical product or solution ("Product 1"), and the range of benefits ("Benefit 1-4") that would be produced for the particular patient ("Market 1"). By combining this with other features such as those that track the gaps between actual and potential needs and benefits currently being met and those that enable mutual planning, coordination and implementation, the mutual evaluation, planning and implementation of different scenarios for how to allocate limited resources between parts of a network or portfolio and optimize network-wide value can be done.

The ability of an AFFIRM based system to do the above evaluation, calculating the above mentioned statistics (based on expert opinion and actual experience in a given environment) as well as to display and use this information in a logical and convenient way for all users' benefit demonstrates an important utility of the AFFIRM invention. Users can both automatically use these evaluations as guidance for future actions and as mentioned above, actually transact or implement recommended actions, all in one integrated and easily accessible view. Also the ability of users to provide further input, e.g. data on the current situation, selection of certain (usually recommended) actions and/or feedback on whether a recommendation worked out as suggested, enable the user to control the system and the network to learn from experience. So for example this new data is then captured and used in subsequent evaluations to better predict the potential results of future recommendations.

Because of the AFFIRM technology, these type of evaluations can be prepared and shared with and between users as standard features and/or non-technical end user customized "plug-ins" of a given AFFIRM based (implementation) and/or network's applications. This is done in a way that is more easily and economical than a multi-user spreadsheet with models and data being shared over a communication network. They use types of quantitative information (e.g. counts, sums, averages, weighted averages, correlations, regressions, etc.) about particular types of subjects (i.e. a patient with certain conditions) and particular types of potential objects (i.e. a medical procedure with certain features and functions) in a network to guide behavior of network participants in a quantitative and qualitative way.

Because of the singular subject focus and networked object oriented reflections of each domain based on the uniform AFFIRM architecture, a collection or aggregate of domains (acting as one subject) is able to capture the dynamics of the behavior of both individuals and entire networks in which individuals are involved. As a result of only data being different, within the uniform AFFIRM framework, representing an individual subject and the objects involved in that subjects network(s), an AFFIRM based system can make recommendations (or predictions) for/of future action based on the context of that individual, thus guiding and enhancing behavior and performance of individuals and networks.

In this way AFFIRM provides the ability to evaluate the advantages and disadvantages of different solutions for any entity involved in a dynamic network or system regardless of the particular situation. It can even go beyond the type of analysis shown above (quality benefit deployment) and use the above information to "visualize" or weigh the relative attractiveness of different alternative courses of action (based on such things as opportunities and threats in the environment and/or strengths and weaknesses in the individual market (i.e. customer) in a holistic way. These AFFIRM based capabilities enable all entities or participants involved in a network to better understand, support and coordinate decision-making and implementation processes.

Figure 25:
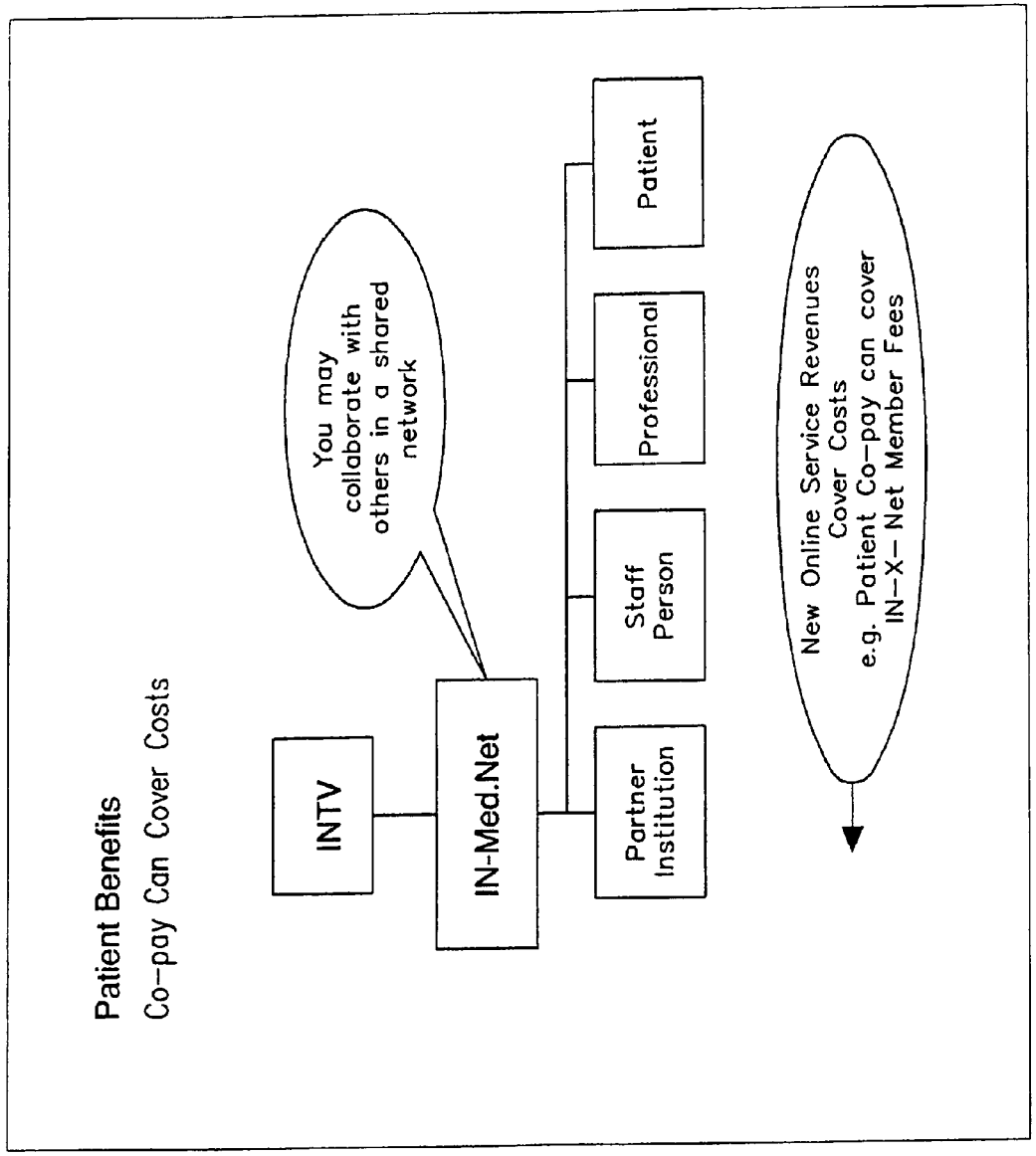
FIG. 25 shows just one of many business models that can be supported by the application of AFFIRM technology in healthcare.

FIG. 25 shows just one of many business models that can be supported by the application of AFFIRM technology in healthcare. This would normally involve sponsoring partners, e.g. hospital, physicians organization, payer, and/or other provider group in the community, initiating an application specific collaborative network, e.g. IN-Med.Net or IN-NYC-Emergency-Med.Net, etc., and then having other subsequent/alternative partners, e.g. other providers, labs, patients, etc., participate and/or sponsor the network. In this way there can be networks that represent "vertical industries" (e.g. health) and/or "horizontal professions" (e.g. for a particular medical specialty, sub-specialty and/or other type of provider) for a community. These networks enable sharing of applications made up of templates or "interaction threads" for special purposes. They act as structures that enable integration (enhanced delivery of information, goods and services) from the top down and data pipes that channel performance data from the bottom up, all while enhancing coordination of vision and action up, down and sideways throughout extended collaboration networks.

By facilitating transactions, providing vision across and along a network, and enabling better coordination of the network all entities involved will benefit. In terms of professional service networks alone within industries such as healthcare and others, the impact of this new technology and organization (business process) capability will be tremendous. Also as mentioned above, individuals will also be able to have information from multiple networks, e.g. financial (e.g. IN-Fin.Net), insurance (e.g. IN-Sure.Net), medical (e.g. IN-Med.Net), consumer goods, recreation, etc., integrated into their personal domains. This will enable individual entities to take responsibility for not only managing their own health, but also other aspects of their life in a holistic way.

Figure 27:
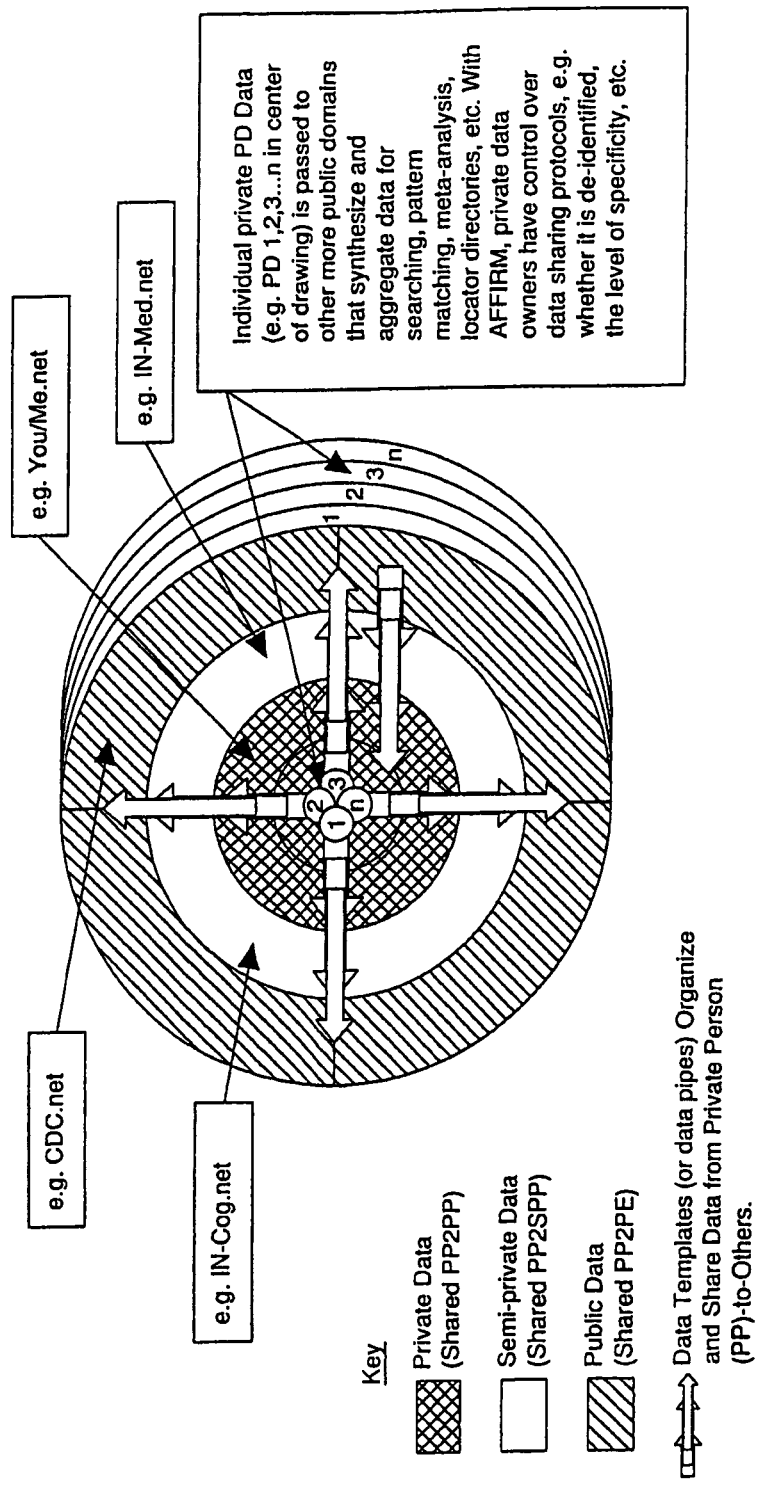
FIG. 27 shows another look at how AFFIRM domains, including Personal Domains (PD) and others, as well as other AFFIRM technology enable network-wide data integration and aggregation without requiring everyone in the network to use the same inflexible data structures (e.g. fixed database field names) or to continuously do complex data transformations, one or both of which are required by all other information integration systems available today. This unique achievement as well as the unique ability to inherently provide individual privacy and self-control over all interaction, e.g. data sharing from Private Person-to-Private, Semi-private and Public Partners without requiring a third party security provider, make AFFIRM based systems practical large-scale solutions for managing public health and other security applications. This chart shows on a little bigger scale than previous charts how the data from specific individualized domains can be securely shared (with optional de-identification) in order to provide increasing levels of aggregation in information as well as evaluation and decision support to any level of resolution in increasingly inclusive and/or more public domains.

See FIG. 27 that provides another look at how AFFIRM domains, including Personal Domains (PD) and others, as well as other AFFIRM technology enable network-wide data integration and aggregation without requiring everyone in the network to use the same inflexible data structures or to continuously do complex data transformations, one or both of which are required by all other information integration systems available today. This unique achievement as well as the unique ability to inherently provide individual privacy and self-control over all interaction, e.g. data sharing from Private Person-to-Private, Semi-private and Public Partners without requiring a third party security provider, make AFFIRM based systems practical large-scale solutions for managing public health and other security applications. This chart shows on a little bigger scale than previous charts how the data from specific individualized domains can be securely shared (with optional de-identification) in order to provide increasing levels of aggregation in information as well as evaluation and decision support to any level of resolution in increasingly inclusive and/or more public domains.

Figure 28:
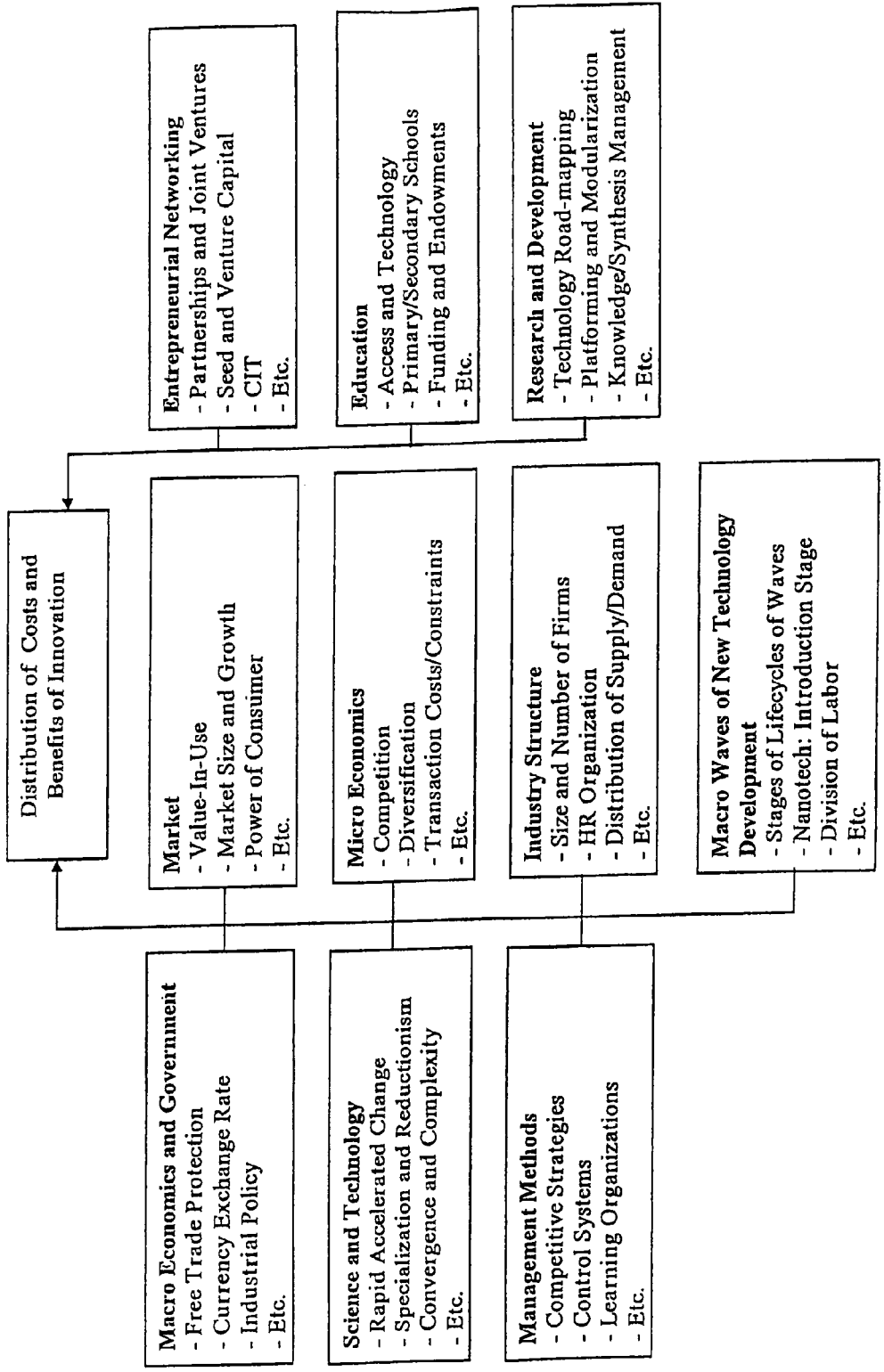
FIG. 28 shows just some of the many diverse sectors and fields or domains where AFFIRM can be applied. Perhaps the greatest value of AFFIRM will be how it is capable of bringing complementary parties from different previously divided sectors or fields together in symbiotic relationships.

These same management, communication and coordination benefits in healthcare can be attained in virtually any network of entities collaborating in some way using the AFFIRM technology. FIG. 28 shows just some of the many diverse sectors and fields or domains where AFFIRM can be applied. Perhaps the greatest value of AFFIRM will be how it is capable of bringing complementary parties from different previously divided sectors or fields together in symbiotic relationships. One more of the many possible application examples follows that addresses this great need and value.

Leading innovators from across Government, Academia and Industry as well supporting Associations (G-A-I-A) are committed to a new Research Data Evaluation Standards and Innovation Guidance Network (ReDESIGN). Dynamic modeling, evaluation and harmonization of complex research and development (R&D) processes from opportunity recognition and ideation to commercialization are facilitated in internetworked private, semi-private and public domains. Road mapping and Design-for-Six-Sigma as well as other approaches are supported. A uniquely uniform Web-based toolkit comprised of data structures, protocols and interfaces facilitates monitoring, evaluation, guidance and coordination of ongoing network-wide interaction. Negotiation of semi-private partnering arrangements across emerging clusters of traditionally divided yet complementary participants are more easily and securely managed. As a result of each cluster or semi-private domain having prearranged governance policies, standards and monitoring mechanisms, exchange of proprietary knowledge flows more fluidly.

Prioritized knowledge, comprised of ordered slices of information from partner domains, is integrated, validated and personalized in each individual participant's Personal Domain (PD). A PD is accessed through a window in a Web browser to plan, organize, motivate and control interaction. (See FIG. 1 and FIG. 8)

All functions needed to securely model, evaluate, manage and harmonize R&D activities between remote G-A-I-A partners can be done within one Web window. Dynamic ex-ante monitoring & evaluation of impact of complex interaction across G-A-I-A hierarchies enables timely network-wide identification, translation and leverage of opportunities for individual and greater good.

Individuals and groups across G-A-I-A sectors are motivated to contribute in several ways. They receive real credits and enhanced reputations based on the leveraged value they enable network-wide. They are also comforted by their ability to maintain content integrity and ownership rights. This is possible and practical as a result of the unique way content owners control distribution as they dialectically interact with others to determine content value. All this happens naturally as a result of interaction. 'Interaction threads' incrementally flow between domains and are archived as a result of transparent user action. User actions include partner, send, receive, find, use, create, annotate, rank, evaluate, etc. . . . . Received records are immediately synthesized and prioritized in a PD by chained concept codes and available to help guide subsequent interaction. This synthesis of timely actionable knowledge in one distributed hierarchical multidimensional metrological and ontological modeling framework readily stages data to evaluate and react to risks and opportunities. (See FIGS. 18 and 20)

A premise of this research support service is that data, ideas or discoveries might come from anywhere, but to develop them into significant opportunities they need to be jointly evaluated and developed by participants from across domains. Another premise is that translation of research into practice will not succeed without translation of practice data, problems and opportunities into research. ReDESIGN helps researchers securely mine, collect, merge, correlate, share, synthesize and transform individual and pooled data. Interchange between ReDESIGN and other data formats are openly supported. Data on resources, inputs, processes, outcomes and reasons are used ex-ante to help evaluate and guide network-wide exchange throughout process and relationship lifecycles. This helps to more readily recognize opportunities and negotiate complex value propositions while harmonizing ongoing interaction. This guides efficient and effective resource allocation and enhances network-wide understanding and learning, thus improving participant worth and quality-of-life. Securely and efficiently matching complementary resources and needs over time, space, scale and scope of G-A-I-A activity will harmonize research and supercharge innovation.

ReDESIGN uses a rolling standard setting (and consensus building) apparatus to align disparate standards from across participants, times, scales and systems while securing negotiation of arrangements for exchange of resources that might create value together. So, regardless of the source of ideas or eventual payoff, research initiative and sustainable innovation are motivated, targeted, guided and accelerated. One research data-sharing group could use ReDESIGN to better satisfy FDA desires for clinical research that is better targeted and streamlined, thus improving success rates and reducing the $1.7 Billion average cost of bringing a new drug to market. By appropriately and securely evaluating, attracting and aligning diverse resources, standards and needs of innovators across G-A-I-A sectors, capability of competitively serving global markets and creating value for cluster members will be enhanced, all while securing intellectual property diffusion, application and remuneration.

This breakthrough Web-base rolling standard setting building service enables more dynamic and less costly emergence and synthesis of evolving XML meta-data sharing standards. These data sharing techniques have previously required unrealistic levels of up-front agreement and resources, precluding sufficiently inclusive levels of collaboration in recognizing, translating, evaluating and implementing opportunities. This limits agility in collectively informing, aligning and meeting standards appropriate for each context. ReDESIGN provides the scalable vision and agility to cost-effectively manage standards, monitor compliance, facilitate convergence and enable mass-customization. Maintenance of privacy and security while providing transparent access to personalized multi-media research data collectively gathered across G-A-I-A hierarchies is now practical. The public is informed, collaborative innovation is supercharged and privacy is secured. (See FIG. 27) Using interacting AFFFIRM Domains, e.g. Personal Domains, etc., to manage collaborative innovation over time across GAIA sectors will improve the science of science and innovation policy in incredible new ways. ReDESIGN will demonstrate how United States competitiveness can be sustained by capitalizing on breakthrough new levels of security, agility, scalability and harmonization across traditional G-A-I-A boundaries. According to the World Economic Forum, United States competitiveness in innovation is falling fast, from a commanding lead to well below smaller yet better coordinated national economies. Unfortunately the U.S. is now the sleeping giant that needs to reawaken its creative spirit by capitalizing on its strengths in academic research and market fluidity while improving its institutional coordination and fiscal responsibility. Harmonization of most appropriate resource distribution and collaborative innovation across the full range of socioeconomic activity in the U.S. is now possible through the unique approach to be demonstrated by G-A-I-A ReDESIGN.

ReDESIGN promotes sustainable progress, helping researchers monitor, evaluate and predict socioeconomic impact of policy, program and product changes across interrelated G-A-I-A Personal Domain perspectives. Each perspective logically represents and aligns an individual person or organized actor's priorities with those of the others involved in complementary clusters. Again, security and equity are assured by giving each actor (or their authorized representatives) control of their content, plans and actions. For example one synthesized view may be used to control and self-motivate a person's participation as an experimental subject in personalized treatment programs targeting their education, health, etc. Another view might help manage a new drug's R&D, dynamically updating meta-synthesis of data from individual patients involved in clinical trials, with de-identified data stratified by variables systematically determined as most valid and relevant in measuring that drug's safety and effectiveness. The achieved network-wide representation and evaluation of diverse perspectives will motivate collective fulfillment of personalized opportunities and thus help maximize economic progress, while still bolstering cultural diversity and other important societal and personal values.

Scientists in a variety of fields now believe that this type of technology will be useful in virtually all fields of science, bringing them together, enabling more productive scholarship, and even in synthetically controlling and coordinating physical networks in our universe. This even includes in-vivo networks that could use the technology to simulate and control the health of biological organisms, networks or systems. It will manage and communicate among levels of organization in organisms, such as whole, systems, organs, tissues, cells, organelles, molecules, atoms, etc., capturing and coordinating the dynamics of network behavior from a universal scale down to quantum and/or sub-nanometer scale. AFFIRM based networks provide value at any entity or level of organization by easily sharing structured information and coordinating real-time interaction without giving up privacy, order or integrity. The benefits are unique because of how the uniform data structure(s), e.g. personal domain (PD), and messaging technology provides simple, flexible, economical and pragmatic use throughout (e.g. across and along multiple dimensions of) a network. It is scalable because the portable modular technology and (socioeconomic) model enable economical application and network growth. It is sustainable because of the way it securely creates value (by overcoming disintegration, entropy or chaos) by enabling intimate understanding, opportunity recognition, commitment and coordination of purposeful action.

It adds value to any operation by sharing structured information and coordinating real-time interaction without giving up privacy. It is unique because the uniform personal domain (PD) and messaging technology provides simple, flexible, economical and pragmatic solutions. It is scalable because the portable modular technology and business model enable viral growth. It creates stickiness because of the way it securely creates Provider and Patient value and commitment in a sustainable way.

The embodiment of the AFFIRM design or invention in one or more configurable or programmable computing devices, memory devices or carrier waves (communication carriers) makes it useful. AFFIRM data structures (frameworks) are implemented in one or more computer memory devices or carrier waves. AFFIRM processes (functions) are programmed in software or firmware and run in one or more computing devices. In order to interact with the world, i.e. do real work, an AFFIRM based system must be linked (interfaced) with other real objects, e.g. users, devices, other external systems programs or databases, animate and inanimate objects, etc. The purpose of AFFIRM is to manage relationships between objects (i.e. socioeconomic entities) in a network through which real interaction or work is realized. This is why the described invention is called AFFIRM, Architectural Frameworks, Functions and Interfaces for Relationship Management.

What is claimed is:

1. A computing architecture and method for managing the socioeconomic interaction of at least one of entity(s), group(s) of entity(s) and network(s) of entity(s) herein together referred to as the system, essentially comprised of:

a memory or medium for at least one of storing and transporting at least one of data and executable instructions;

a processor for at least one of accessing the data and executing the executable instructions, at least one of the data and the executable instructions structured according to:

a uniform and universally applicable subject and object oriented data structure(s) or framework(s) where each real subject entity in the system is represented by a separate main subject-oriented domain or hub, herein referred to as a Home Domain (HD) where the said subject entity is what is herein referred to as the Home Subject (HS), and by other reference object(s) located in other domain(s) or hub(s) of other subject(s) that interact with said HS to at least one of represent, link to and reflect said HS as an object, instances of said data and executable instructions in said uniform structure optionally emanating from a subject and object oriented application programming environment(s) that enable(s) at least one of programmer(s) and HS(s), whether knowing the syntax of computer coding language(s) or not, to at least one of create, access and operate application template(s) in HD(s) to share components and instances of said data and executable instructions in said uniform structure to manage interaction with at least one of said HS's own and other domain(s) and the HS(s) of these domain(s) in the process of at least one of planning, proposing, selecting, instantiating, staging and modifying reference object(s) referring to real entity(s) and interaction(s) with them so as to at least one of influence, observe, record and effect real change(s) in the real entity(s) themselves;

at least one of uniquely addressable and separately accessible node or data location(s) for each domain of the system;

link(s) or object(s), instances of which include a plurality of at least one of whole(s) and part(s) of at least one of said domain(s) of the system elsewhere referred to as bilateral or bi-directional links, that mutually or reciprocally point to each other and represent interaction(s), change(s) or exchange(s) that are able to be created and proposed by HS(s) and affirmed by potentially interacting HS(s), with each affirming HS of each then interacting domain being able to be updated with message object(s) that reference(s) the interacting real entity(s) and the current state(s) of the change(s) from the perspective of the HS of the domain being updated as the relationship evolves;

exemplary bilateral links include mutual references between two respective domains signifying a potential relationship, herein referred to as a partnership, between their HS(s), also referred to as partner(s), that, once agreed to by both parties, will then actually exist until at least one HS(s) of interacting domain(s) decide(s) to dissolve or discontinue the relationship;

at least one of discrete messaging, sharing and bilateral interaction mechanism(s) where reference object(s) at least potentially in the uniform data structure(s) can be selectively sent from one sending or sharing domain or hub to be at least one of selectively received, saved, processed and collated at least one of with or without other related data by at least one of targeted partner recipient HS(s) and domain(s) or hub(s), whether agreements have been made to structure or describe the application level data in the same application specific way or not; and at least one to potentially all of said data, object(s), reference object(s), domain(s), link(s), node(s), message(s), instruction(s), function(s), interface(s) and framework(s) existing in the system as at least one of real instances of said uniform and universally applicable subject and object oriented data structure(s).

2. The system according to claim 1, further comprising:
uniform subject and object oriented data structure(s) or framework(s), instance(s) of which are herein referred to as Personal Domain(s) (PD) because they are each separately and/or exclusively created, applied, partitioned, located, addressed, accessed and/or controlled by a single actor, organization, person, guardian or other entity, that is or represents the Home Subject (HS); and optionally subject and object oriented programming environment used and/or controlled by the HS and/or their authorized representative, without needing to know specific syntax or code(s) of a computer language to program application(s) by creating, selecting and/or destroying reference object(s) and/or their link(s) and state(s) to be processed within uniform and universally applicable meta-modeling framework(s);

pre-programmed planning, negotiation and/or interaction coordination protocol(s) and mechanism(s) that require(s) HS(s) and/or authorized representative(s) controlling PD(s) involved in an interaction to agree to an interaction such as the creation of a partnership, the sending and receiving of information, the exchange of physical goods or services, before an interaction can be scheduled and/or enacted;

pre-programmed monitoring, updating, archiving and/or learning mechanism(s) that enable(s) incremental interaction(s) to be automatically and/or otherwise recorded in the above uniform framework(s) and then able to be directly evaluated from the perspective of each PD and its HS;

pre-programmed process guidance mechanism(s) that can automatically use result(s) of past interaction(s) and/or other accessible relevant data to evaluate alternative action(s) based on relative attractiveness and/or recommend action(s) as well as predict behavior(s);

pre-programmed process control(s) and actualization protocol(s) and mechanism(s) that enable(s) interaction to be asynchronously planned and/or negotiated and then, synchronously or otherwise, enacted and/or coordinated;

architecture(s) and protocol(s) for building one or more pragmatic webs where subject plan(s), action(s) and/or feedback impact meaning, conception, development and/or value of useful object(s); and/or architecture(s) and protocol(s) for managing the dynamic learning, development, coordination, protection, collaboration and/or performance of socioeconomic entity(s) in the system.

3. The system, according to claim 2, further essentially comprised of:
a uniform subject and object oriented data structure or framework where each real entity subject represented in the system is referenced by a main subjective domain where it is the Home Subject (HS) and also by other reference object(s) located in other interacting domains where the real entity is reflected as an object;

one or more main subjective domain instances of the uniform structure, herein referred to as Personal Domains (PD), which are each used exclusively by a HS to capture, locate, access, observe and/or manipulate reference object(s) about the HS's subjective self and those other object(s) the HS relates to;

reference object instance(s) which are made up of one or more Input Output Objects (IOO) which are each structured in a uniform way and used to label, describe, symbolize, represent, link to, locate, show, monitor, stage, value, measure, grade, rank, score and/or apportion the object(s) they refer to;

reference object instance(s) that exist in domain(s) or PD(s) in the system and refer to entity(s) that the HS interacts with; and reference object instance(s), that exist in domain(s) or PD(s) that this home entity interacts with as an object, that refer(s) to this HS.

4. The system according to claim 3, further comprising:
a uniform and modular subject-oriented domain framework or data structure that is universally applicable to managing the interaction(s) of object(s) in a network; a subjective data framework that enables each object to be managed as a separate or distinct subject, each with its own hub(s) or domain(s) that are and remain independently controlled while simultaneously establishing and enacting interdependent relationships with other concurrently and/or independently controlled subject(s) or hub(s);

one or more Personal Domain (PD) objects that are created by instantiating this subjective framework;

each PD having a reference to a specific Home Subject (HS) which it represents and can be controlled by;

each PD having its own data partition or totally separate and secure repository distributed over one or more separate data location(s);

each PD as exclusively accessible and therefore controllable by one HS super user or their authorized guardian and/or agent;

each PD having one or more sub-domain templates formed according to a uniform and universally applicable domain framework component, herein called an Input Output Object Template (IOOT), that is instantiated for interaction(s) between the exclusive HS and a particular identified main object in its environment;

each complete interaction instance of IOOT(s) that represents interactive behavior recorded with detail on one or more objects, dimensions and perspectives;

uniform format for record(s) called reference object(s) or Input Output Object(s) (IOO) that include(s) a uniform and universally applicable set of field(s) or basic data component(s);

basic data component(s) for IOO object(s) that may include Link ID(s) (LID), Class ID(s) (CID), Label(s), Description(s), Universal Resource Locator(s) (URL), Rank(s), Value(s), Media Type(s), Number Type(s);

LID(s) formatted according to standard protocol that uniquely identifies reference object(s) and links similar or related reference object(s);

bilateral link(s) between particular reference object(s) in PD(s) and reflection PD(s) where the particular reference object(s)'s referenced object(s) is/are HS(s);

uniform method(s) for uniquely identifying and locating a file and/or class and its instances within certain dimension(s) and path location(s) that combine(s) Class ID or identification(s) (CID) with a Domain Chain(s) (DC);

uniform CID(s) that are or indicate the class and/or file name(s) and identify the multidimensional qualitative and quantitative state(s) of object(s) in the class or file;

uniform DC(s) that uniquely identify specific multidimensional path(s) to or location(s) of one or more particular CIDs and/or IOO(s);

bilateral links between related PD(s), CID(s), IOO(s), DC(s), IOOT(s) and/or real object(s) that enable reference object(s) that are in the domain(s), dimension(s) and perspective(s) in the data structure(s) and/or represented by the data structure to be interconnected and organized in a logical way such that objects are accessible, relatable, traversable, communicable and/or changeable from one interconnected part of the data structure and real object(s) represented to another in one or more of the possible direction(s); and/or data about the current state(s) and potential interaction(s) or state(s) in the future of HS(s) and related object(s) that is able to flow through and be updated in certain CID file(s) of this data structure, preferably while past completed interaction(s) or state(s) are archived in other(s).

5. The system according to claim 4, essentially consisting of:

pre-programmed class(s) and method(s) for enabling HS(s) to have exclusive authority to perform at least one of an act of authoring, importing, exporting, creating, defining, encapsulating, abstracting, inheriting, instantiating, storing, accessing, replicating, deriving, morphing, grouping, measuring, processing, evaluating, prioritizing, securing, displaying, sharing, planning, activating, scheduling, actuating, reflecting, aligning, integrating, synthesizing, aggregating, changing, updating, archiving, monitoring, and destroying reference objects in the data structure;

pre-programmed class(s) and method(s) for effecting level(s) or degree(s) of property(s) such as impact, inclusiveness, maturity, diversity, complementariness, intimacy, fluidity, material substance, resourcefulness; and/or graphical or other interface(s) that enable(s) HS(s) to do this object and subject-oriented programming and/or control use of other aspects of this invention from location(s) and device(s) with a network connection, with or without needing to script or write codes according to a specific syntax.

6. The system according to claim 5, further essentially consisting of:

asynchronous step(s) over time requiring HS(s) controlling involved PD(s) to plan, propose, review and/or otherwise agree to an interaction before an interaction can be scheduled to be implemented and/or synchronously enacted;

step(s) of data integration template or data pipe creation or production and/or sharing, preferably from generalized levels to more specific levels, to prepare for collection of information that can be shared and integrated, preferably from specialized levels to more general levels; and/or steps of data sharing and integration across subject(s), hub(s), domain(s), discipline(s), geographic location(s), time period(s), state(s), culture(s), industry(s), profession(s), group(s) and/or other entities or category(s), according to pre-defined and/or user definable matrices, alignments or relationships.

7. The system according to claim 6, further essentially comprising:

bilateral link interfaces between two bilaterally instantiated and/or reciprocally related reference objects that are related by or in a negotiated partnership, plan or interaction contract such that communication can flow in either direction between related and connected objects in an instantiated network;

steps that enable incremental interaction to be automatically recorded or synthesized in the frameworks or data structures of relevant domains and directly evaluated for its incremental impact on other relevant summary data and resulting recommendations;

methods and steps that enable objects in data structure to be evaluated according to predefined or user defined functions;

rating performance, predicting outcomes and prescribing alternatives via inline analytics and evaluation;

the step of enabling detailed information to be progressively collected, shared and integrated from private to progressively public domains and from specialized levels to more general or abstract levels;

the step of enabling, optionally de-identified, data to be received from other domain(s) that can be generalized with other data about similar interaction(s) that can be aggregated as generalized expertise to compare or evaluate performance, guide performance, share gains;

the step of allowing real object(s) outside the computer operating system that are referred to by reference object(s) to be changed by the Home Subject as a result of modifying value(s) and/or other component(s) of an IOO;

the step of monitoring, through receiving input direct from real object(s) or sensor(s) that measure the state(s) or change(s) in real object(s), change(s) in state of real objects;

the step of archiving, over time, changes in reference objects referring to real objects; and/or the step of sharing reputation or experience with other domains without necessarily sharing private information.

8. The system according to claim 7, further essentially comprising the steps of:

automatically or otherwise using result(s) of scientific experiment(s), pseudo-experiment(s), observation(s), experience(s), survey(s), partner polling, expert polling, to recognize and/or evaluate alternative action(s), predict outcomes, determine relative attractiveness, recommend action(s) and/or decide on action(s).

9. The system according to claim 8, further essentially comprising the step(s) of:

enabling asynchronously planned and/or negotiated interaction(s) to be synchronously or otherwise enacted in separate domains and locations.

10. The system according to claim 9, further essentially comprising:

a distributed meta-modeling framework and method that enables multi-perspective understanding to be communicated through complete semiotic treatment between, within or among entity(s) involved in the conception, use and/or development of human(s) and/or their artifact(s);

bi-directional input and output link(s) between related instance(s) or phenotype(s), in data domain(s) and/or part(s) thereof, and class(s) or archetype(s), whether embedded in data about the object instance(s) or in the body of the instance(s) itself, with reference object(s) in data in domain(s), whether in virtual or actual, whether referent(s), word(s), symbol(s) or other reference object(s), in subjective aspect(s) of entity(s) and with the objective aspect(s) of entity(s) that the referent(s) represent; and/or implementation by one or more entity(s), HS(s) and/or their representative(s).

11. The system according to claim 9, further essentially comprising:

a computational data structure, ecological model and method for supporting pragmatic collaborative innovation or development, particularly through experiential or experimental use, of human artifacts, language, knowledge, tools, business models, products, services;

the step of creating bi-directional link(s) between referent(s), ID(s), name(s), word(s), symbol(s), brand(s), image(s), data(s), definition(s), description(s), and/or explanation(s), processed, conceived, added, created, used, evolved and/or developed, in real entity subject domain(s), PD(s) of creator(s), actor(s), evaluator(s), innovator(s), user(s), developer(s), and/or beneficiary(s), and other domain(s) or sub-domain(s) with objects representing an evolutionary record of information on past, present and/or future states as well as multidimensional makeup and relationships, both internal and external, of potential and actual archetype(s), idea(s), ideal(s), concept(s), model(s), theory(s), prototype(s), metaphor(s), analogy(s), role(s), template(s), pattern(s), process(s), and/or method(s), that can be referred to by one or more referents, depending on the use context and user choice, to describe the same type of object;

the step of using meta-criteria and contextual data to guide construction and allocation of meaning, merit, worth, and other significance in an actor or use context, between or among particular ontological and metrological attribute values, between or among different components and phases of development;

the optional step of same as above for domains of less animate objects that also need bi-directional links to type domains to adequately communicate meaningfully about the object;

concept or type domain(s) that have reference object(s) for domain(s) that use the home concept and the referent(s) used to refer to the concept;

the step of collecting counts and other statistics for usage context of referent(s), including concept(s) referred to and other factors;

the step of sharing information and merging by concept;

implementing a or each subject's changes, options, plans, actions and feedback to impact the meaning and value of objects;

reapplying and/or applying the above steps to additional or each concept(s) and subject(s) or change(s) where each subject's use(s) of concept(s) and concept referent(s) in a particular context impact(s) the state(s) and/or meaning(s) of the concept(s), popularity of concept(s) for a given context, and the referent(s) used to describe or reference the concept(s) in various or relevant domain(s) or context(s); and/or using this approach to coordinate collaborative innovation in language and other types of human created artifacts.

12. A data structure, protocol and process for managing the at least one of development, integration, coordination, interaction, scalability and performance of a socioeconomic organization, whether at least one of formally, hierarchically or centrally structured or not, that includes a plurality of at least one of at least potentially if not actually independent and at least potentially if not actually interdependent entities, comprising the steps of:

executing, via a processor, executable instructions at least one of into and from stored memory to:

enable a plurality of object entities to each at least one of register and be represented as an independent individual subject entity participant in a common network;

at least one of store, archive and organize data about objects at in at least one of a level(s) of aggregation and dimension(s) of relatedness in a distinct structure and according to a uniform and generally applicable yet individually applied structure where each instance of this structure is at least one of a distinct subset, sub-domain, domain and hub reflecting a unique individual subject's at least one of relationship(s), perspective(s), experience(s) and history(s);

store data about real objects in data instances according to the state of these objects relative to the individual or subject the domain or hub is about;

require each individual subject entity at least one of relating, participating, acting and involved in a network to possess at least one instance of said uniform structure dedicated to this individual as a subject of said instance of said uniform structure;

provide authorized access to one or more unique individual domains or hubs through a bi-directional communication interface that reflects and communicates as well as enables at least one of change and transformation of current at least one of actual and potential states of objects related to the individual subject(s);

provide each authorized home individual subject entity with exclusive control of change to potential states of home objects structured in their (home) domain(s) or hub(s) through said interface;

require individual home subject entity to pre-commit to planned change(s) to the domain or hub on an at least one of an opt-in and opt-out basis that entails interaction with one or more other subject entities or hubs before changes or actions are scheduled to take place;

require at least one of multilateral and bilateral negotiation and formation of an agreement with independent subject entities and their domains or hubs before interaction can take place at least one of with, among and between said home subject entities;

enable home subject entity to be able to at least one of flexibly create and modify instances of data structured according to said uniform data structure(s) to at least one of define, describe, classify, contain and store sets of real data objects;

enable at least one of designating, staging and transformation of subsets of said instances of said uniform data structure(s);

encapsulate data about real objects in the prescribed uniform data structure(s) in a domain that are at least one of subsets, partitions, parts, archives, backups, distributions, copies and instances of the whole subject domain's contents organized according to the same uniform yet highly adaptive structure as the whole domain or hub;

enable at least one of selection, creation and modification of one or more real data objects as instances of said uniform data structure that represent potential action plans initiated by one home subject entity to be at least one of viewed, evaluated, transformed staged and sent for communication as a proposal to specific other potentially interacting objects that may or may not have their own home domains or hubs organized according to the same uniform yet highly adaptive domain structure;

enable these specific other potentially interacting at least one of entity(s), subject(s), domain(s), and hubs to at least one of view, receive and evaluate said real structured proposals in or from independent domain(s) or hub(s) at their discretion;

enable said viewers, evaluators or recipients to at least one of ignore, view, decline, modify or agree to the proposal and to transform and stage an at least one of affirmation or other response regarding their interest in or agreement to participate in the initiator's proposal for communication from their at least one of domain and hub back to the initiator's at least one of domain and hub;

enable the initiating subject entity to at least one of view, select and approve the receipt of said at least one of response and affirmation into their home subject domain or hub;

cause the home domain or hub to receive said at least one of response and affirmation;

provide each at least one of authorized individual subject(s), domain(s) or hub(s) with access to control at least one of physical enactment and transformation of one or more unique individual objects through at least one of a bi-directional or other communication interface that at least one of reflects and communicates as well as enables the pre-negotiated change or other transformation to real objects, including but not limited to the exchange or trade of real options, rights, duties, goods and services; and causing or requiring agreed actions to at least one of automatically and synchronously be at least one of enacted and implemented at the at least one of proposed and agreed time in the plurality of distinct yet then actually interacting at least one of real entities and objects.

13. The data structure, protocol and process for managing the at least one of development, integration, coordination, interaction, scalability and performance of a socioeconomic organization, whether at least one of formally, hierarchically or centrally structured or not, that includes a plurality of at least one of at least potentially if not actually independent and at least potentially if not actually interdependent entities, as presented in claim 12, more specifically comprising of:

enabling a plurality of object entities to each at least one of register and be represented as an independent individual subject entity participant, herein referred to as a Home Subject (HS), in a common network;

at least one of storing, archiving and organizing data about objects in a distinct structure and according to a uniform and generally applicable yet individually applied subject and object oriented data structure(s), herein referred to as a Personal Domain (PD), where each instance of this structure is a distinct domain and reflects a HS's at least one of relationship(s), perspective(s), experience(s) and history(s);

storing data about real objects in each PD according to the state of these objects relative to the HS;

requiring each HS at least one of relating, participating, acting and involved in a network to possess at least one instance of this structure or PD that is dedicated to this individual as a home subject of the domain;

providing authorized access to one or more PD through bi-directional communication interface(s) that reflects and communicates as well as enables at least one of change and transformation of current at least one of actual and potential states of objects related to each HS;

providing each authorized HS with exclusive control of change to potential states of home objects such as other objects that are owned by the HS and/or reference objects that represent the HS or its objects, structured in their domain(s) through said interface;

requiring HS to pre-commit to change(s) to said home domain on an at least one of opt-in and opt-out basis that entails interaction with one or more other subject entities before changes or actions are to take place;

requiring at least one of multilateral and bilateral negotiation and formation of a partnership agreement between domains of independent HS(s) before interaction can take place at least one of with, among and between said HS(s);

enabling HS to be able to at least one of flexibly create and modify instances of data structured according to the said uniform domain structure to at least one of define, describe, classify, contain and store domain subsets of real data objects;

enabling at least one of designating, staging, transformation and sharing of subsets of said instances of said uniform data structures or subsets or parts of domain's uniform structure with at least one of partners and interacting domains;

encapsulating data about real objects in the prescribed uniform data structures in a home domain or PD that are subsets of the whole subject domain's contents and subsets of all the objects that exist in the domain(s) or PD(s) of the HS organized according to the same uniform structure as the whole domain;

enabling one or more real data objects that represent potential action plans initiated by one HS to be evaluated, transformed and staged for communication as a proposal to specific other potentially interacting objects that have their own PD(s) organized according to the same uniform domain structure;

enabling these specific other potentially interacting HS(s) to at least one of view, receive and evaluate these real structured proposals in their or from other PD(s) at their discretion;

enabling said viewers, evaluators or recipients to implicitly or explicitly agree to the proposal and to transform and stage an affirmation of their interest in or agreement to participate in the initiator's proposal or action plans for communication from their domain back to the initiator's domain;

enabling the initiating HS to implicitly or explicitly approve the receipt of the affirmation into their PD;

causing the PD to receive the affirmation;

providing each at least one of authorized PD(s) and HS(s) with access to control at least one of physical enactment and transformation of one or more unique individual objects through at least one of a bi-directional or other communication interface that at least one of reflects and communicates as well as enables the pre-negotiated change or other transformation to real objects, including but not limited to the exchange or trade of real options, rights, duties, goods and services; and/or causing or requiring agreed actions to at least one of automatically, freely and synchronously be at least one of enacted and implemented at the at least one of proposed, allowed and agreed time in the plurality of distinct autonomous yet then actually at least one of interdependent, integrated, unified, free and interacting real entities and objects.

* * * * *